(12) United States Patent
Leonard

(10) Patent No.: US 11,554,624 B2
(45) Date of Patent: Jan. 17, 2023

(54) GAS SPRING AND GAS DAMPER ASSEMBLIES AS WELL AS SUSPENSION SYSTEMS AND METHODS INCLUDING THE SAME

(71) Applicant: Firestone Industrial Products Company, LLC, Nashville, TN (US)

(72) Inventor: Joshua R. Leonard, Noblesville, IN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 0 days.

(21) Appl. No.: 17/535,808

(22) Filed: Nov. 26, 2021

(65) Prior Publication Data

US 2022/0080799 A1   Mar. 17, 2022

Related U.S. Application Data

(63) Continuation of application No. 16/468,119, filed as application No. PCT/US2017/069143 on Dec. 30, 2017, now Pat. No. 11,214,111.

(Continued)

(51) Int. Cl.
  *F16F 9/05*   (2006.01)
  *B60G 15/12*  (2006.01)
(Continued)

(52) U.S. Cl.
  CPC .............. *B60G 15/12* (2013.01); *B60G 11/27* (2013.01); *F16F 9/0472* (2013.01); *F16F 9/057* (2013.01);
(Continued)

(58) Field of Classification Search
  CPC .. B60G 15/12; B60G 11/27; B60G 2202/152; B60G 2202/242; B60G 2202/314;
(Continued)

(56) References Cited

U.S. PATENT DOCUMENTS

| 4,934,667 A | 6/1990 | Pees et al. |
| 5,222,759 A * | 6/1993 | Wanner ............... F16F 9/20 280/5.515 |

(Continued)

FOREIGN PATENT DOCUMENTS

| EP | 0160277 | 11/1985 |
| WO | WO 2016019027 | 2/2016 |

OTHER PUBLICATIONS

Extended European Search Report dated Jul. 24, 2020 for European Patent Application No. 17887286.7.

*Primary Examiner* — Thomas W Irvin
(74) *Attorney, Agent, or Firm* — Thomas R. Kingsbury; Matthew P. Dugan

(57) ABSTRACT

Gas spring and gas damper assemblies include a flexible spring member. First and second end members are secured to opposing ends of the flexible spring member to form a spring chamber. The second end member includes an end member wall that at least partially defines a damping chamber within the second end member. A damper piston assembly includes a damper piston and an elongated damper rod. The damper piston separates the piston chamber into first and second chamber portions. A pneumatically-actuated control device is disposed in fluid communication with one of the first and second chamber portions. The control device is selectively operable to alter the functionality of the gas spring and gas damper assembly between spring and damper functionality and actuator functionality. Suspension systems including one or more of such gas spring and gas damper assemblies as well as methods of operation are also included.

20 Claims, 30 Drawing Sheets

Related U.S. Application Data

(60) Provisional application No. 62/441,245, filed on Dec. 31, 2016.

(51) Int. Cl.
*B60G 11/27* (2006.01)
*F16F 9/04* (2006.01)

(52) U.S. Cl.
CPC .. *B60G 2202/152* (2013.01); *B60G 2206/424* (2013.01)

(58) Field of Classification Search
CPC .. B60G 2206/424; F16F 9/0472; F16F 9/057; F16F 9/56; F16F 9/04; F16F 9/05; F16F 9/0245
See application file for complete search history.

(56) References Cited

U.S. PATENT DOCUMENTS

| | | | |
|---|---|---|---|
| 9,211,776 B2 * | 12/2015 | May | F16F 9/3292 |
| 9,254,727 B2 | 2/2016 | Moulik et al. | |
| 9,259,985 B2 | 2/2016 | Leonard | |
| 9,290,073 B2 | 3/2016 | Bounds | |
| 9,296,272 B2 | 3/2016 | Leonard | |
| 9,352,632 B2 | 5/2016 | Leonard | |
| 9,370,984 B2 | 6/2016 | Leonard | |
| 9,446,648 B2 | 9/2016 | Allen | |
| 9,527,358 B2 | 12/2016 | Leonard | |
| 9,630,469 B2 | 4/2017 | Leonard | |
| 9,701,170 B2 | 7/2017 | DeBruler et al. | |
| 9,770,958 B2 | 9/2017 | Leonard | |
| 9,809,075 B2 | 11/2017 | Bounds | |
| 10,005,333 B2 | 6/2018 | Leonard et al. | |
| 10,113,603 B2 | 10/2018 | Smith | |
| 10,161,470 B2 | 12/2018 | Leonard | |
| 10,161,471 B2 | 12/2018 | Leonard et al. | |
| 10,166,832 B2 | 1/2019 | DeBruler | |
| 10,369,855 B2 | 8/2019 | Moulik et al. | |
| 10,464,385 B2 | 11/2019 | DeBruler et al. | |
| 10,465,763 B2 | 11/2019 | Bounds et al. | |
| 10,543,729 B2 | 1/2020 | Leonard | |
| 10,900,534 B2 | 1/2021 | Leonard | |
| 11,214,111 B2 * | 1/2022 | Leonard | F16F 9/0472 |
| 2001/0054703 A1 | 12/2001 | Job | |
| 2013/0234377 A1 | 9/2013 | Leonard | |
| 2014/0070468 A1 | 3/2014 | Leonard | |
| 2014/0225345 A1 * | 8/2014 | May | B60G 17/01933 280/124.157 |
| 2014/0246817 A1 | 9/2014 | Bounds | |
| 2015/0008627 A1 * | 1/2015 | Leonard | B60G 13/04 267/64.24 |
| 2015/0217617 A1 | 8/2015 | Leonard | |
| 2015/0273968 A1 * | 10/2015 | DeBruler | F16F 9/585 403/221 |
| 2015/0367700 A1 | 12/2015 | Allen | |
| 2016/0101663 A1 | 4/2016 | Leonard | |
| 2016/0121682 A1 | 5/2016 | Leonard et al. | |
| 2016/0176258 A1 | 6/2016 | Bounds | |
| 2016/0185179 A1 * | 6/2016 | May | F16F 9/50 280/124.16 |
| 2016/0236532 A1 | 8/2016 | Moulik et al. | |
| 2016/0272028 A1 | 9/2016 | DeBruler et al. | |
| 2017/0211649 A1 | 7/2017 | Leonard et al. | |
| 2017/0217275 A1 | 8/2017 | DeBruler | |
| 2017/0248187 A1 | 8/2017 | Leonard | |
| 2017/0284493 A1 | 10/2017 | Smith | |
| 2017/0363169 A1 | 12/2017 | Bounds et al. | |
| 2018/0093542 A1 * | 4/2018 | Leonard | F16F 9/049 |
| 2018/0304711 A1 | 10/2018 | Leonard | |
| 2018/0313424 A1 | 11/2018 | Leonard | |
| 2020/0156429 A1 | 5/2020 | Leonard | |

* cited by examiner

GAS SPRING AND GAS DAMPER ASSEMBLIES AS WELL AS SUSPENSION SYSTEMS AND METHODS INCLUDING THE SAME

This application is a continuation of U.S. patent application Ser. No. 16/468,119, filed on Jun. 10, 2019, which is the National Stage of International Application No. PCT/US2017/069143, filed on Dec. 30, 2017, which claims the benefit of priority from U.S. Provisional Patent Application No. 62/441,245, filed on Dec. 31, 2016, the subject matter of each of which is hereby incorporated herein by reference in its entirety.

BACKGROUND

The subject matter of the present disclosure broadly relates to the art of gas spring devices and, more particularly, to gas spring and gas damper assemblies that include a pneumatically-actuated control device selectively operable to alter the functionality of the gas spring and gas damper assemblies between spring and damper functionality and actuator functionality. Suspension systems including one or more of such gas spring and gas damper assemblies as well as methods of operation are also included.

The subject matter of the present disclosure may find particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with suspension systems for non-wheeled vehicles and/or support structures and height adjusting systems associated with industrial machinery, components thereof and/or other such equipment. Accordingly, the subject matter of the present disclosure is not intended to be limited to applications and/or uses associated with suspension systems of wheeled vehicles, which as discussed herein are merely exemplary.

Wheeled motor vehicles of most types and kinds include a sprung mass, such as a body or chassis, for example, and an unsprung mass, such as two or more axles or other wheel-engaging members, for example, with a suspension system disposed therebetween. Typically, such a suspension system will include a plurality of spring devices as well as a plurality of damping devices that together permit the sprung and unsprung masses of the vehicle to move in a somewhat controlled manner relative to one another. Generally, the plurality of spring elements function to accommodate forces and loads associated with the operation and use of the vehicle, and the plurality of damping devices are operative to dissipate undesired inputs and movements of the vehicle, particularly during dynamic operation thereof. Movement of the sprung and unsprung masses toward one another is normally referred to in the art as jounce motion while movement of the sprung and unsprung masses away from one another is commonly referred to in the art as rebound motion.

In some cases, a vehicle or other installation, such as has been referred to above, can include a suspension system with components and/or assemblies that are selectively deployable, such as by being capable of selective extension and retraction relative to an associated sprung or unsprung mass. In many cases, such selectively deployable assemblies take the form of axle and wheel sets that are commonly referred to as lift axles. Non-limiting examples of vehicles that can include one or more selectively deployable axle and wheel sets can include over-the-road tractors, over-the-road trailers, dump trucks and concrete mixing trucks. In some cases, such axle and wheel sets can be selectively deployed by a vehicle operator, such as to provide additional support to the body by engaging the wheels with the road surface and thereby increase the load capacity of the vehicle or redistribute the weight or load on the truck or trailer.

A variety of suspension systems have been devised and are commonly used to operatively connect an unsprung mass (e.g., a lift axle) to a sprung mass (e.g., a truck or trailer body). Commonly, selectively actuatable suspension systems include one or more springs that bias the lift axle into an extended position under in a deployed condition of the suspension system. In many cases, known suspension systems also include one or more dampers that are operative in the deployed condition of the lift axle and act to dissipate energy associated with undesired inputs and movements of the sprung mass, such as road inputs occurring under dynamic operation of a vehicle, for example. Typically, such dampers are liquid filled and operatively connected between the sprung and unsprung masses, such as between the truck or trailer body and the lift axle, for example. One example of such damping components are conventional shock absorbers that are commonly used in vehicle suspension systems.

One disadvantage of known constructions is that the one or more dampers that are operatively connected between the sprung and unsprung masses are often used only in deployed conditions of the selectively actuatable suspension system. As described above, in a deployed condition, the one or more dampers act to dissipate kinetic energy acting on the vehicle or other installation. In a retracted condition, however, the one or more dampers may be collapsed into a non-functioning condition and, thus, represent added weight that can reduce the transportable payload of an associated vehicle.

Additionally, it will be appreciated that conventional constructions typically include primary springs that function to actuate the suspension system into a deployed condition and also provide the primary biasing or spring force for the suspension system in the deployed condition. In many cases, known suspension systems are constructed such that the primary springs are largely incapable of lifting or otherwise retracting the lift axle or other unsprung mass from the deployed position into a storage condition. As such, conventional constructions commonly include one or more secondary springs that are selectively actuatable to retract the suspension system from a deployed condition. In addition to the added weight of the secondary springs and the associated components, such secondary springs can contribute to increased costs, added maintenance, increased space usage and/or other disadvantageous characteristics of conventional suspension systems that include selectively deployable components and/or assemblies.

Notwithstanding the widespread usage and overall success of conventional suspension systems that are known in the art, it is believed that a need exists to meet these and/or other competing goals while still retaining comparable or improved performance, ease of manufacture, ease of assembly, ease of installation, reduced cost of manufacture and/or otherwise advancing the art of suspension systems.

BRIEF DESCRIPTION

One example of a gas spring and gas damper assembly in accordance with the subject matter of the present disclosure can include a flexible spring member having a longitudinal axis and including a flexible wall extending longitudinally between first and second ends as well as peripherally about the axis to at least partially define a spring chamber. A first end member can be operatively secured to the first end of the flexible spring member such that a substantially fluid-tight seal is formed therebetween. A second end member can be disposed in spaced relation to the first end member and operatively secured to the second end of the flexible spring member such that a substantially fluid-tight seal is formed therebetween. The second end member can include an end member wall that at least partially defines a damping chamber within the second end member. A damper piston assembly can include a damper piston and an elongated damper rod operatively connected to the damper piston. The damper piston can be positioned within the damping chamber and can separate the piston chamber into first and second chamber portions. A pneumatically-actuated control device can be disposed in fluid communication with one of the first and second chamber portions. The pneumatically-actuated control device can be displaceable between a first operative condition in which the gas spring and gas damper assembly has spring and damper functionality and a second operative condition in which the gas spring and gas damper assembly has actuator functionality.

One example of a suspension system in accordance with the subject matter of the present disclosure can include at least one gas spring and gas damper assembly according to the foregoing paragraph. A pressurized gas system can be disposed in fluid communication with at least the pneumatically-actuated control device of one or more of the gas spring and gas damper assemblies. A control system can be communicatively coupled with at least the pressurized gas system. The control system can be operative to selectively operate the pressurized gas system between a first fluid communication condition in which the pneumatically-actuated control device is disposed in the first operative condition and a second fluid communication condition in which the pneumatically-actuated control device is disposed in the second operative condition.

One example of a method of operating a suspension system in accordance with the subject matter of the present disclosure can include providing a suspension system that includes at least one gas spring and gas damper assembly according to the above paragraph as well as a pressurized gas system disposed in fluid communication with the at least the pneumatically-actuated control device of the gas spring and gas damper assembly. The method can also include communicating pressurized gas to the pneumatically-actuated control device thereby transitioning the assembly from the first operative condition to the second operative condition. The method can further include maintaining the assembly in the second operative condition for an indeterminate period of time. The method can further include communicating pressurized gas to the pneumatically-actuated control device thereby transitioning the assembly from the second operative condition to the first operative condition.

DETAILED DESCRIPTION

Turning now to the drawings, it is to be understood that the showings are for purposes of illustrating examples of the subject matter of the present disclosure and that the examples shown are not intended to be limiting. Additionally, it will be appreciated that the drawings are not to scale and that portions of certain features and/or elements may be exaggerated for purpose of clarity and ease of understanding.

Figure 1:
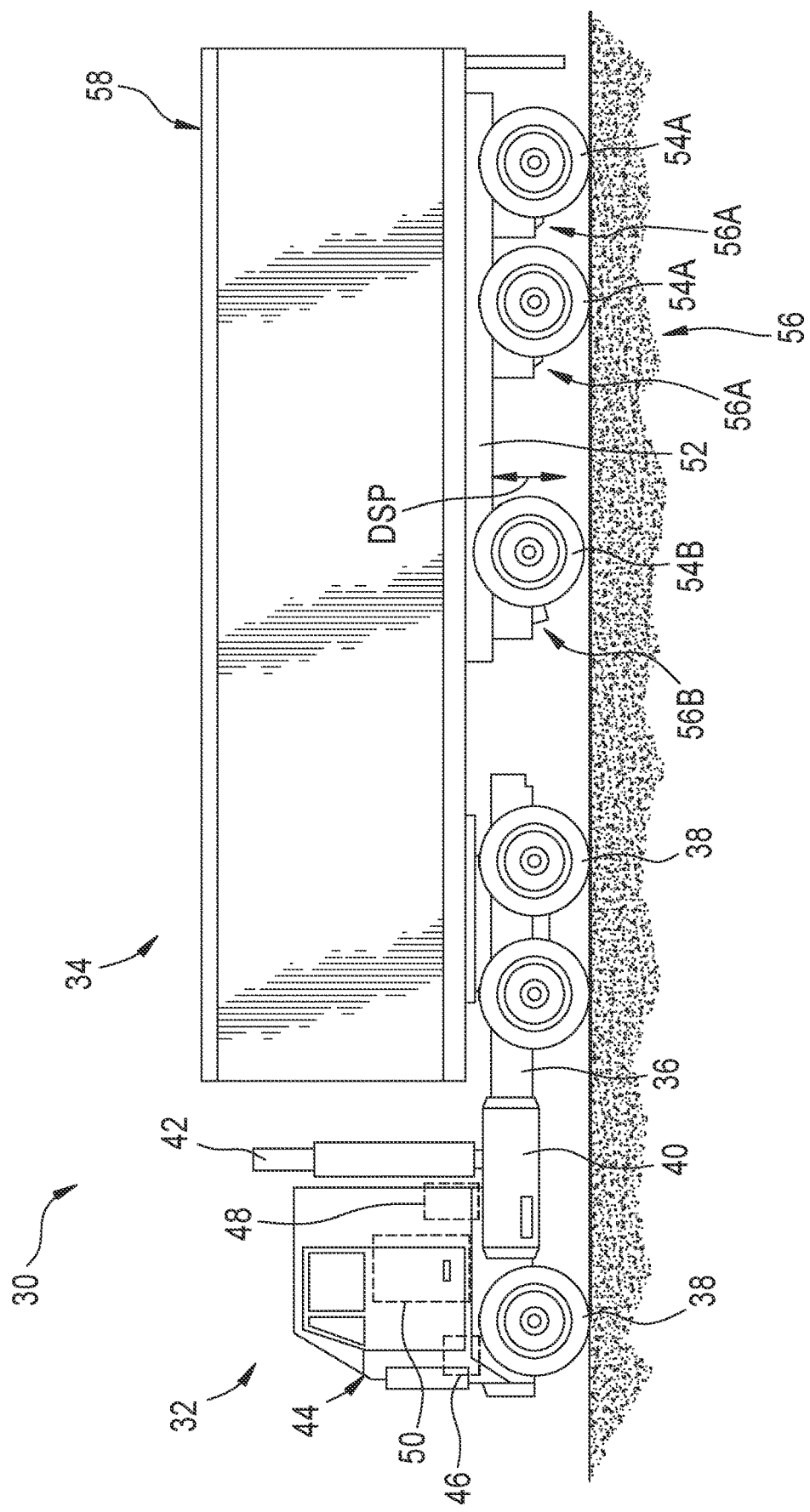
FIG. 1 is a schematic representation of one example of a vehicle that includes one or more suspension systems in accordance with the subject matter of the present disclosure.

With reference to FIG. 1, a vehicle 30 is shown as taking the form of a tractor-trailer combination that includes an over-the-road tractor 32 and a trailer 34 that is operatively connected to the tractor for over-the-road transport. Tractor 32 is shown as including a frame 36 that is supported on a plurality of wheels 38 by a tractor suspension system (not shown). Tractor 32 will typically also include an internal combustion engine (not shown) and drivetrain (not shown) that are supported on the frame and provide motive power to one or more of wheels 38. Tractor 32 can include a fuel tank 40 and an exhaust stack 42 that are operatively associated with the engine.

Figure 2:
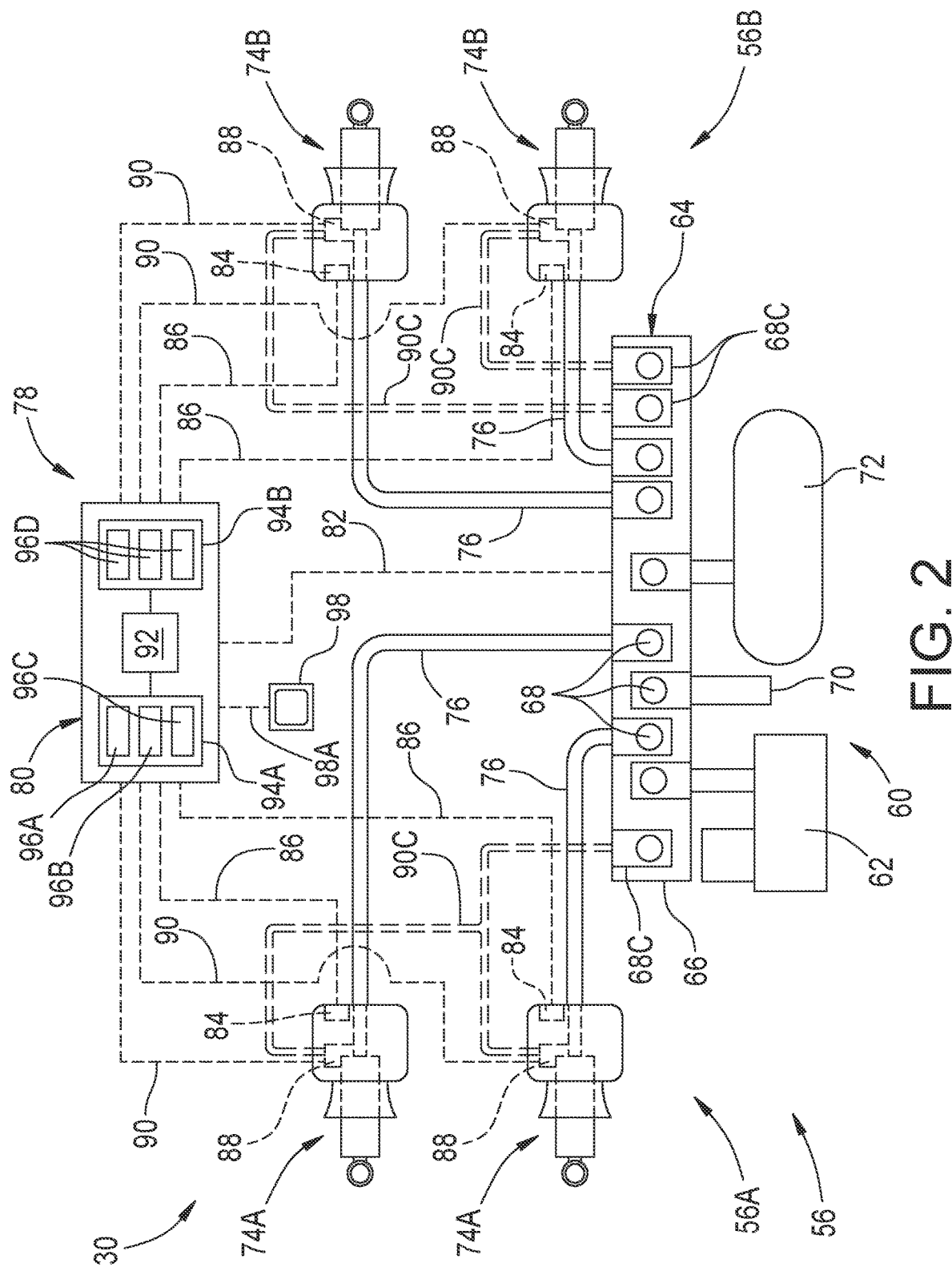
FIG. 2 is a greatly simplified schematic representation of one example of a pressurized gas system and a control system adapted for operative association with a suspension system in accordance with the subject matter of the present disclosure.
Figure 3:
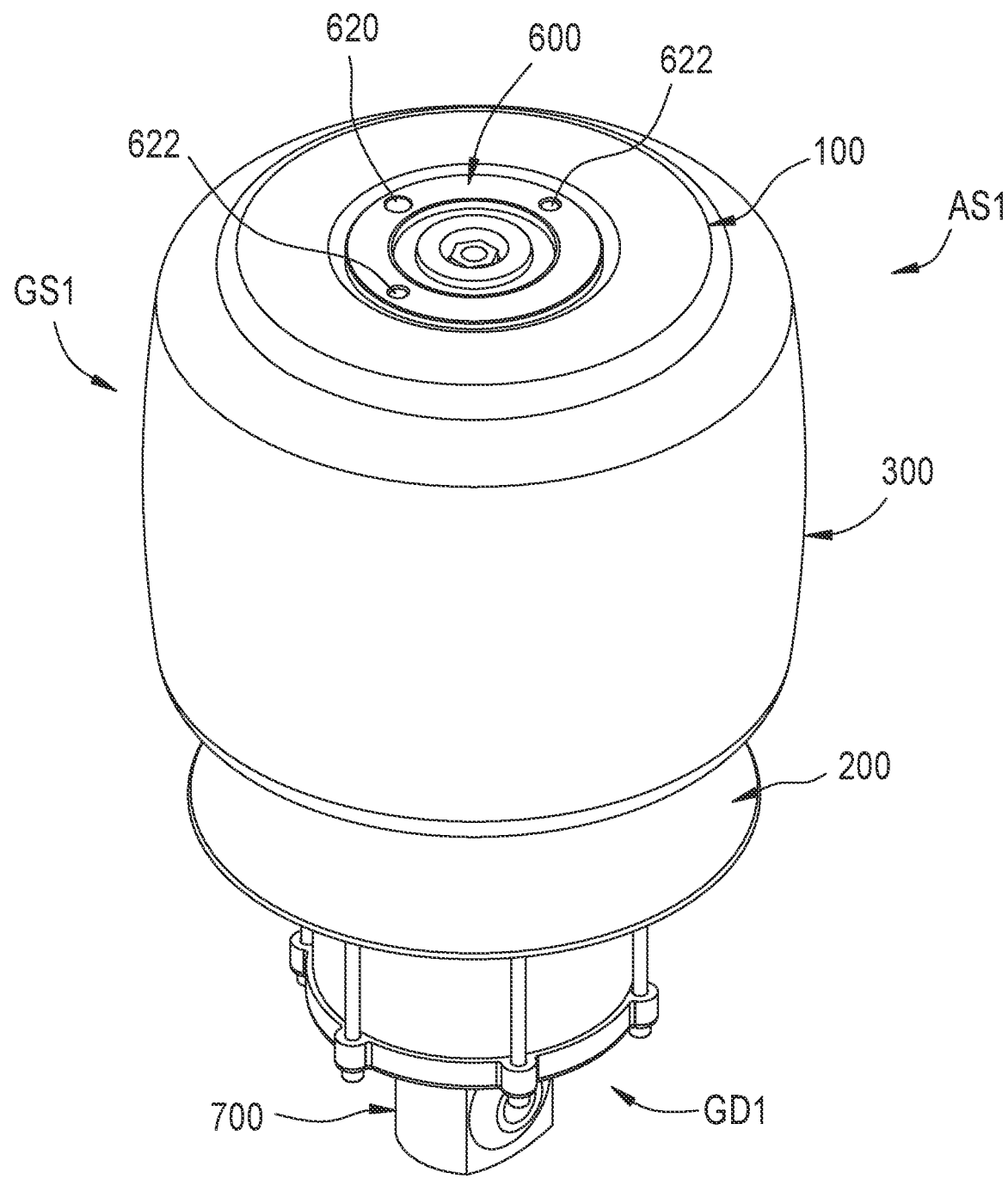
FIG. 3 is a top perspective view of one example of a gas spring and gas damper assembly adapted for use in operative association with a suspension system in accordance with the subject matter of the present disclosure.
Figure 4:
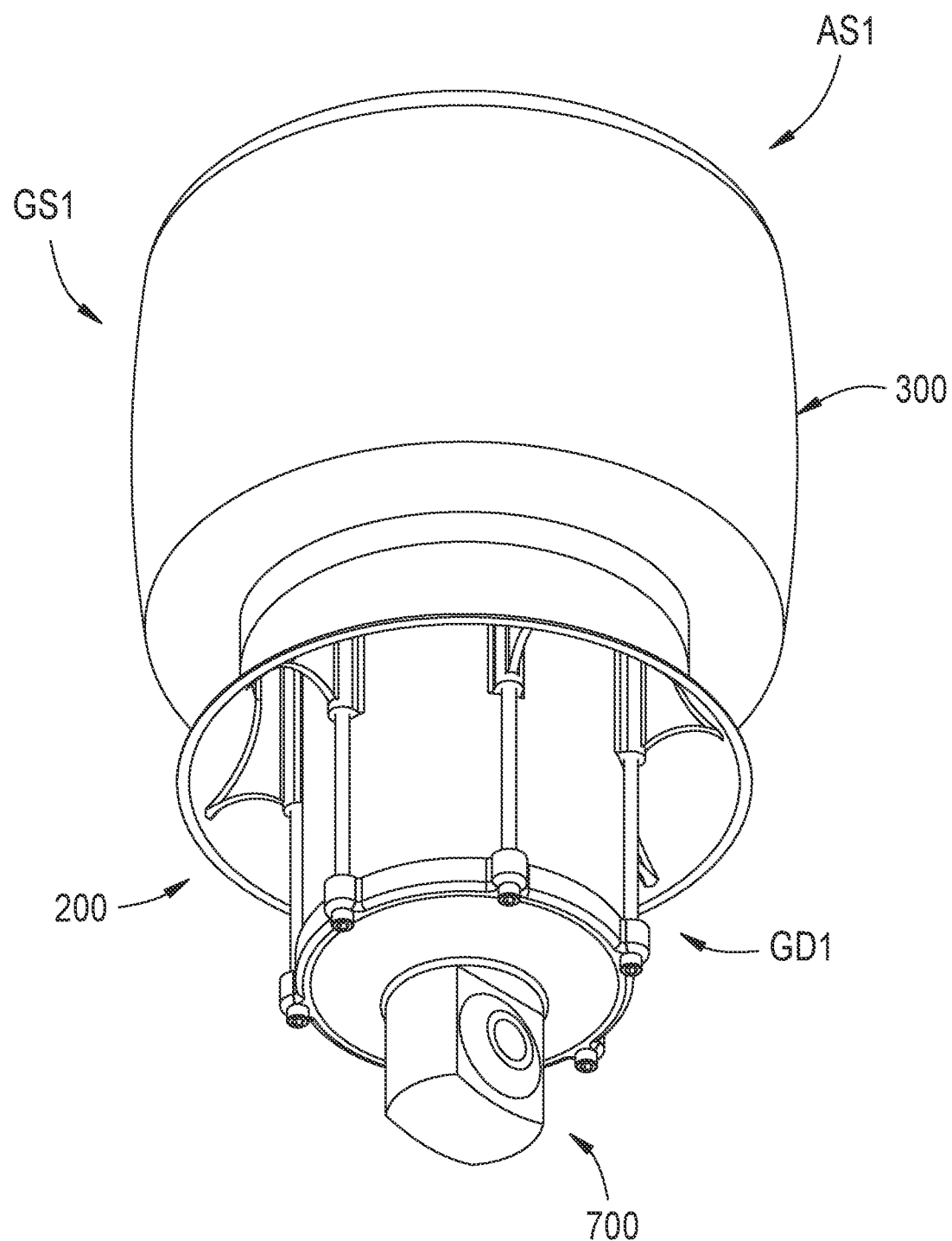
FIG. 4 is a bottom perspective view of the exemplary gas spring and gas damper assembly in FIG. 3.

Tractor 32 can also include a passenger compartment or cab 44 that can be supported on or along frame 36 in any suitable manner, such as by way of one or more cab mounts and/or one or more cab suspensions, which are respectively represented in FIG. 1 by dashed boxes 46 and 48. Typically, a cab, such as cab 44, for example, will also include one or more seats supported within the cab for use by an operator and, in some cases, one or more passengers, such as is represented in FIG. 1 by dashed box 50, for example. Trailer 34 is shown as including a frame 52 that is supported on a plurality of wheels 54A by a trailer suspension system 56. Trailer 34 can also include a trailer body 58 that is at least partially supported on frame 52 and is generally dimensioned to receive and retain a quantity of cargo. In some cases, the trailer (or other vehicle) can include two or more suspension systems, such as one or more primary (or permanently deployed) suspension systems and one or more secondary or selectively actuatable suspension systems. In other cases, trailer suspension system 56 can include two or more portions that are fluidically interconnected, communicatively coupled or otherwise operatively associated with one another. As shown in FIGS. 1 and 2, for example, trailer suspension system 56 can include one or more primary (or permanently deployed) portions, such as are represented by item numbers 56A and one or more secondary or selectively deployable portions, such as are represented in FIGS. 1 and 2 by item numbers 56B, for example. It will be appreciated that the secondary or selectively deployable portions of the suspension system can be displaced between extended and retracted positions, such as are represented in FIG. 1 by arrow DSP, for example.

It will be appreciated that numerous components and/or systems of vehicle 30 can utilize pressurized gas (e.g., air) as a power source for the operation thereof. As non-limiting examples, such components and/or systems can include a tractor suspension system, a tractor braking system, a cab suspension, a trailer suspension system and/or a trailer braking system. One greatly-simplified example of a pressurized gas system 60 that can be operatively associated with one or more of the components and/or systems of vehicle 30 is shown in FIG. 2. Pressurized gas system 60 can be operatively associated with one or more components and/or systems of the vehicle in any suitable manner for selectively supplying pressurized gas (e.g., air) thereto and selectively transferring pressurized gas therefrom.

In the exemplary embodiment shown in FIG. 2, pressurized gas system 60 includes a pressurized gas source, such as a compressor 62, for example, for generating pressurized air or other gases. A control device, such as a valve assembly 64, for example, is shown as being in communication with compressor 62 and can be of any suitable configuration or arrangement. In the exemplary embodiment shown, valve assembly 64 includes a valve block 66 with a plurality of valves 68 supported thereon. Valve assembly 64 can also, optionally, include a suitable exhaust, such as a muffler 70, for example, for venting pressurized gas from the system. Pressurized gas system 60 can also include a reservoir 72, which is shown as being in fluid communication with the compressor and/or the valve assembly and suitable for storing pressurized gas.

In some cases, the tractor suspension system and/or the trailer suspension system can include one or more gas spring and gas damper assemblies, such as, for example, gas spring and gas damper assemblies 74A operatively associated with suspension system portion 56A and/or gas spring and gas damper assemblies 74B operatively associated with suspension system portion 56B. In the arrangement shown in FIG. 2, valve assembly 64 is in communication with the gas spring and gas damper assemblies through gas transfer lines 76. As such, pressurized gas can be selectively transferred into and/or out of the gas spring and gas damper assemblies through valve assembly 64 by selectively operating valves 68.

Vehicle 30 can also include a control system 78 that is capable of communication with any one or more systems and/or components (e.g., cab mounts 46, cab suspensions 48, seat suspensions 50, suspension system portions 56A and/or 56B of suspension system 56 and/or pressurized gas system 60) of vehicle 30, such as for selective operation and/or control thereof. Control system 78 can include a controller or electronic control unit (ECU) 80 communicatively coupled with any one or more components of suspension system 56 (e.g., one or more of gas spring and gas damper assemblies 74A and/or 74B) and/or pressurized gas system 60 (e.g., compressor 62 and/or valve assembly 64). If provided, it will be appreciated that the controller can be communicatively coupled with any one or more of such systems and/or components in any suitable manner. As one example, ECU 80 can be communicatively coupled with pressurized gas system 60 by way of a conductor or lead 82, for example, for selective operation and control thereof, which can include supplying and exhausting pressurized gas to and/or from the pressurized gas system.

Control system 78 can also, optionally, include one or more height (or distance) sensing devices 84 (see also FIGS. 7 and 14), such as, for example, may be operatively associated with gas spring and gas damper assemblies 74A and/or 74B, and capable of outputting or otherwise generating data, signals and/or other communications having a relation to a height of the assemblies or a distance between other components of the vehicle. Such height sensing devices can be in communication with ECU 80, which can receive the height or distance signals, data and/or information therefrom. The height sensing devices can be in communication with ECU 80 in any suitable manner, such as through conductors or leads 86 (see also FIGS. 7 and 14), for example. Additionally, it will be appreciated that the height sensing devices can be of any suitable type, kind and/or construction.

In some cases, control system 78 can also include one or more control devices that are selectively actuatable to permit and restrict pressurized gas flow between two or more chambers within one or more of the gas spring and gas damper assemblies (e.g., gas spring and gas damper assemblies 74A and/or 74B). As shown in FIG. 2, for example, gas spring and gas damper assemblies 74A and 74B include one or more control device assemblies (or valves) 88 that are disposed in fluid communication between two or more chambers internal to assemblies 74A and 74B. While shown as being disposed internal to assemblies 74A and 74B, it will be appreciated that such control devices can be disposed in fluid communication between the two or more chambers in any suitable manner, and that other configurations and/or arrangements could alternately be used without departing from the subject matter of the present disclosure.

Additionally, it will be appreciated that such control devices can be in communication with the controller in any suitable manner. As one example, control device assemblies 88 can be electrically actuated, and ECU 80 can be in communicatively coupled with control device assemblies 88 through conductors or leads 90, for example. As another example, control device assemblies 88 can be pneumatically actuated, such as through the communication or transfer of pressurized gas to and from control device assemblies 88 by way of pressurized gas lines 90C, for example. In such cases, pressurized gas system 60 can include one or more control devices that are disposed in fluid communication between a pressurized gas source and control device assemblies 88. As an example of a suitable construction, valve assembly 64 can include one or more valves 68C that are operatively supported on valve block 66 and communicatively coupled with ECU 80 for selective operation and control thereof. Pressurized gas lines 90C can extend between and/or otherwise fluidically connect valves 68C and control device assemblies 88. In such an arrangement, selective operation of valves 68C can result in pressurized gas being selectively communicated to control device assemblies 88 to thereby maintain one or more of control device assemblies 88 in one of at least two operative conditions and/or transition one or more of control device assemblies 88 from one of at least two operative conditions to another one of at least two operative conditions. In some cases, pneumatic communication with control device assemblies 88 can take the form of temporary or short term gas pressure increases or decreases that induce a transition of one or more of control device assemblies 88 from one of at least two operative conditions to another of at least two operative conditions. In other cases, control device assemblies 88 can be normally biased into or otherwise naturally reside one of the at least two operative conditions. In such cases, pneumatic communication can take the form of gas pressure increases or decreases of an indeterminate length that induce a transition of one or more of control device assemblies 88 from the one of the at least to two operative conditions toward and/or into a second one of at least two operative conditions. In such cases, gas pressure can be maintained at an increased or decreased level for as long as the one or more of control device assemblies 88 are to be maintained in the second operative condition. Subsequently operating one or more of valves 68C to respectively decrease or increase gas pressure can then allow the one or more of control device assemblies 88 to return or otherwise transition to the first or another, alternate operative condition.

Furthermore, a suitable control system, such as control system 78, for example, can be utilized to operate the foregoing and other systems and/or components of the vehicle and/or the suspension system, each in a suitable manner. As one example, the systems and/or components could be under direct supervision and control by controller 80, as is illustrated in FIG. 2. Alternately, the control system could optionally include one or more electronic control units that are respectively associated with individual systems and/or components. Such one or more ECUs, if provided, can be in communication with the controller and at least partially supervise and/or control the respective components and/or systems with which the ECU or ECUs are associated.

As mentioned above, the control system, such as control system 78, for example, can include a processing device, which can be of any suitable type, kind and/or configuration, such as a microprocessor, for example, for processing data, executing software routines/programs, and other functions relating to the performance and/or operation of the systems and/or components of the vehicle (e.g., cab mounts 46, cab suspensions 48, seat suspensions 50, suspension system portions 56A and/or 56B of suspension system 56 and/or pressurized gas system 60). Additionally, the control system (e.g., control system 78) can include a storage device or memory, which can be of any suitable type, kind and/or configuration that can be used to store data, values, settings, parameters, inputs, software, algorithms, routines, programs and/or other information or content for any associated use or function, such as use in association with the performance and/or operation of the system and/or components of the vehicle and/or suspension system, and/or communication with a user or operator, for example.

In the embodiment shown in FIG. 2, controller 80 includes a microprocessor 92 and a storage device or memory, which is represented in FIG. 2 by boxes 94A and 94B. In the embodiment shown, one or more modules, such as may be described hereinafter, can be implemented as software stored within memory 94A and 94B. Thus, microprocessor 92 can access memory stores 94A and 94B to retrieve and execute any one or more software modules, for example. Additionally, data, values, settings, parameters, inputs, software, algorithms, routines, programs and/or other information or content can also be retained within memory 94A and 94B for retrieval by microprocessor 92. It will be appreciated that such software routines can be individually executable routines or portions of a software program, such as an operating system, for example. Additionally, it will be appreciated that the control system, including any controller, processing device and/or memory, can take any suitable form, configuration and/or arrangement, and that the embodiments shown and described herein are merely exemplary. Furthermore, it is to be understood, however, that the modules described herein can be implemented in any suitable manner, including, without limitation, software implementations, hardware implementations or any combination thereof.

As mentioned above, control system 78 can optionally include any suitable number of one or more modules capable of performing one or more functions and/or providing one or more features in accordance with the subject matter of the present disclosure. It will be appreciated that any such one or more modules can include or otherwise utilize any data, values, settings, parameters, inputs, software, algorithms, routines, programs and/or other information or content for any associated use or function, such as use in association with the performance and/or operation of the system and/or components of the vehicle and/or suspension system, and/or communication with a user or operator, for example.

For example, control system 78 can include an actuation module 96A that is capable of receiving, processing, storing and/or otherwise transferring data, information, signals and/or communications relating to the transition of a gas spring and gas damper assembly (e.g., one or more of assemblies 74B) to, from and/or otherwise between an actuator function and a spring and damper function. As non-limiting examples, such actions may be suitable for use in transitioning secondary suspension system portion 56B from a first operative condition (e.g., a deployed condition with the assemblies having spring and damper functionality) toward a second operative condition (e.g., a retracted condition with the assemblies having actuator functionality). As another example, control system 78 can include a deployment or de-actuation module 96B that is capable of receiving, processing, storing and/or otherwise transferring data, information, signals and/or communications relating to the transition of a gas spring and gas damper assembly (e.g., assemblies 74B) from an actuator function to a spring and damper function. As non-limiting examples, such actions may be suitable for use in transitioning secondary suspension system portion 56B from the second operative condition (e.g., a retracted condition with the assemblies having actuator functionality) toward the first operative condition (e.g., a deployed condition with the assemblies having spring and damper functionality), such as have been described above, for example.

In some cases, actuation and de-actuation of a selectively actuatable suspension system, such as portion 56B, for example, can be performed automatically in relation to load, load distribution and/or other factors associated with a vehicle. In such cases, control system 78 can include an operating module 96C that is capable of receiving, processing, storing and/or otherwise transferring data, information, signals and/or communications relating to the actuation and de-actuation of selectively actuatable suspension systems and/or the transition of gas spring and gas damper assemblies thereof to, from and/or between actuator functionality and spring and damper functionality. Additionally, or in the alternative, control system 78 can include one or more user input components, such as a push button or selector switch 98, through which a user or operator could initiate the actuation and/or de-actuation of the selectively actuatable suspension systems and/or the transition of gas spring and gas damper assemblies thereof to, from and/or between actuator functionality and spring and damper functionality.

It will be appreciated that such user input components can be in communication with the controller in any suitable manner. As one example, ECU 80 can be in communication with push button 98 through a conductor or lead 98A, for example. Furthermore, in some cases, control system 78 can also include one or more other modules 96D of any suitable type, kind and/or functionality, such as may relate to height sensing, pressure sensing and/or features of vehicle 30 and/or the systems and/or components thereof.

It will be appreciated that the tractor suspension system and trailer suspension system 56 (including portions 56A) referred to above represent the primary suspension systems of vehicle 30 by which the sprung masses, such as frame 36, cab 44, frame 52 and trailer body 58, for example, are supported on the unsprung masses of the vehicle, such as one or more axles and wheels 38 and 54A, for example. As mentioned above, a vehicle, such as vehicle 30, for example, can also include one or more secondary or other (i.e., non-primary) suspension systems that provided for increased performance and/or ride quality of the vehicle. Examples of components that can include or can be otherwise connected by way of such a secondary suspension system can include cab mounts 46 and/or cab suspensions 48 that operatively connect cab 44 with frame 36. Another example of components that can include or can be otherwise connected by way of such a secondary suspension system can include seat suspension 50 that operatively connects a seat with cab 44. A further example of components that can include or can be otherwise connected by way of such a secondary suspension system can include wheels 54B that are operatively associated with frame 52 by way of assemblies 74B of portion 56B of suspension system 56. It will be recognized and understood that a suspension system in accordance with the subject matter of the present disclosure may be suitable for use as any one or more of the foregoing and/or other examples of secondary suspension systems for vehicles and/or primary suspension systems in other applications and/or environments of use.

Figure 5:
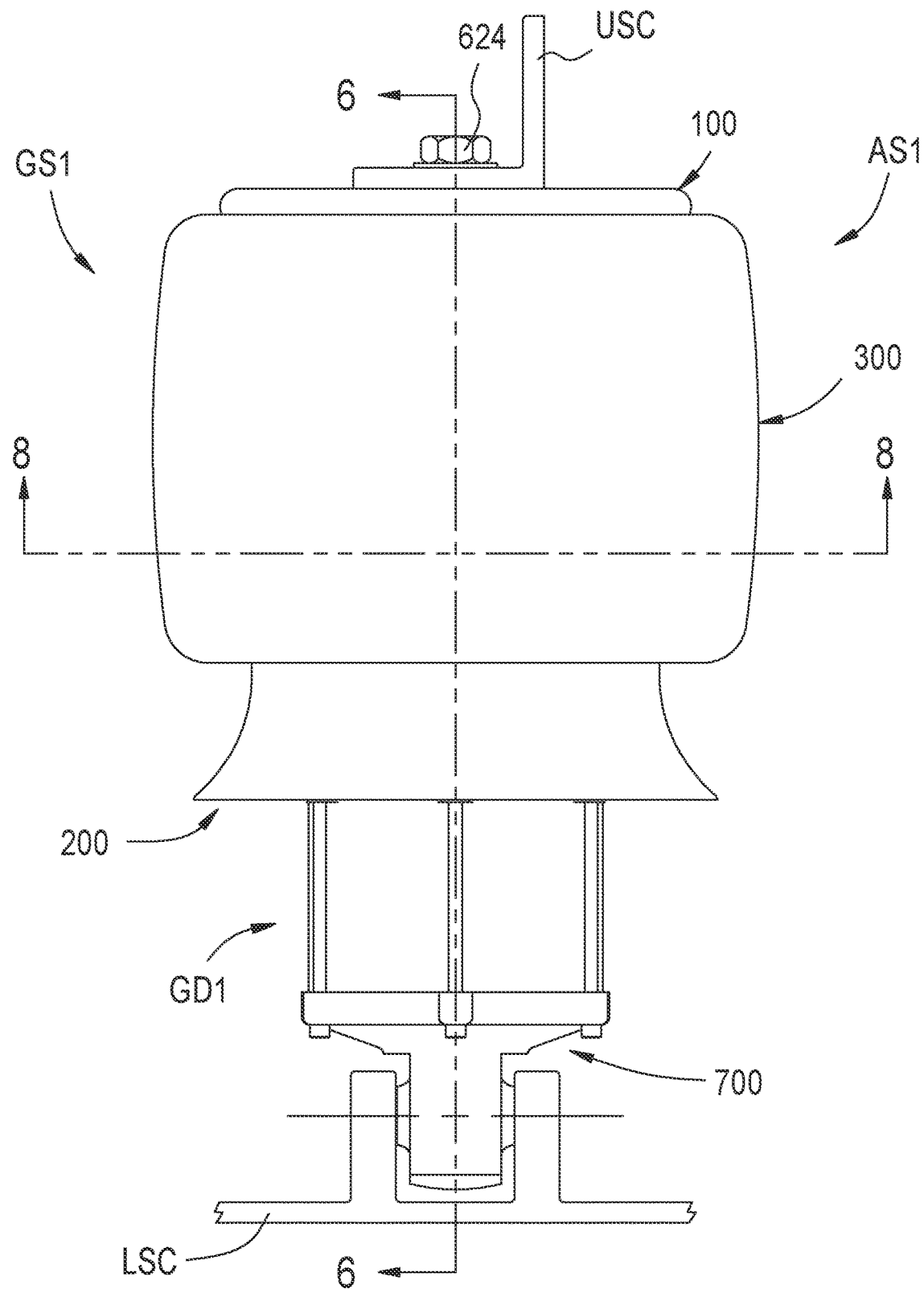
FIG. 5 is a side elevation view of the exemplary gas spring and gas damper assembly in FIGS. 3 and 4.
Figure 6:
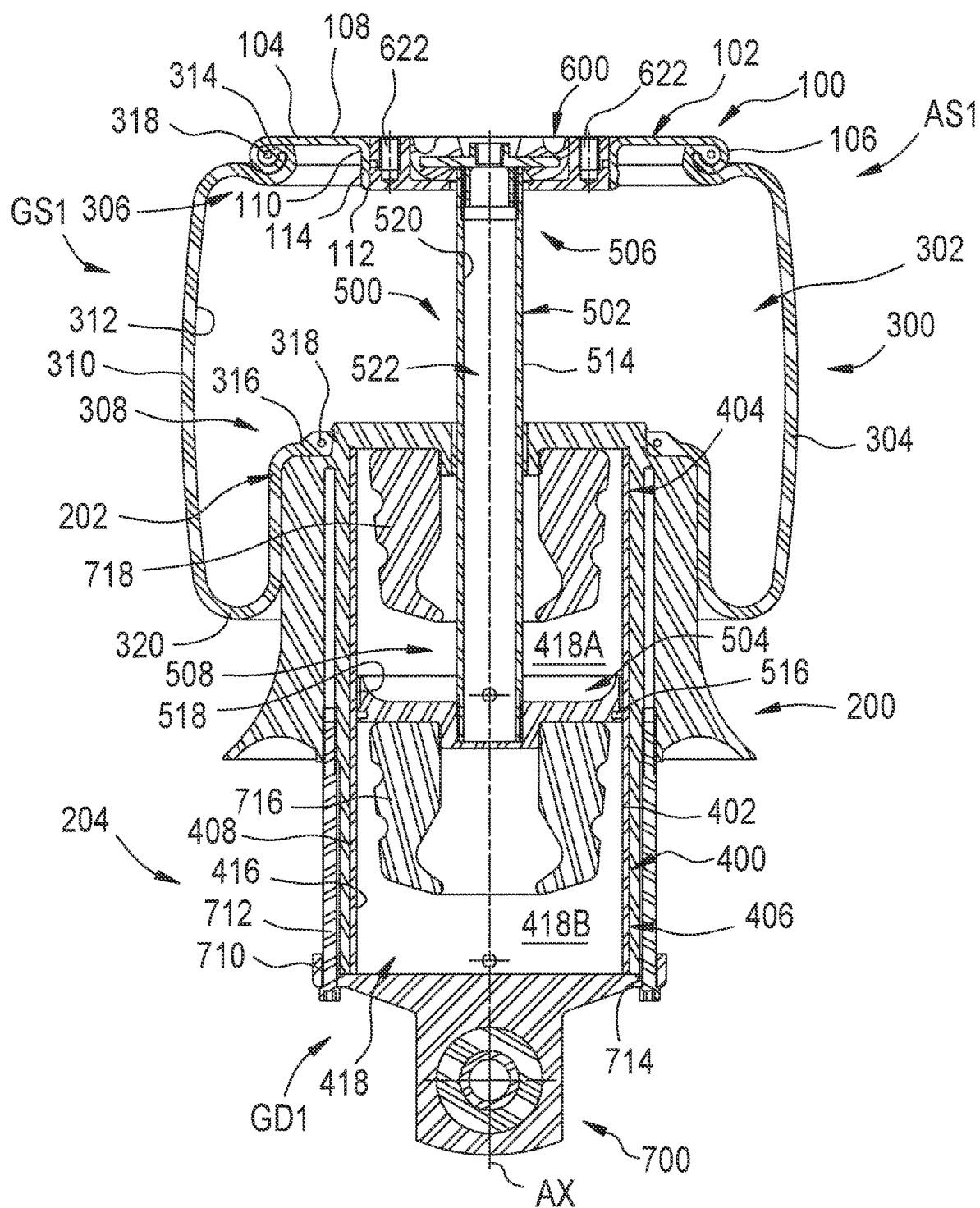
FIG. 6 is a cross-sectional side view of the exemplary gas spring and gas damper assembly in FIGS. 3-5 taken from along line 6-6 in FIG. 5.
Figure 7:
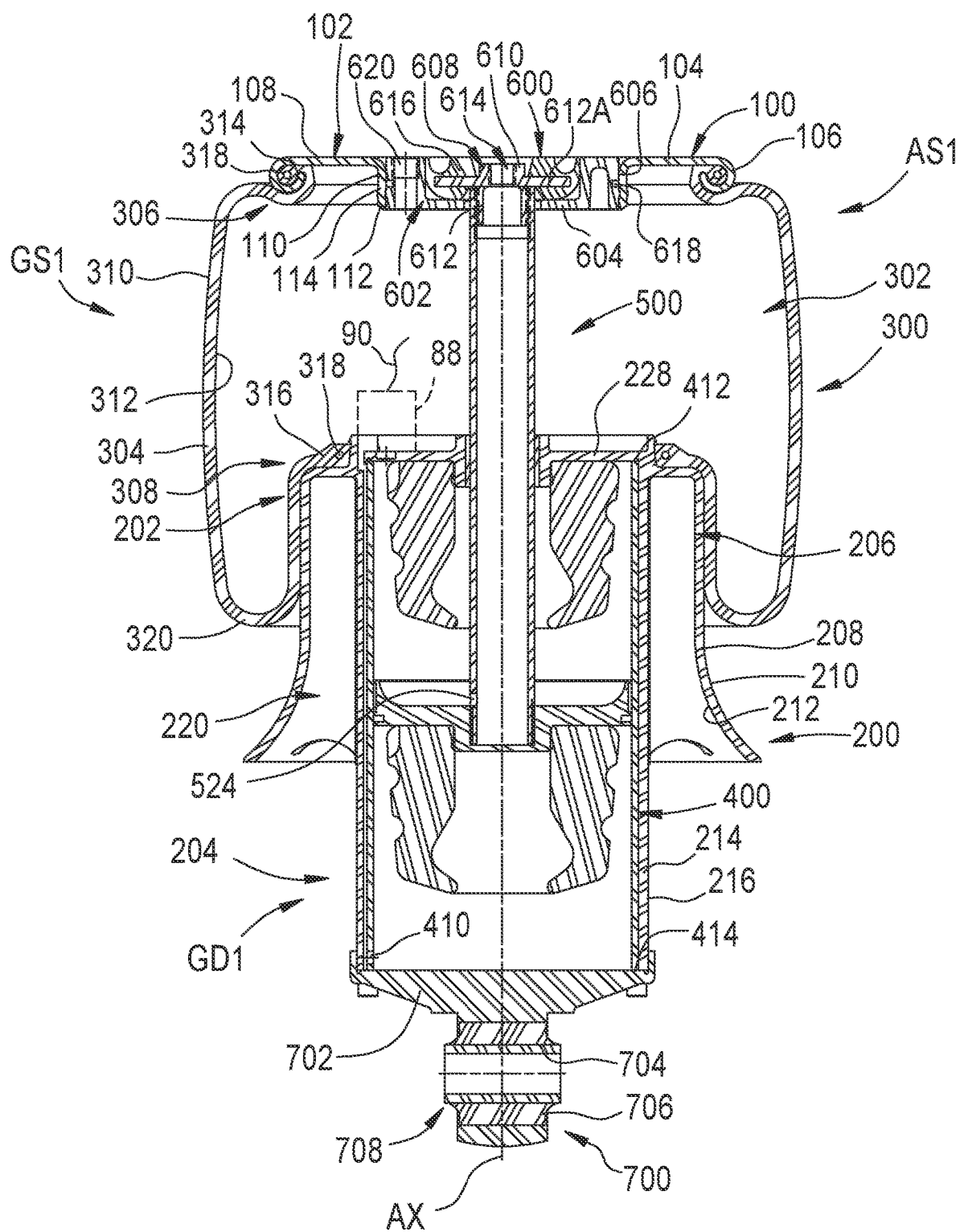
FIG. 7 is a cross-sectional side view of the exemplary gas spring and gas damper assembly in FIGS. 3-6 taken perpendicular to the view in FIG. 6.
Figure 8:
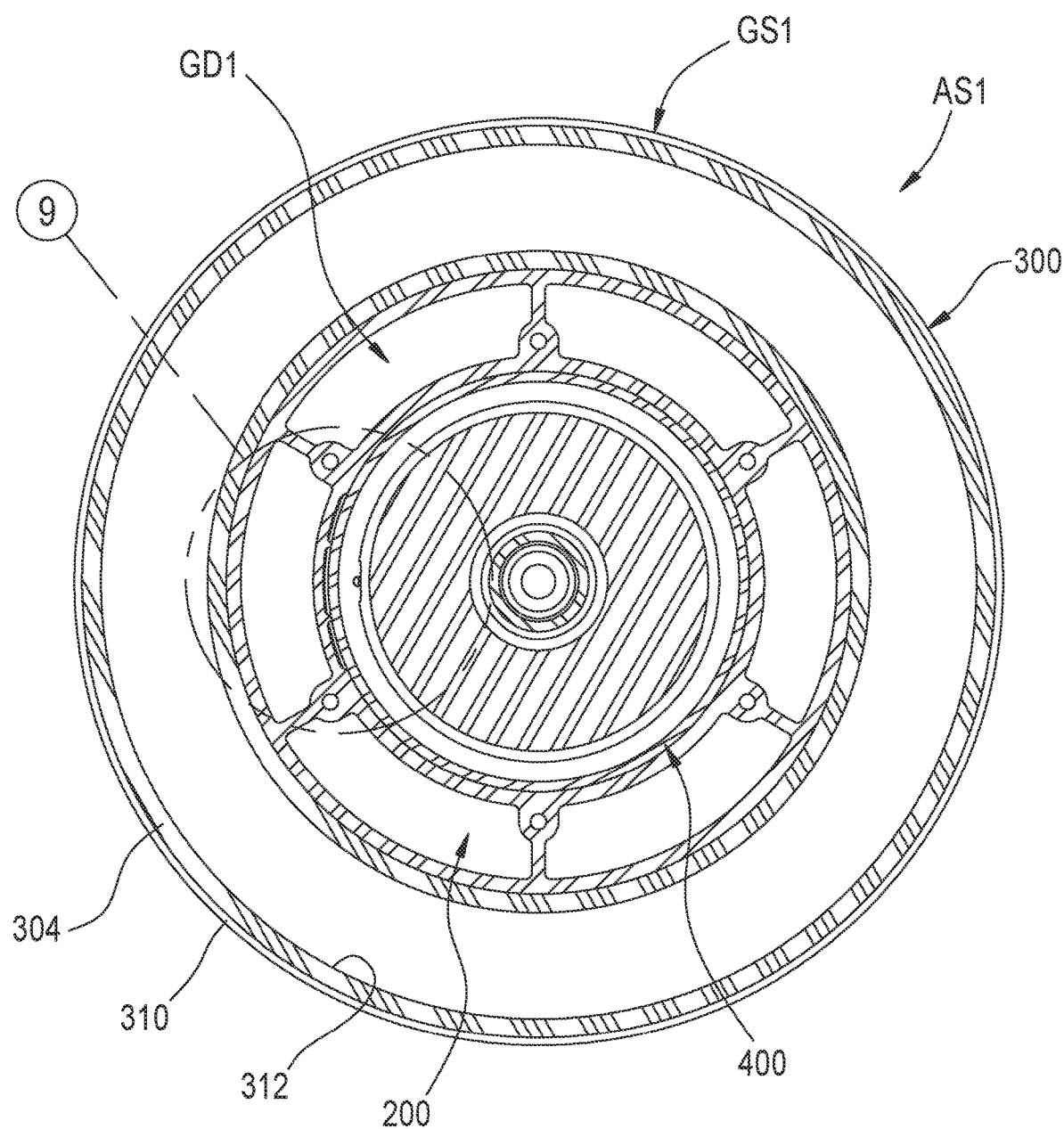
FIG. 8 is a cross-sectional plan view of the exemplary gas spring and gas damper assembly in FIGS. 3-7 taken from along line 8-8 in FIG. 5.
Figure 9:
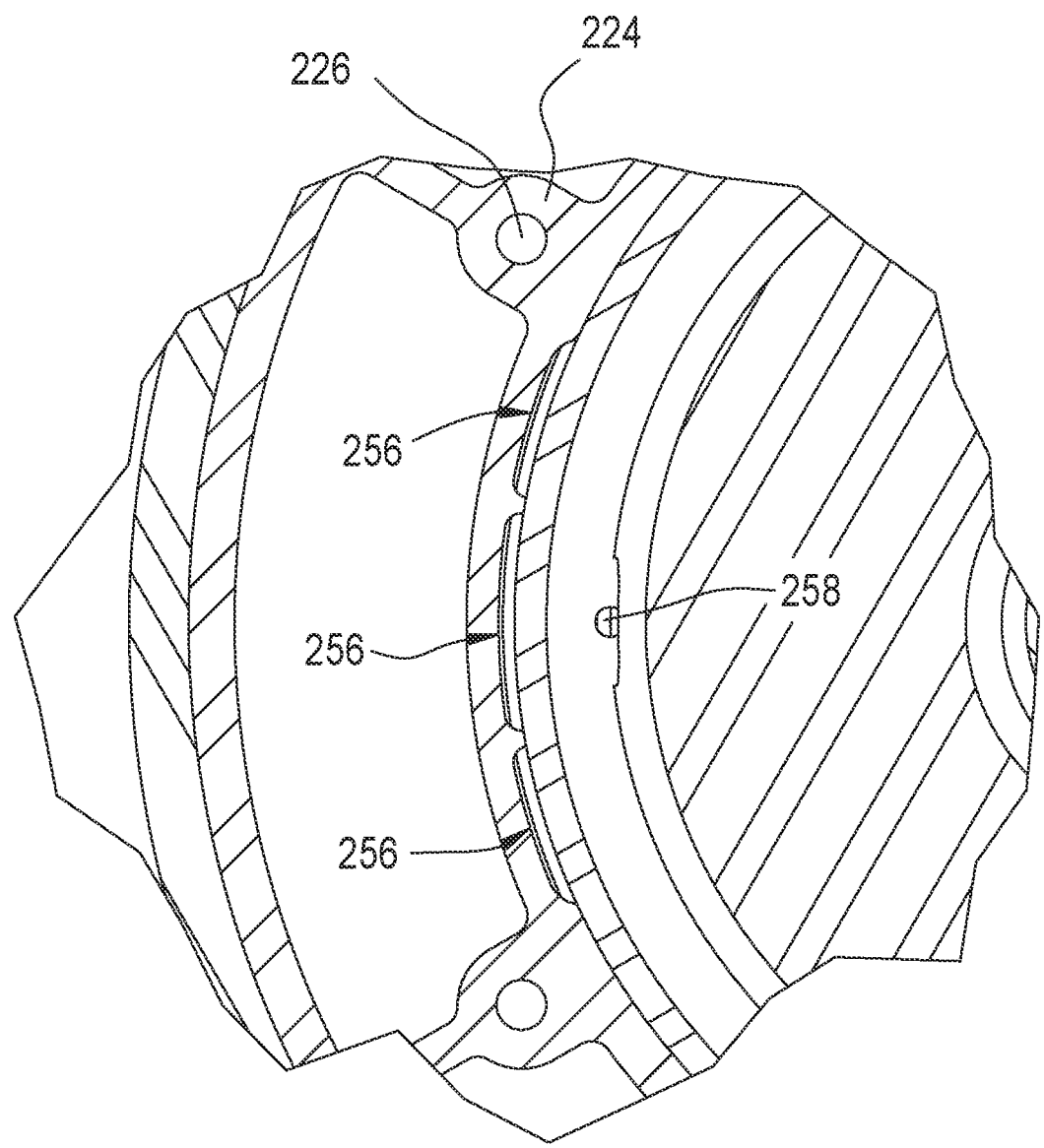
FIG. 9 is a greatly enlarged portion of the exemplary gas spring and gas damper in FIGS. 3-8 identified as Detail 9 in FIG. 8.
Figure 10:
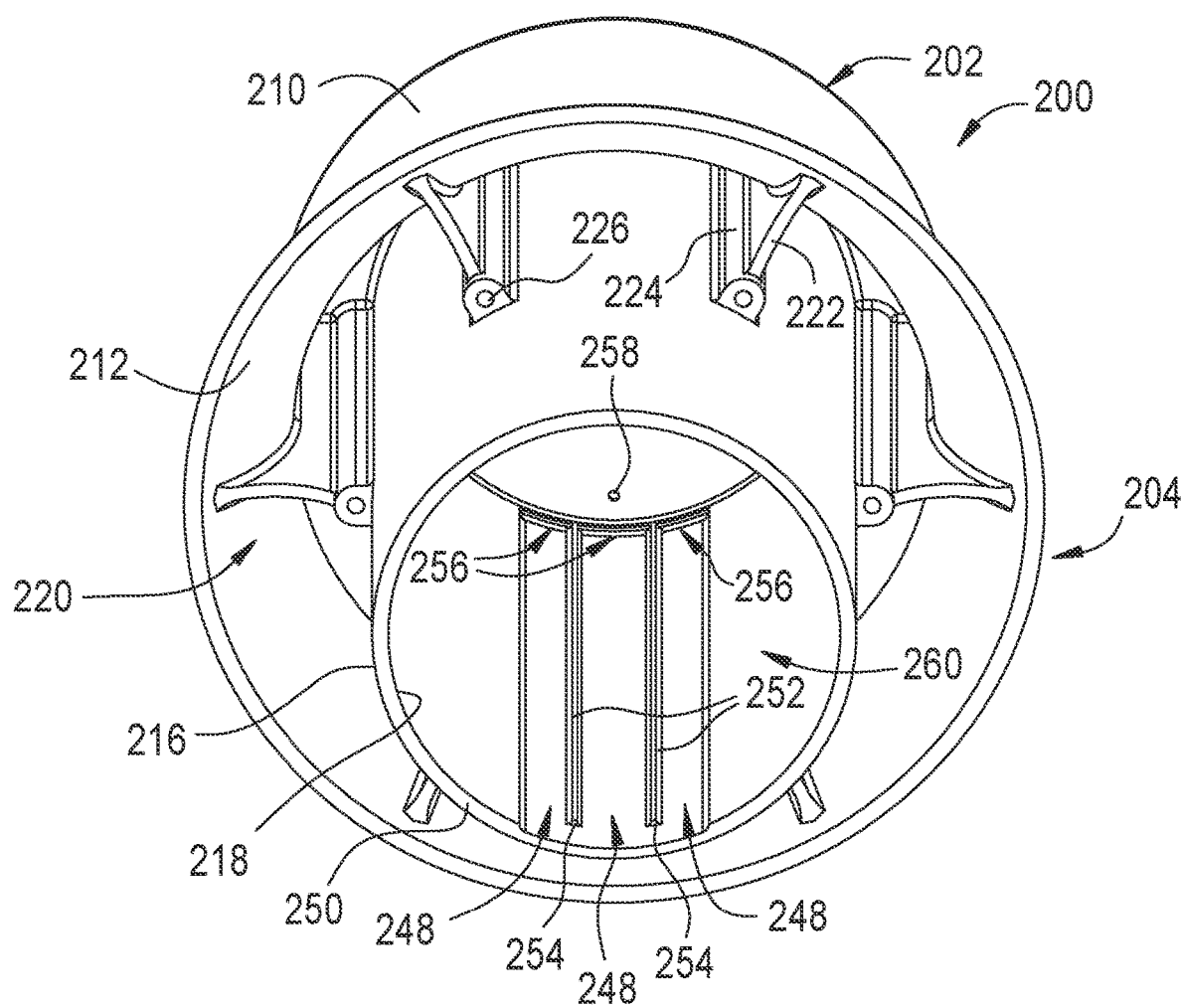
FIG. 10 is a bottom perspective view of the exemplary gas spring end member shown in FIGS. 3-9.
Figure 11:
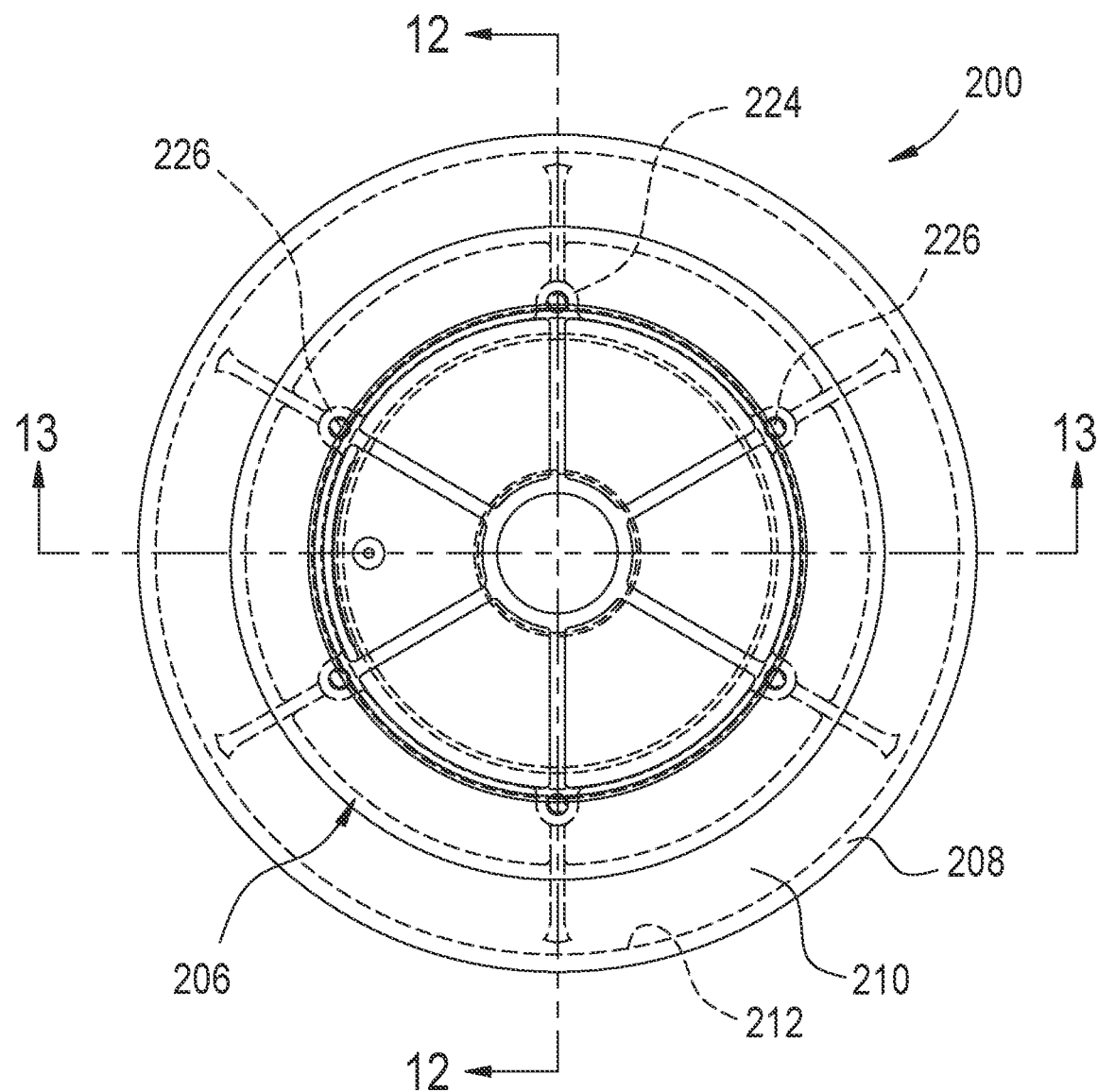
FIG. 11 is a top plan view of the exemplary gas spring end member in FIG. 10.
Figure 12:
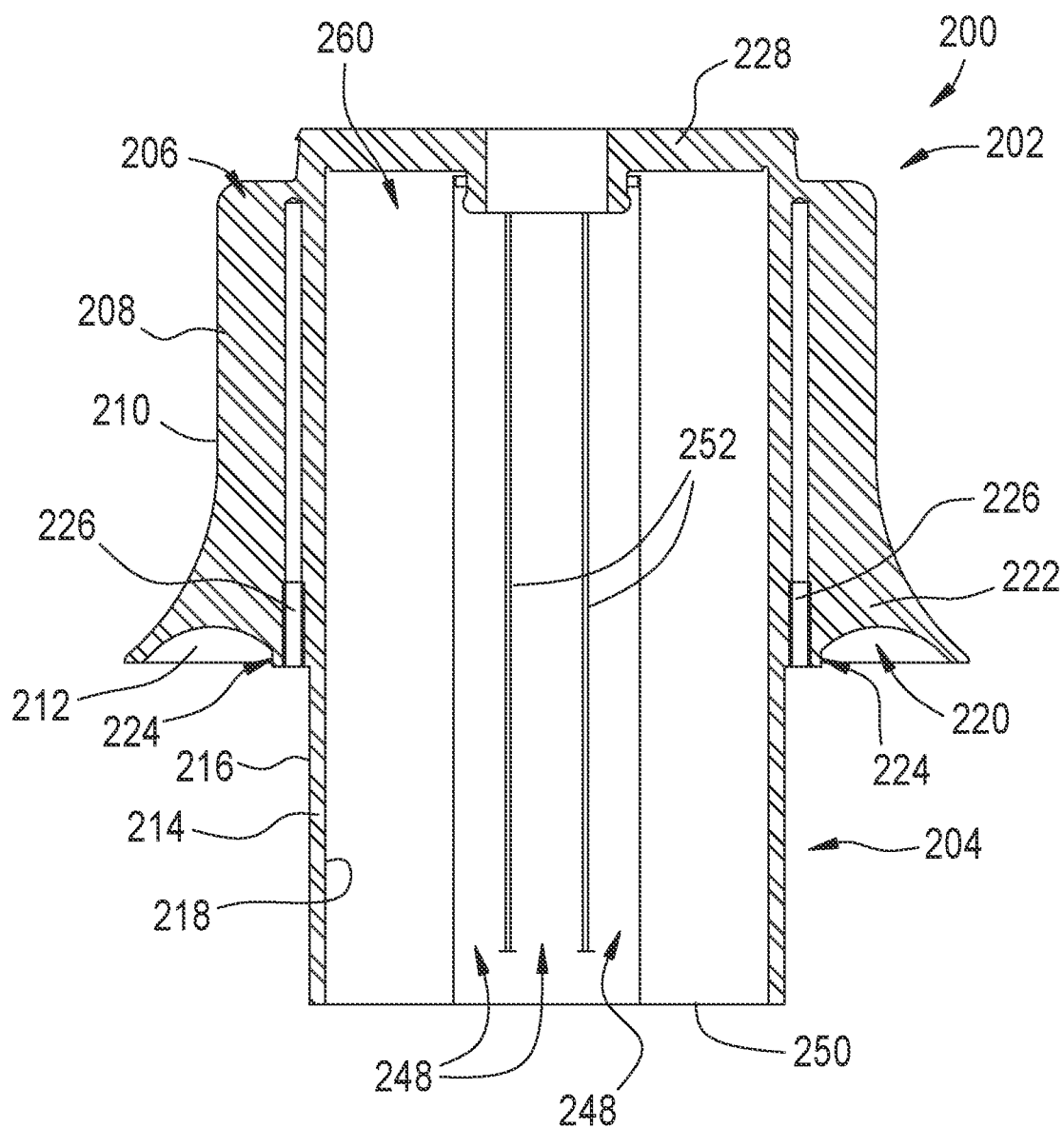
FIG. 12 is a cross-sectional side view of the exemplary gas spring end member in FIGS. 10 and 11 taken from along line 12-12 in FIG. 11.
Figure 13:
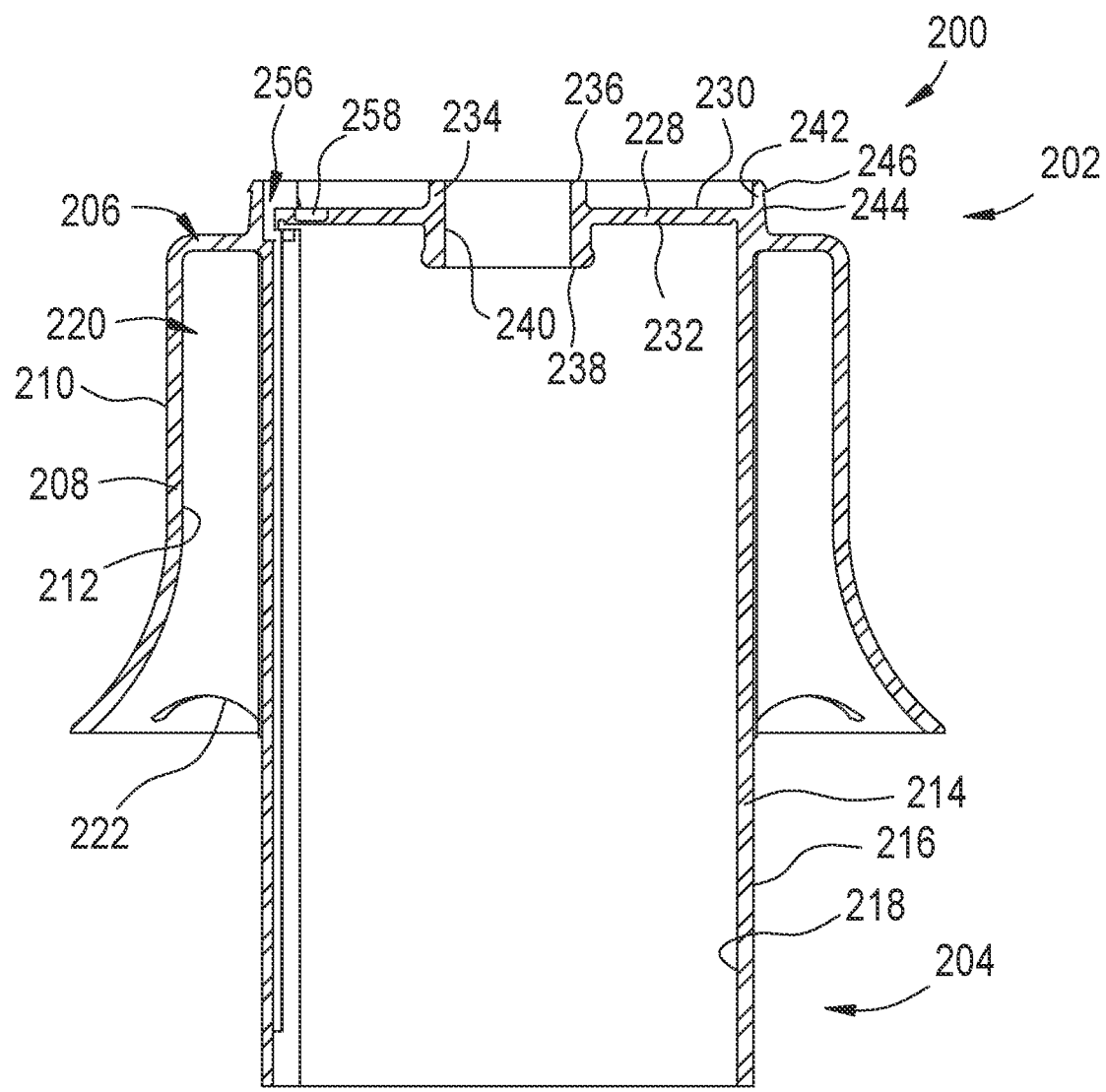
FIG. 13 is a cross-sectional side view of the exemplary gas spring end member in FIGS. 10-12 taken from along line 13-13 in FIG. 11.

Having described an example of a suspension system (e.g., suspension system 30) that can include gas spring and gas damper assemblies in accordance with the subject matter of the present disclosure, one example of such a gas spring and gas damper assembly will now be described in connection with FIGS. 3-9. As shown therein, one example of a gas spring and gas damper assembly AS1, such as may be suitable for use as one or more of gas spring and gas damper assemblies 74A and/or 74B in FIG. 2, for example, is shown as including a gas spring (or gas spring assembly) GS1 and a gas damper (or gas damper assembly) GD1. Gas spring assembly GS1 and gas damper assembly GD1 can be operatively secured to one another and fluidically coupled with one another in any suitable manner, such as is described hereinafter, for example. A longitudinal axis AX extends lengthwise along assembly AS1, as shown in FIGS. 6 and 7.

Gas spring assembly GS1 can include an end member 100 and an end member 200 that is spaced axially from end member 100. A flexible spring member 300 can extend peripherally around axis AX and can be secured between the end members in a substantially fluid-tight manner such that a spring chamber 302 is at least partially defined therebetween. Gas damper assembly GD1 can include an inner sleeve 400 that is operatively supported on or along end member 200 and a damper rod assembly 500 that is operatively associated with inner sleeve 400. An end mount 600 can operatively connect damper rod assembly 500 with end member 100. A base mount 700 can be operatively connected with one or more of end member 200 and/or inner sleeve 400.

Gas spring and gas damper assembly AS1 can be disposed between associated sprung and unsprung masses of an associated vehicle in any suitable manner. For example, one component can be operatively connected to the associated sprung mass with another component disposed toward and operatively connected to the associated unsprung mass. As illustrated in FIG. 5, for example, end member 100 can be secured on or along a first or upper structural component USC, such as associated vehicle frame 36 or 52 in FIG. 1, for example, and can be secured thereto in any suitable manner. Additionally, base mount 700 can be secured on or along a second or lower structural component LSC, such as one of the axles associated with one or more of wheels 38, 54A and/or 54B in FIG. 1, for example.

It will be appreciated that flexible spring member 300 can be of any suitable size, shape, construction and/or configuration. Additionally, the flexible spring member can be of any type and/or kind, such as a rolling lobe-type or convoluted bellows-type construction, for example. Flexible spring member 300 is shown in FIGS. 3-9 as including a flexible wall 304 that can be formed in any suitable manner and from any suitable material or combination of materials. For example the flexible wall can include one or more fabric-reinforced, elastomeric plies or layers and/or one or more un-reinforced, elastomeric plies or layers. Typically, one or more fabric-reinforced, elastomeric plies and one or more un-reinforced, elastomeric plies will be used together and formed from a common elastomeric material, such as a synthetic rubber, a natural rubber or a thermoplastic elastomer. In other cases, however, a combination of two or more different materials, two or more compounds of similar materials, or two or more grades of the same material could be used.

Flexible wall 304 can extend in a generally longitudinal direction between opposing ends 306 and 308. Additionally, flexible wall 304 can include an outer surface 310 and an inner surface 312. The inner surface can at least partially define spring chamber 302 of gas spring assembly GS1. Flexible wall 304 can include an outer or cover ply (not identified) that at least partially forms outer surface 310. Flexible wall 304 can also include an inner or liner ply (not identified) that at least partially forms inner surface 312. In some cases, flexible wall 304 can further include one or more reinforcing plies (not shown) disposed between outer and inner surfaces 310 and 312. The one or more reinforcing plies can be of any suitable construction and/or configuration. For example, the one or more reinforcing plies can include one or more lengths of filament material that are at least partially embedded therein. Additionally, it will be appreciated that the one or more lengths of filament material, if provided, can be oriented in any suitable manner. As one example, the flexible wall can include at least one layer or ply with lengths of filament material oriented at one bias angle and at least one layer or ply with lengths of filament material oriented at an equal but opposite bias angle.

Flexible spring member 300 can include any feature or combination of features suitable for forming a substantially fluid-tight connection with end member 100 and/or end member 200. As one example, flexible spring member 300 can include a mounting bead 314 disposed along end 306 of flexible wall 304 and a mounting bead 316 disposed along end 308 of the flexible wall. In some cases, the mounting bead, if provided, can, optionally, include a reinforcing element, such as an endless, annular bead wire 318, for example.

It will be appreciated that the end members can be of any suitable type, kind, construction and/or configuration, and can be operatively connected or otherwise secured to the flexible spring member in any suitable manner. In the exemplary arrangement shown in FIGS. 3-9, for example, end member 100 is of a type commonly referred to as a bead plate and includes an end member wall 102 with an intermediate wall portion 104 and an outer peripheral wall portion 106. End member 100 is disposed along end 306 of flexible wall 304 with outer peripheral wall portion 106 crimped or otherwise deformed around at least a portion of mounting bead 314 such that a substantially fluid-tight seal can be formed between flexible spring member 300 and end member 100. Intermediate wall portion 104 can have an approximately planar outer surface 108 dimensioned to abuttingly engage an associated structural component (e.g., upper structural component USC).

End member 100 can also include a mounting wall portion 110 disposed radially inward from intermediate wall portion 104. Mounting wall portion 110 can project axially from along intermediate wall portion 104 toward a distal edge 112. Mounting wall portion 110 can at least partially define a passage or opening (not numbered) extending through end member 100. In some cases, one or more engagement features can be formed on or along mounting wall portion 110. It will be appreciated that any such one or more engagement features, if provided, can be of any suitable type, kind and/or configuration. For example, end member 100 is shown in FIGS. 6 and 7 as including an endless, annular groove 114 extending into mounting wall portion 110 adjacent distal edge 112. It will be appreciated, however, that other configurations and/or arrangements could alternately be used, such as an endless, annular ridge, or one or more ridge and/or groove segments, for example.

End member 200 is shown as including features associated with a type of end member commonly referred to as a piston (or a roll-off piston). It will be recognized that a wide variety of sizes, shapes, profiles and/or configurations can and have been used in forming end members of the type and kind referred to as pistons or roll-off pistons, such as end member 200, for example. As such, it will be appreciated that the wall portions of the end member can be of any suitable shape, profile and/or configuration, such as may be useful to provide one or more desired performance characteristics, for example, and that the profile shown in FIGS. 3-13 is merely exemplary.

End member 200 can extend lengthwise between opposing ends 202 and 204 that are axially spaced from one another. End member 200 can include an end member wall 206 that can have a first or outer side wall portion 208 that extends in a generally axial direction and includes an outside surface 210 and an inside surface 212. End member 200 can also include a second or inner side wall portion 214 that also extends in a generally axial direction. Inner side wall portion 214 is spaced radially inward from outer side wall portion 208 and includes an outside surface 216 and an inside surface 218.

In the arrangement shown in FIGS. 3-13, end member 200 includes a cavity 220 extending into the end member between inside surface 212 of outer side wall portion 208 and outside surface 216 of inner side wall portion 214. In some cases, one or more support wall portions 222 can extend between and operatively interconnect the outer and inner side wall portions. Additionally, in some cases, one or more bosses or projections can be provided on or along the end member wall, such as may be suitable for including one or more securement devices and/or securement features. In the exemplary arrangement shown in FIGS. 3-13, for example, end member wall 206 can include projections 224 that extend radially outward from along inner side wall portion 214 and axially along the inner side wall portion. Securement features 226, such as threaded passages, for example, can extend axially into projections 224. It will be appreciated, however, that other configurations and/or arrangements could alternately be used.

In some cases, an end wall portion 228 can extend across and/or between one or more of outer side wall portion 208 and inner side wall portion 214. If provided, end wall portion 228 can be oriented transverse to axis AX and can include opposing surfaces 230 and 232. Additionally, in some cases, end member wall 206 can include an inner support wall portion 234 that can be disposed radially inward from inner side wall portion 214. Inner support wall portion 234 can project axially from along end wall portion 228 and include one or more distal edges 236 and 238. Additionally, inner support wall portion 234 can include an inside surface 240 that can at least partially define a passage (not numbered) extending through end wall portion 228.

As indicated above, it will be appreciated that the one or more end members of the gas spring and gas damper assembly can be operatively connected or otherwise secured to the flexible spring member in any suitable manner. For example, end member wall 206 can include an inner mounting wall portion 242 that extends axially beyond end wall portion 228 and extends peripherally about axis AX. Inner mounting wall portion 242 can have an outer surface 244 that is dimensioned to receive mounting bead 316 disposed along end 308 of the flexible wall 304 such that a substantially fluid-tight seal can be formed therebetween. In some cases, a retaining ridge 246 can project radially outward from along the inner mounting wall portion 242 and can extend peripherally along at least a portion thereof, such as may assist in retaining end 308 of flexible wall 304 in abutting engagement on or along the end member.

In an assembled condition, outer surface 310 of flexible wall 304 can be disposed in abutting engagement with outside surface 210 of outer side wall portion 208. In such an arrangement, flexible wall 304 of flexible spring member 300 can form a rolling lobe 320 along the outside surface of outer side wall portion 208. As gas spring and gas damper assembly AS1 is displaced between compressed and extended conditions, rolling lobe 320 can be displaced along outer surface 210 in a generally conventional manner.

As mentioned above, a gas spring and gas damper assembly in accordance with the subject matter of the present disclosure can include one or more elongated gas damping passages through which pressurized gas can flow to generate pressurized gas damping to dissipate kinetic energy acting on the gas spring and gas damper assembly. It will be appreciated that such one or more elongated gas damping passages can be of any suitable size, shape, configuration and/or arrangement. Additionally, it will be appreciated that any number of one or more features and/or components can be used, either alone or in combination with one another, to form or otherwise establish such one or more elongated gas damping passages.

As indicated above, a gas spring and gas damper assembly in accordance with the subject matter of the present disclosure can include one or more elongated gas damping passages fluidically connected between the spring chamber and one or more damping chambers or damping chamber portions. In such constructions, pressurized gas damping performance exceeding that provided by conventional gas damping orifice designs can be achieved through the use of such one or more elongated gas damping passages, particularly with respect to a given or otherwise predetermined range of frequencies of vibration or other dynamic input.

Generally, the one or more elongated gas damping passages can be dimensioned such that pressurized gas flows into, out of and/or otherwise is displaced within the elongated gas damping passage or passages. As a result, such pressurized gas flow can generate pressurized gas damping of vibrations and/or other dynamic inputs acting on the overall assembly and/or system. In a preferred arrangement, such pressurized gas damping can be configured for or otherwise targeted to dissipate vibrations and/or other dynamic inputs having a particular, predetermined natural frequency or within a particular, predetermined range of frequencies.

As discussed above, a gas spring and gas damper assembly in accordance with the subject matter of the present disclosure can include one or more elongated gas damping passages in fluid communication between the spring chamber and one or more damping chambers or damping chamber portions. Differential pressure between the volumes can induce gas flow along at least a portion of the length of the elongated gas damping passage. It will be appreciated that such movement of the pressurized gas within and/or through an elongated gas damping passage can act to dissipate kinetic energy acting on the assembly and/or system.

It will be appreciated that the cross-sectional area and overall length of the elongated gas damping passage can be dimensioned, sized and/or otherwise configured to generate gas flow having sufficient mass and sufficient velocity to achieve the desired level of pressurized gas damping. Additionally, in a preferred arrangement, the elongated gas damping passages can be dimensioned, sized and/or otherwise configured such that one or more performance characteristics, such as peak Loss Stiffness, for example, of the system occur at approximately a desired or target frequency or otherwise within a desired or targeted frequency range. Non-limiting examples of targeted frequency ranges can include vibrations from 1-4 Hz, vibrations from 8-12 Hz and vibrations from 15-25 Hz.

One or more elongated channels extend radially outward into inner side wall portion 214 from along inside surface 218. In the arrangement shown in FIGS. 3-13, for example, a plurality of elongated channels 248 extend axially along the inner side wall portion from along an edge 250 thereof toward end wall portion 228. It will be appreciated that intermediate wall portions 252 separate elongated channels 248 from one another. Additionally, it will be recognized that intermediate wall portions 252 extend from ends 254 toward end wall portion 228 with ends 254 spaced axially away from edge 250 of inner side wall portion 214. In this manner, pressurized gas flowing into or out of a given port or orifice can be distributed to each of the elongated channels. In some cases, intermediate wall portions 252 can extend into abutting engagement with end wall portion 228. In such case, a plurality of openings or passages 256 can be provided in fluid communication with elongated channels 248 that extend through end wall portion 228 or another feature of end member wall 206. It will be appreciated, however, that any suitable number of openings or passages could be used, and that any such one or more passages can take any suitable size, shape, configuration and/or arrangement. Additionally, in some cases, one or more passages 258 can extend through end wall portion 228 such as to permit fluid communication therethrough. One or more control devices, such as one or more control device assemblies 88 (FIG. 7), for example, can optionally be included on or along any such passages to selectively permit pressurized gas flow therethrough. Additionally, it will be appreciated that inside surface 218 of inner side wall portion 214 together with surface 232 of end wall portion 228 at least partially define an end member cavity 260 extending into end member 200 with an open end adjacent or otherwise along edge 250.

With reference, now, to gas damper assembly GD1, inner sleeve 400 thereof can include a sleeve wall 402 that extends axially between opposing ends 404 and 406. Sleeve wall 402 can extend peripherally about axis AX and can, in some cases, have an approximately uniform wall thickness. Additionally, in some cases, sleeve wall can have an approximately circular cross-sectional profile such that the inner sleeve is approximately cylindrical in overall shape. It will be appreciated, however, that other configurations and/or arrangements could alternately be used. Additionally, sleeve wall 402 forms an outer surface 408 along the inner sleeve. In a preferred arrangement, sleeve wall 402 is dimensioned to be received within end member cavity 260 of end member 200 with outer surface 408 disposed in facing relation to inside surface 218 of inner side wall portion 214. In such cases, a plurality of elongated gas damping passages can be formed by elongated channels 248 together with outer surface 408 of the inner sleeve. In some cases, one or more orifices or ports 410 can extend through sleeve wall 402. In a preferred arrangement, ports 410 can be disposed adjacent ends 254 of intermediate wall portions 252 such that pressurized gas flow through the ports can flow into and/or out of the elongated gas damping passages.

In an assembled condition, inner sleeve 400 is disposed within end member cavity 260 of end member 200 with an edge 412 disposed in abutting engagement with end wall portion 228 and an opposing edge 414 disposed adjacent edge 250 of inner side wall portion 214. Additionally, sleeve wall 402 forms an inner surface 416 within inner sleeve 400 that can at least partially define a damping chamber 418 within end member 200.

Damper rod assembly 500 includes an elongated damper rod 502 and a damper piston 504. Damper rod 502 extends longitudinally from an end 506 to an end 508. End 506 of damper rod 502 can include a securement feature dimensioned for operatively connecting the damper rod on or along end member 100. As one example, damper rod 502 can include one or more helical threads disposed along end 506. Damper piston 504 can be disposed along end 508 of damper rod 502 and can be attached or otherwise connected thereto in any suitable manner. For example, the damper piston could be integrally formed with the damper rod. As another example, end 508 of damper rod 502 could include a securement feature, such as one or more helical threads, for example. In such case, damper piston 504 could be provided separately and could include a passage or hole (not numbered) into which end 508 of damper rod 502 can be secured. In a preferred arrangement, a blind passage or hole can be used to assist in maintaining fluidic isolation across damper piston 504.

In an assembled condition, damper rod assembly 500 is disposed along gas spring assembly GS1 such that damper piston 504 is received within damping chamber 418 of inner sleeve 400. In such case, damper rod 502 can extend through the passage formed by inner support wall portion 234 of end member wall 206 and such that end 506 of damper rod 502 is disposed out of damping chamber 418. In some cases, a sealing element 510 (FIG. 14) and/or a wear bushing 512 (FIG. 14) can be disposed between inner support wall portion 234 and an outer surface 514 of damper rod 502.

Additionally, it will be appreciated that damper piston 504 separates damping chamber 418 into damping chamber portions 418A and 418B disposed along opposing sides of the damper piston. In some cases, a sealing element 516 can be disposed between an outer peripheral wall 518 of damper piston 504 and inner surface 416 of sleeve wall 402. It will be recognized, however, that in some cases significant frictional forces may be generated by the sealing arrangements described above in connection with the interface between damper piston 504 and inner surface 416 as well as in connection with the interface between outer surface 514 of damper rod 502 and inner support wall portion 234. In some cases, it may be desirable to avoid or at least reduce such frictional forces (or for other reasons) by forgoing the use of sealing elements along either or both interfaces. In such cases, one or more friction reducing bushings or wear bands can, optionally, be disposed therebetween.

Furthermore, in some cases, damper rod 502 can take the form of a hollow rod that includes an inner surface 520 that can at least partially define an elongated gas damping passage 522 extending through the damper rod. In such cases, one or more passages or ports 524 can extend through the wall of the damper rod to permit fluid communication between elongated gas damping passage 522 and damping chamber portion 418A of damping chamber 418.

End mount 600 is shown in FIGS. 3, 6, 7 and 14 as including an outer support element 602 that is dimensioned for receipt and securement within the opening formed in end member 100 by mounting wall portion 110. Outer support element 602 can include an element wall 604 with an outer peripheral surface 606 dimensioned to abuttingly engage an inner surface (not numbered) of mounting wall portion 110. In some cases, outer peripheral surface 606 of element wall 604 can include one or more engagement features, such as one or more endless annular grooves, endless annular projections and/or one or more portions of either or both thereof. In a preferred arrangement, outer support element is dimensioned for a press-fit connection with mounting wall portion 110 and engagement of the corresponding engagement features to retain the end mount on or along end member 100.

End mount 600 can also include an inner support element 608 dimensioned for securement on or along end 506 of damper rod 502. It will be appreciated that inner support element 608 can be of any suitable size, shape and/or configuration. As one example, inner support element 608 can include an element wall 610 with a connector portion 612 dimensioned for securement to the damper rod and a flange portion 612A projecting radially outward from connector portion 612. In some cases, a passage 614 can extend through element wall 610 and can be disposed in fluid communication with elongated gas damping passage 522 of damper rod 502, if provided, such that pressurized gas transfer into and out of the damping passage can be achieved.

End mount 600 can also include an elastomeric connector element 616 that is permanently attached (i.e., inseparable without damage, destruction or material alteration of at least one of the component parts) between outer and inner support elements 602 and 608. Additionally, in such a construction, elastomeric connector element 616 forms a substantially fluid-tight seal between outer and inner support elements 602 and 608. It will be appreciated that such substantially fluid-tight joints or connections can be formed by way of one or more processes and/or can include the use of one or more treatments and/or materials. Non-limiting examples of suitable processes can include molding, adhering, curing and/or vulcanizing.

In some cases, a sealing element 618 can be disposed between mounting wall portion 110 of end member 100 and outer support element 602. In this manner, a substantially fluid-tight construction can be formed between end member 100 and end mount 600. Additionally, in some cases, outer support element 602 can include one or more gas transfer passages 620 and/or one or more securement features 622. If provided, securement features 622 can be dimensioned to receive threaded fasteners 624, such as may be suitable for securing end member 100 and end mount 600 on or along an associated structural component (e.g., upper structural component USC in FIG. 5).

A base mount 700 can be configured to secure gas spring and gas damper assembly AS1 on or along an associate structural component, such as lower structural component LSC, for example. It will be appreciated any suitable combination of feature, elements and/or components can be used to form such a connection. As one example, base mount 700 can include a base mount wall 702 that includes a passage (not numbered) formed therethrough generally transverse to axis AX. Base mount wall 702 can function as an outer support element and an inner support element 704 can be disposed within the passage. An elastomeric connector element 706 can be permanently attached (i.e., inseparable without damage, destruction or material alteration of at least one of the component parts) between base mount wall 702 and inner support element 706 to form an elastomeric bushing 708 suitable for pivotally mounting assembly AS1 on or along the associated structural component.

Additionally, base mount wall 702 can include one or more passages 710 formed therethrough. Passages 710 can be disposed in approximate alignment with axis AX. Additionally, in a preferred arrangement, passages 710 can be disposed in approximate alignment with securement features 226 of projections 224 on end member 200. In such case, securement devices 712 (e.g., threaded fasteners) can extend through passages 710 and into engagement with securement features 226 to attach and secure base mount 700 on or along at least one of end member 200 and inner sleeve 400. In some cases, a sealing element 714 can be disposed between base mount wall 702 and one or more of end member 200 and inner sleeve 400 such that a substantially fluid-tight connection can be formed therebetween.

In some cases, one or more jounce bumpers can be included to inhibit contact between one or more features and/or components of assembly AS1. For example, a jounce bumper 716 can be disposed within damping chamber portion 418B, such as by securement on or along damper piston 504, for example, to substantially inhibit contact between the damper piston and base mount 700 during a full jounce condition of assembly AS1. Additionally, or in the alternative, a jounce bumper 718 can be disposed within damping chamber portion 418A, such as by securement on or along end wall portion 228, for example, to substantially inhibit contact between end wall portion 228 and damper piston 504 during a full rebound condition of assembly AS1.

Figure 14:
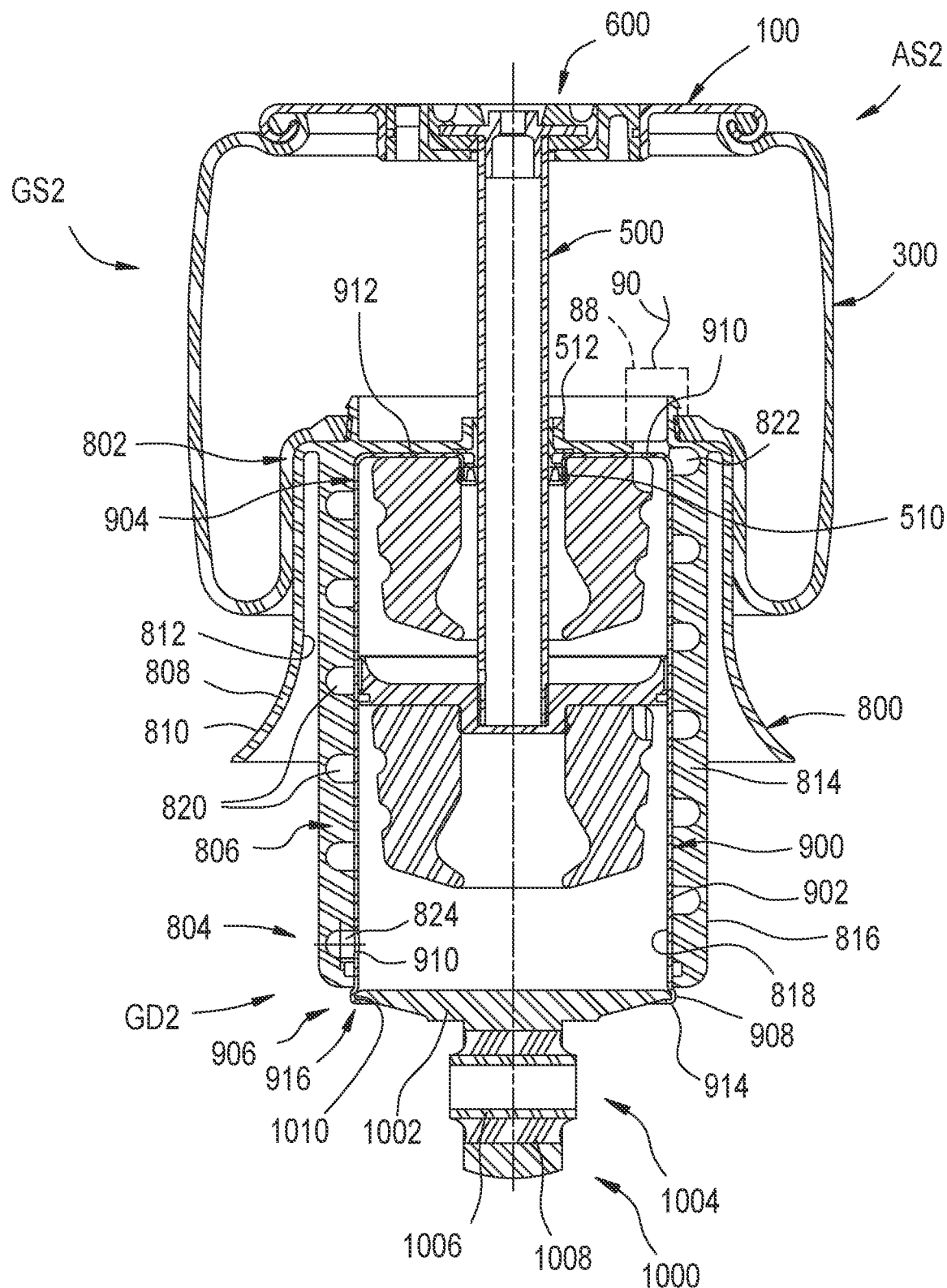
FIG. 14 is a cross-sectional side view of an alternate construction of an exemplary gas spring and gas damper assembly adapted for use in operative association with a suspension system in accordance with the subject matter of the present disclosure.

Another example of a gas spring and gas damper assembly AS2 that may be suitable for use as one or more of gas spring and gas damper assemblies 74A and/or 74B in FIG. 2, for example, is shown in FIG. 14 as including a gas spring (or gas spring assembly) GS2 and a gas damper (or gas damper assembly) GD2. Assembly AS2 includes a longitudinal axis AX, such as has been described above. Gas spring GS2 includes end member 100, such as has been described above, and an end member 800 that is spaced axially from end member 100. Flexible spring member 300, such as has been described above, can extend peripherally around axis AX and can be secured between end members 100 and 800 in a substantially fluid-tight manner such that spring chamber 302 is at least partially defined therebetween.

Gas damper GD2 can include an inner sleeve 900 that is operatively supported on or along end member 800 and damper rod assembly 500, such as has been described above, that is operatively associated with inner sleeve 900 in a manner substantially similar to that described above in detail. End mount 600, such as has been described above, can operatively connect damper rod assembly 500 with end member 100. A base mount 1000 can be operatively connected with one or more of end member 800 and inner sleeve 900. It is to be recognized and understood that the foregoing description of end member 100, flexible spring member 300, damper rod assembly 500 and end mount 600, including all of the features and functions thereof as well as any components that associated therewith, is equally applicable to gas spring assembly AS2 as if repeated in full detail here.

End member 800 can extend lengthwise between opposing ends 802 and 804 that are axially spaced from one another. End member 800 can include an end member wall 806 that can have a first or outer side wall portion 808 that extends in a generally axial direction and includes an outside surface 810 and an inside surface 812. End member 800 can also include a second or inner side wall portion 814 that also extends in a generally axial direction. Inner side wall portion 814 is spaced radially inward from outer side wall portion 808 and includes an outside surface 816 and an inside surface 818.

One or more elongated channels can extend into inner side wall portion 812 from along inside surface 818. One way in which end member 800 differs from end member 200 described above in detail is that the channels are shown as include one or more channels 820 that extend helically around axis AX rather than extending longitudinally along the inner side wall portion of the end member wall, as in end member 200. Helical channels 820 extend between opposing end ports 822 and 824.

Inner sleeve 900 can include a sleeve wall 902 that extends axially between opposing ends 904 and 906. Sleeve wall 902 can extend peripherally about axis AX and can, in some case, have an approximately uniform wall thickness. Additionally, sleeve wall 902 forms an outer surface 908 along the inner sleeve. In a preferred arrangement, sleeve wall 902 is dimensioned to be received within the end member cavity of end member 800 with outer surface 908 disposed in facing relation to inside surface 818 of inner side wall portion 814. In such case, a plurality of elongated gas damping passages can be formed by helical channels 820 together with outer surface 908 of the inner sleeve. In some cases, one or more orifices or ports 910 can extend through sleeve wall 902.

One way in which inner sleeve 900 differs from inner sleeve 400 described in detail above is that sleeve wall 902 include an end wall portion 912 that extends generally transverse to axis AX, and can receive and retain one or more components and/or elements, such as one or more sealing and/or bushing elements, for example. Additionally, sleeve wall 902 includes a distal end 914 that project outwardly beyond the distal edge of end member 800.

Base mount 1000 can include a base mount wall 1002 that can at least partially define an elastomeric bushing 1004 with an inner metal 1006 and an elastomeric connector element 1008. Base mount 1000 differs from base mount 700 in that base mount wall 1002 includes an outer peripheral edge 1010 dimensioned for receipt within distal end 914 of sleeve wall 902. A crimped connection 916 can be formed by distal end 914 of sleeve wall 902 around outer peripheral edge 1010 of base mount wall 1002 to secure the base mount on or along inner sleeve 900 and form a substantially fluid-tight seal therewith.

Figure 15:
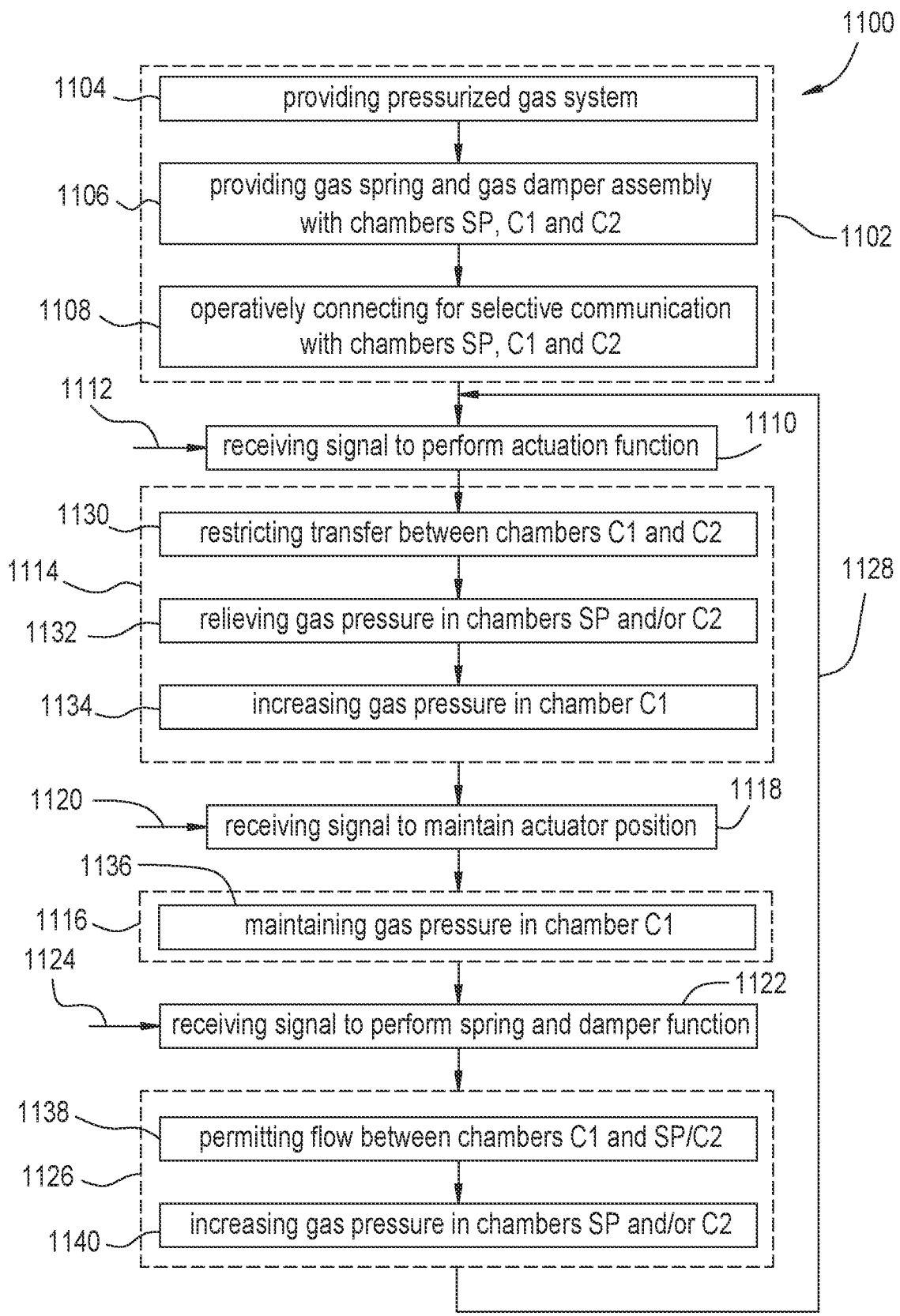
FIG. 15 is a graphical representation of one example of a method of operating a suspension system in accordance with the subject matter of the present disclosure.
Figure 16A:
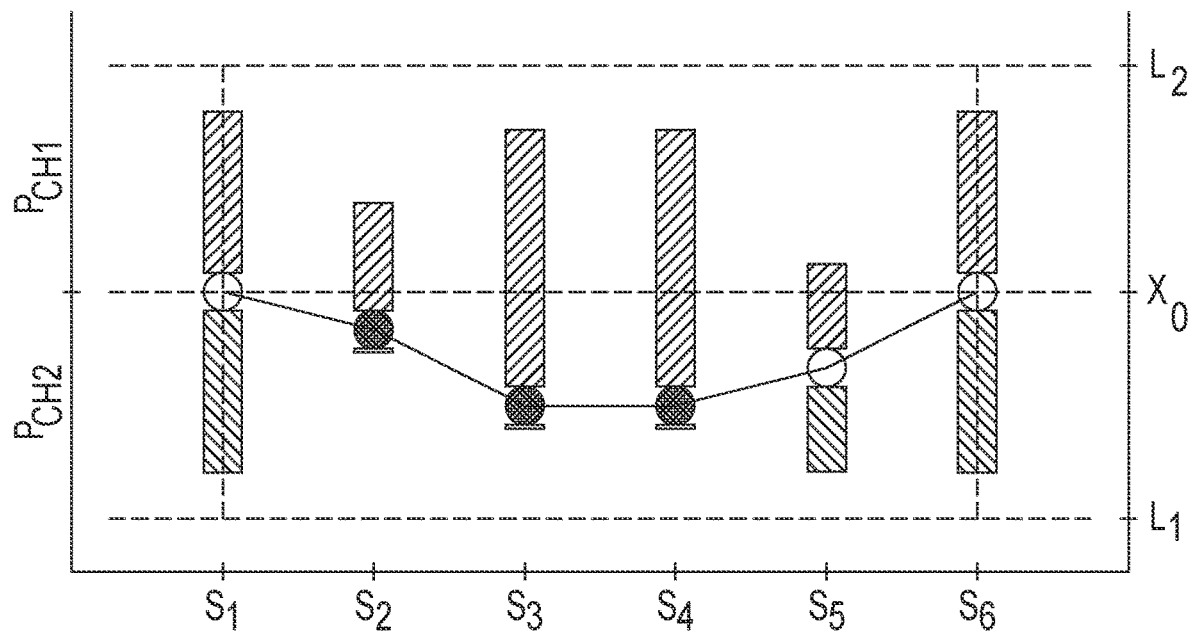
FIGS. 16A and 16B are graphical representations of exemplary characteristics having a relation to a suspension system undergoing the method of operation in FIG. 15.
Figure 16B:
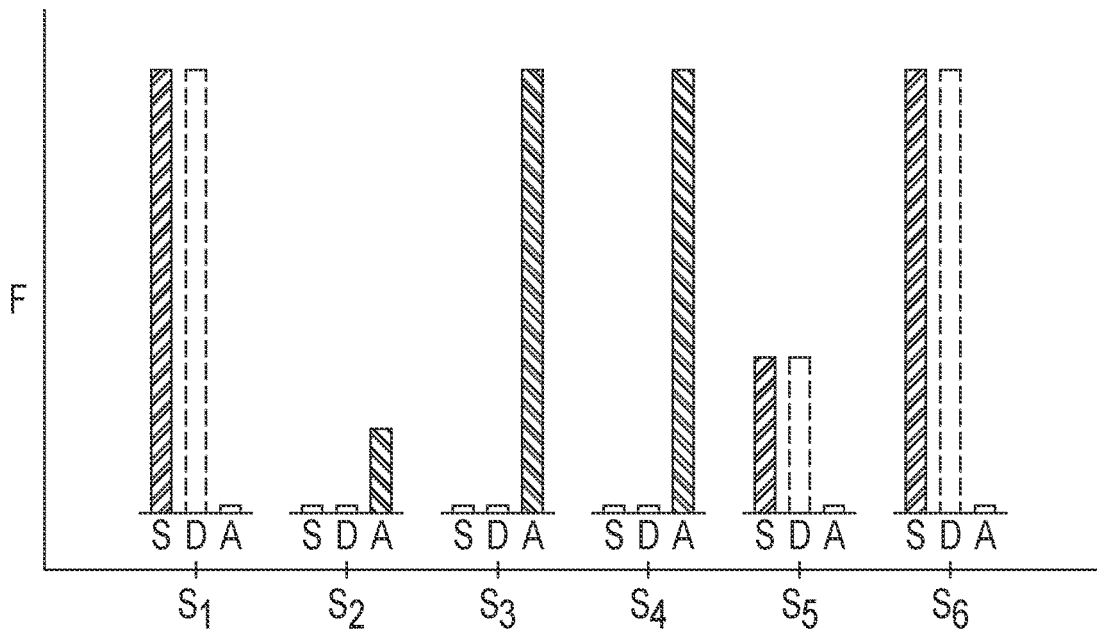

With reference to FIG. 15, one example of a method 1100 of operating a suspension system in accordance with the subject matter of the present disclosure is graphically represented in conjunction with FIGS. 16A and 16B. It will be appreciated that FIGS. 16A and 16B graphically represent certain properties and/or characteristics of gas spring and gas damper assemblies, such as one or more of assemblies 74A, 74B, AS1 and/or AS2, for example, at various intervals during the performance of method 1100 in FIG. 15.

Method 1100 includes providing a suspension system, as is represented in FIG. 15 by reference number 1102. Non-limiting examples of such a suspension system can include one of cab mounts 46, cab suspensions 48, seat suspensions 50, the trailer suspension (not numbered) and/or suspension system portions 56A and/or 56B of suspension system 56. In some cases, providing a suspension system in 1102 can include providing a pressurized gas system (e.g., pressurized gas system 60), as is represented by reference number 1104. Additionally, providing a suspension system in 1102 can include providing a gas spring and gas damper assembly, such as one or more of assemblies 74A, 74B, AS1 and/or AS2, for example, and operatively connecting one or more of the spring and damping chambers of the assembly with the pressurized gas system, as are respectfully represented by reference numbers 1106 and 1108 in FIG. 15. For purposes of clarity and ease of reading, it is noted that further reference herein to spring chamber SP can correspond to spring chamber 302, damping chamber C1 can correspond to damping chamber portion 418A, and damping chamber C2 can correspond to damping chamber 418B.

Method 1100 also includes receiving a signal initiating the performance of a transition of the assembly from a first condition (e.g., a spring and damper functionality) to a second condition (e.g., an actuator functionality), as is represented by item number 1110 and arrow 1112 in FIG. 15. Method 1100 can also include converting, actuating or otherwise transitioning the assembly from the first condition to the second condition, as is represented by item number 1114, and thereby retracting a secondary suspension system from deployment. In a preferred arrangement, method 1100 can maintain the secondary suspension system in a retracted position for an indeterminate duration, as is represented in FIG. 15 by item number 1116. In some cases, method 1100 can include receiving a signal to maintain the assembly and corresponding secondary suspension system in the second condition, as is represented by item number 1118 and arrow 1120.

Method 1100 also includes receiving a signal initiating the performance of a transition of the assembly from the second condition (e.g., actuator functionality) to the first condition (e.g., spring and damper functionality), as is represented by item number 1122 and arrow 1124 in FIG. 15. Method 1100 can further include converting, actuating or otherwise transitioning the assembly from the second condition to the first condition, as is represented by item number 1126, and thereby extending or otherwise re-deploying the secondary suspension system. Method 1100 can also include returning and, again, receiving a signal initiating the performance of a transition of the assembly from the first condition to the second condition at item number 1110, as is indicated by arrow 1128, such that the method can be repeated.

With reference, now, to FIGS. 15, 16A and 16B, a status S1 illustrates a condition of the suspension system prior to action 1114. At status S1, the assembly is at a design or nominal height (or length) X0 and the control device assembly (or valve) between chambers C1 and C2 is open, as is represented by the unfilled circle in FIG. 16A at status S1. Due to the open status of the valve between chambers C1 and C2, pressures PCH1 and PCH2 are approximately equal to one another. As such, the assembly can function as a spring and damper, and is capable of generating spring forces and potential damping forces, as is represented by bars S and D in FIG. 16B. In such conditions, actuation forces A are approximately zero. Furthermore, under such conditions, the assembly is capable of full displacement between displacement limits L1 and L2 in FIG. 16A, which can correspond to jounce and rebound limits of travel, respectively.

It will be appreciated that action 1114 of converting, actuating or otherwise transitioning the assembly from the first condition to the second condition and thereby retracting a secondary suspension system from deployment can be performed in any suitable manner. As one example, action 1114 can include restricting the transfer of pressurized gas between damping chambers C1 and C2, as is represented by item number 1130. Action 1114 can also include relieving gas pressure in chambers SP and/or C2, as is represented by item number 1132. Such a condition corresponds to status S2 in FIGS. 16A and 16B and thereby creating a pressure differential between pressures PCH1 and PCH2 as a result of the closed valve represented by the filled circle at status S2 in FIG. 16A. The differential pressure causes the assembly to decrease in length as is represented by the displacement from X0 in FIG. 16A and the generation of an initial actuation force A in FIG. 16B.

Action 1114 can also include increasing the pressure in chamber C1 and thereby increasing the pressure differential between PCH1 and PCH2 as well as further displacing the assembly from X0 as is represented by status S3 in FIG. 16A. Such an action causes a corresponding increase in actuation force A, as is represented in FIG. 16B. Action 1116 can include maintaining the suspension system in the second condition for an indeterminate period of time, such as minutes, hours or days, for example. Such an action can be achieved in any suitable manner, such as by maintaining a predetermined gas pressure within chamber C1, as is represented by item number 1136 in FIG. 15 and status S4 in FIGS. 16A and 16B.

Action 1126 of converting, actuating or otherwise transitioning the assembly from the second condition to the first condition and thereby extending or otherwise re-deploying the secondary suspension system can be performed in any suitable manner. As one example, action 1126 can include opening a control device assembly (or valve) or otherwise permitting flow between chambers C1 and SP/C2, as is represented in FIG. 15 by item number 1138 and by the unfilled circle at status S5 in FIG. 16A. Under such a condition, pressures PCH1 and PCH2 are approximately equalized and the assembly is displaced toward design height X0. Additionally, actuation force A drops to approximately zero, and spring and damper forces, S and D, respectively, increase to an intermediate value, as illustrated in FIG. 16B. Action 1126 can also include increasing the pressure within at least one of chambers SP and C2, as is represented by item number 1140 in FIG. 15 and status S6 in FIGS. 16A and 16B. Under such conditions, pressures PCH1 and PCH2 increase but remain approximately equalized and the assembly is displaced toward the design height X0. Additionally, spring and potential damping forces, S and D, respectively, increase to full effectiveness.

Figure 17:
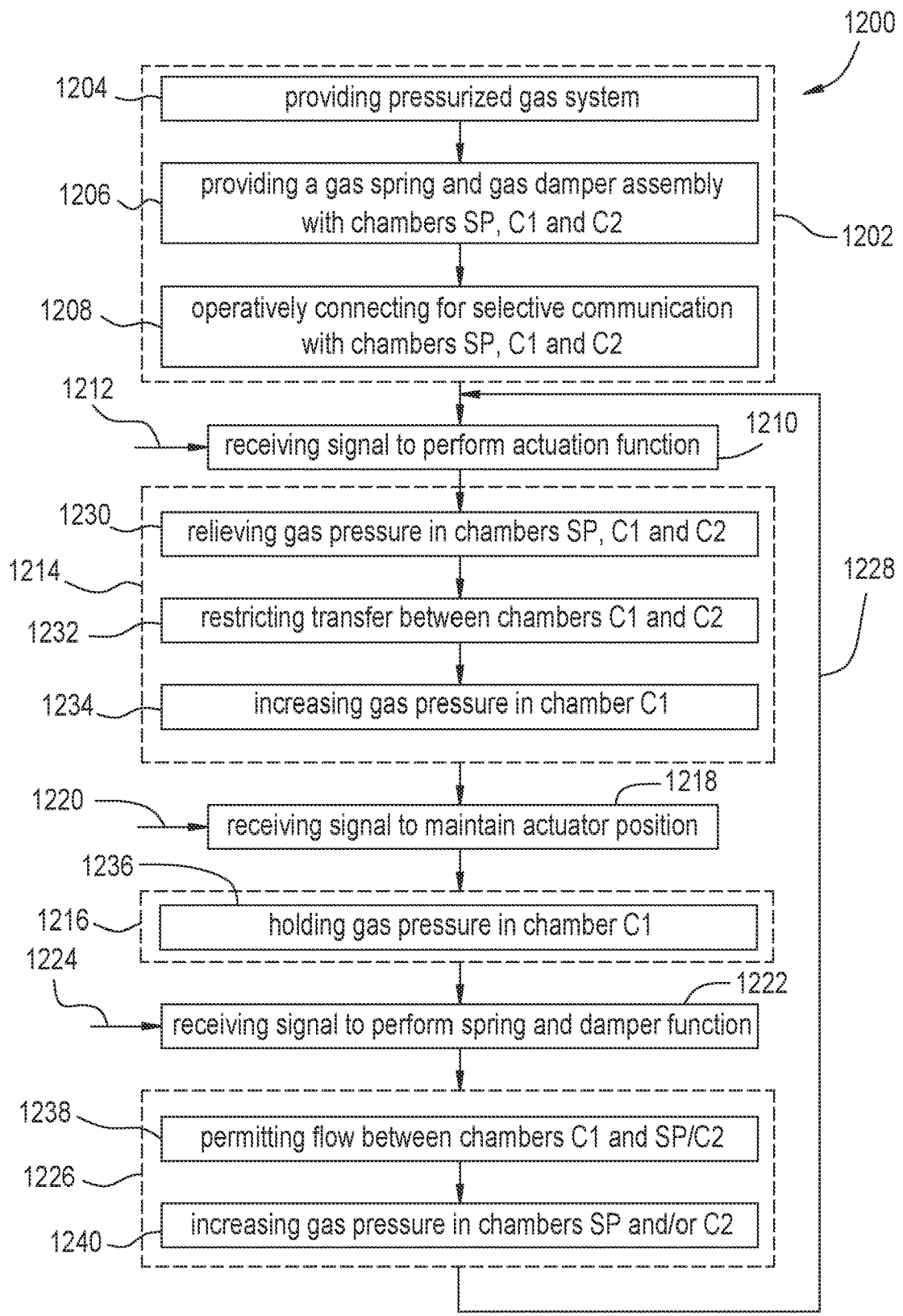
FIG. 17 is a graphical representation of another example of a method of operating a suspension system in accordance with the subject matter of the present disclosure.
Figure 18A:
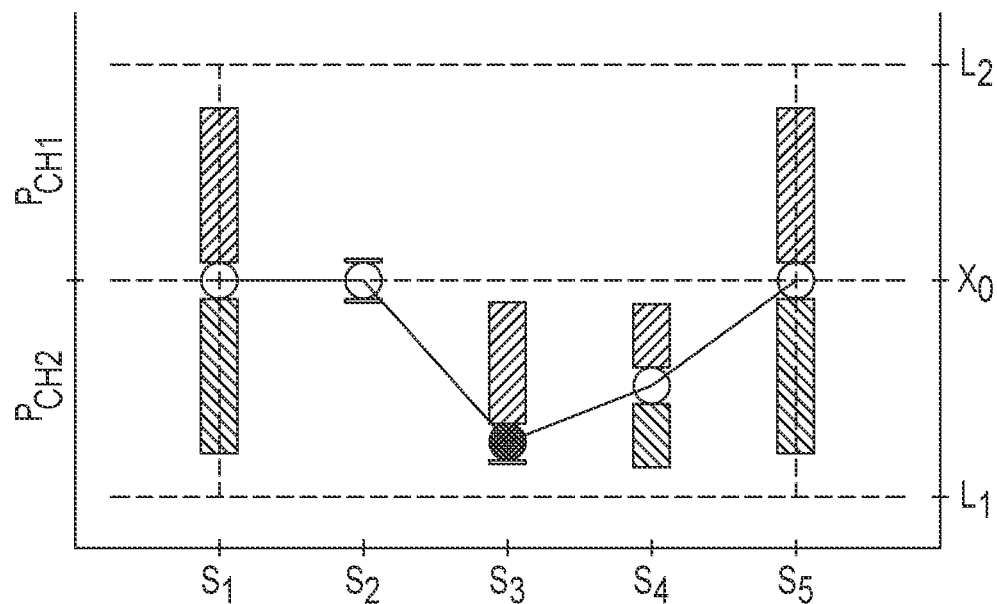
FIGS. 18A and 18B are graphical representations of exemplary characteristics having a relation to a suspension system undergoing the method of operation in FIG. 17.
Figure 18B:
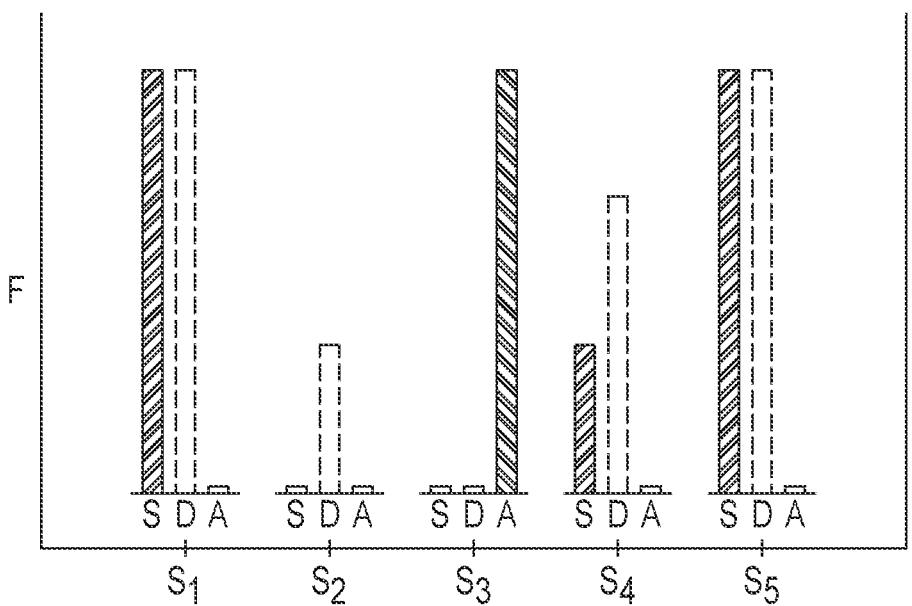

With reference to FIG. 17, another example of a method 1200 of operating a suspension system in accordance with the subject matter of the present disclosure is graphically represented in conjunction with FIGS. 18A and 18B. It will be appreciated that FIGS. 18A and 18B graphically represent certain properties and/or characteristics of gas spring and gas damper assemblies, such as one or more of assemblies 74A, 74B, AS1 and/or AS2, for example, at various intervals during the performance of method 1200 in FIG. 17.

Method 1200 includes providing a suspension system, as is represented in FIG. 17 by reference number 1202. Non-limiting examples of such a suspension system can include one of cab mounts 46, cab suspensions 48, seat suspensions 50, the trailer suspension (not numbered) and/or suspension system portions 56A and/or 56B of suspension system 56. In some cases, providing a suspension system in 1202 can include providing a pressurized gas system (e.g., pressurized gas system 60), as is represented by reference number 1204. Additionally, providing a suspension system in 1202 can include providing a gas spring and gas damper assembly, such as one or more of assemblies 74A, 74B, AS1 and/or AS2, for example, and operatively connecting one or more of the spring and damping chambers of the assembly with the pressurized gas system, as are respectfully represented by reference numbers 1206 and 1208 in FIG. 17. For purposes of clarity and ease of reading, it is noted that further reference herein to spring chamber SP can correspond to spring chamber 302, damping chamber C1 can correspond to damping chamber portion 418A, and damping chamber C2 can correspond to damping chamber 418B.

Method 1200 also includes receiving a signal initiating the performance of a transition of the assembly from a first condition (e.g., a spring and damper functionality) to a second condition (e.g., an actuator functionality), as is represented by item number 1210 and arrow 1212 in FIG. 17. Method 1200 can also include converting, actuating or otherwise transitioning the assembly from the first condition to the second condition, as is represented by item number 1214, and thereby retracting a secondary suspension system from deployment. In a preferred arrangement, method 1200 can maintain the secondary suspension system in a retracted position for an indeterminate duration, as is represented in FIG. 17 by item number 1216. In some cases, method 1200 can include receiving a signal to maintain the assembly and corresponding secondary suspension system in the second condition, as is represented by item number 1218 and arrow 1220.

Method 1200 also includes receiving a signal initiating the performance of a transition of the assembly from the second condition (e.g., actuator functionality) to the first condition (e.g., spring and damper functionality), as is represented by item number 1222 and arrow 1224 in FIG. 17. Method 1200 can further include converting, actuating or otherwise transitioning the assembly from the second condition to the first condition, as is represented by item number 1226, and thereby extending or otherwise re-deploying the secondary suspension system. Method 1200 can also include returning and, again, receiving a signal initiating the performance of a transition of the assembly from the first condition to the second condition at item number 1210, as is indicated by arrow 1228, such that the method can be repeated.

With reference, now, to FIGS. 17, 18A and 18B, a status S1 illustrates a condition of the suspension system prior to action 1214. At status S1, the assembly is at a design or nominal height (or length) X0 and the control device assembly (or valve) between chambers C1 and C2 is open, as is represented by the unfilled circle in FIG. 18A at status S1. Due to the open status of the valve between chambers C1 and C2, pressures PCH1 and PCH2 are approximately equal to one another. As such, the assembly can function as a spring and damper, and is capable of generating spring forces and potential damping forces, as is represented by bars S and D in FIG. 18B. In such conditions, actuation forces A are approximately zero. Furthermore, under such conditions, the assembly is capable of full displacement between displacement limits L1 and L2 in FIG. 18A, which can correspond to jounce and rebound limits of travel, respectively.

It will be appreciated that action 1214 of converting, actuating or otherwise transitioning the assembly from the first condition to the second condition and thereby retracting a secondary suspension system from deployment can be performed in any suitable manner. As one example, action 1214 can include releasing or otherwise relieving gas pressure within chambers SP, C1 and C2, as is represented by item number 1230 in FIG. 17 as well as status S2 in FIGS. 18A and 18B. Under such conditions, pressures PCH1 and PCH2 are substantially reduced (i.e., approximately zero) while the assembly remains at an approximately design height position X0. Additionally, spring and actuator forces, S and A, respectively, are approximately zero with some potential damping force D remaining.

Action 1214 can also include restricting the transfer of pressurized gas between damping chambers C1 and C2, as is represented by item number 1232. Action 1214 can further include increasing the pressure in chamber C1, as is represented by item number 1234 in FIG. 17 and the filled circle in status S3 in FIG. 18A. Such action can thereby increase the pressure differential between PCH1 and PCH2 and result in displacement the assembly from X0 as is represented by status S3 in FIG. 18A. Furthermore, such an action causes a corresponding increase in actuation force A, as is represented in FIG. 18B.

Action 1216 can include maintaining the suspension system in the second condition for an indeterminate period of time, such as minutes, hours or days, for example. Such an action can be achieved in any suitable manner, such as by maintaining a predetermined gas pressure within chamber C1, as is represented by item number 1236 in FIG. 17 and status S3 in FIGS. 18A and 18B. Action 1226 of converting, actuating or otherwise transitioning the assembly from the second condition to the first condition and thereby extending or otherwise re-deploying the secondary suspension system can be performed in any suitable manner. As one example, action 1226 can include opening a valve or otherwise permitting flow between chambers C1 and SP/C2, as is represented in FIG. 17 by item number 1238 and by the unfilled circle at status S4 in FIG. 18A. Under such a condition, pressures PCH1 and PCH2 are approximately equalized and the assembly is displaced toward design height X0. Additionally, actuation force A drops to approximately zero, and spring and damper forces, S and D, respectively, increase to intermediate values, as illustrated in FIG. 18B. Action 1226 can also include increasing the pressure within at least one of chambers SP and C2, as is represented by item number 1240 in FIG. 17 and status S5 in FIGS. 18A and 18B. Under such conditions, pressures PCH1 and PCH2 increase but remain approximately equalized and the assembly is displaced toward the design height X0. Additionally, spring and potential damping forces, S and D, respectively, increase to full effectiveness.

Figure 19:
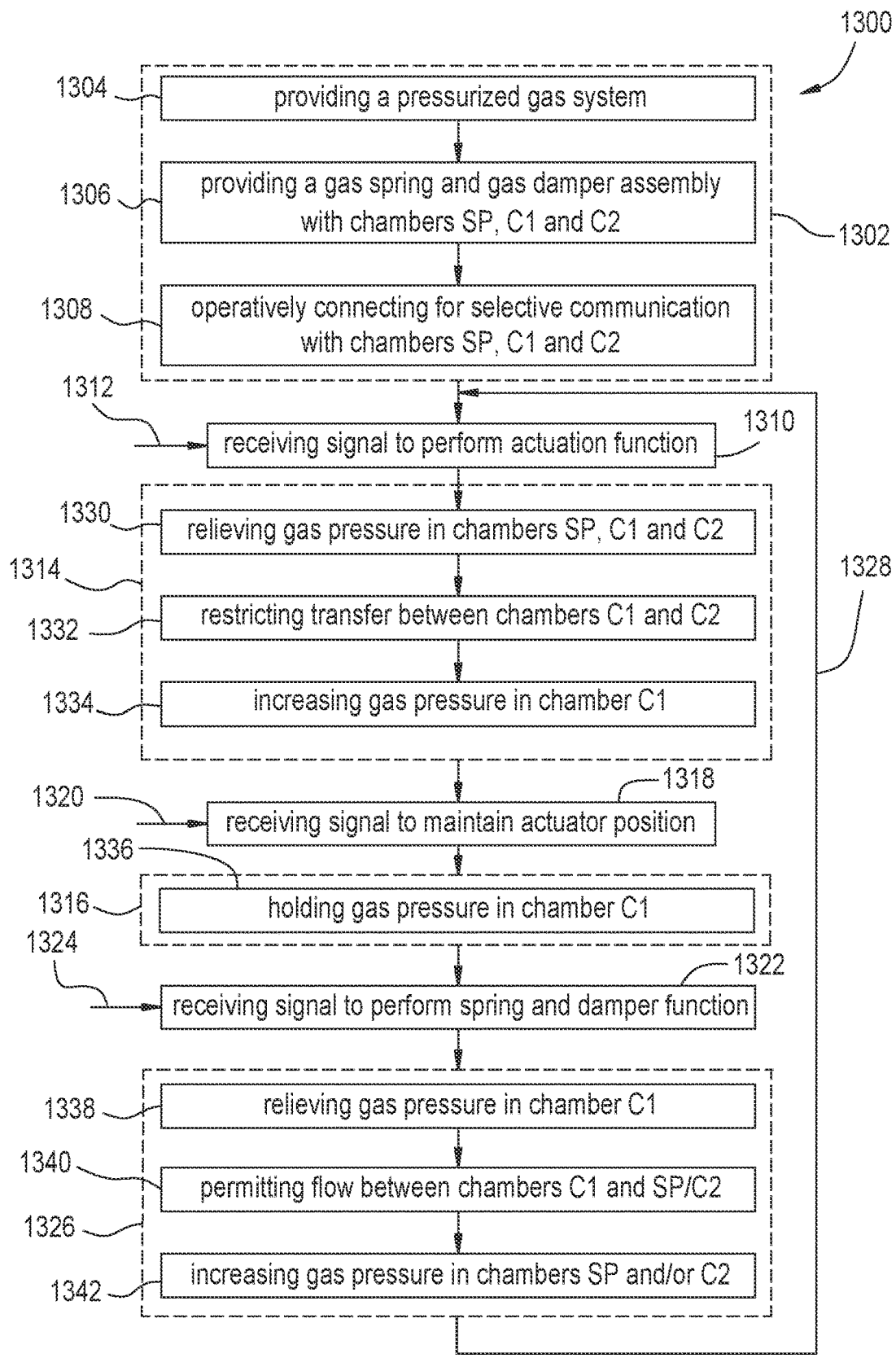
FIG. 19 is a graphical representation of still another example of a method of operating a suspension system in accordance with the subject matter of the present disclosure.
Figure 20A:
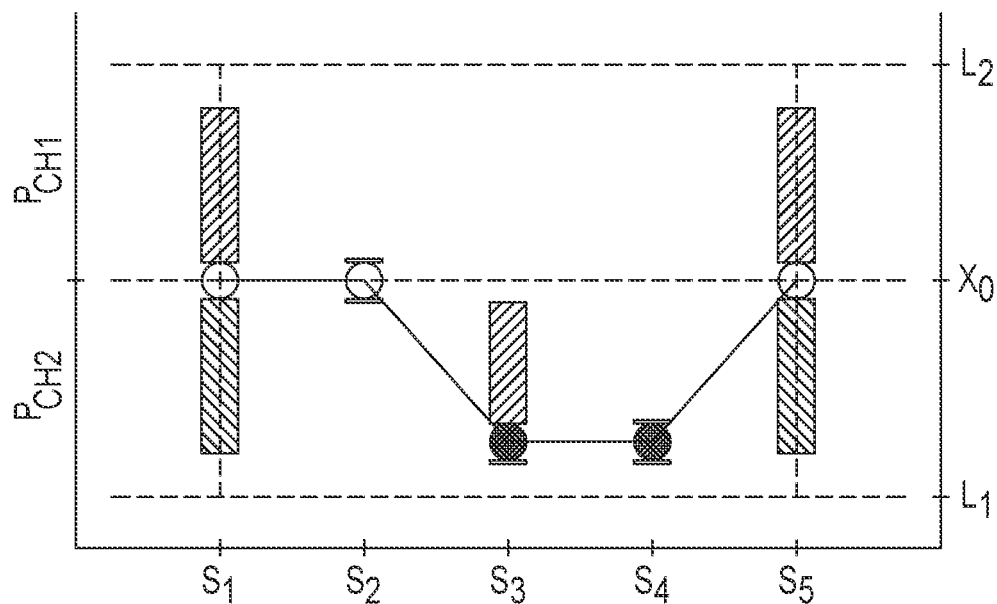
FIGS. 20A and 20B are graphical representations of exemplary characteristics having a relation to a suspension system undergoing the method of operation in FIG. 19.
Figure 20B:
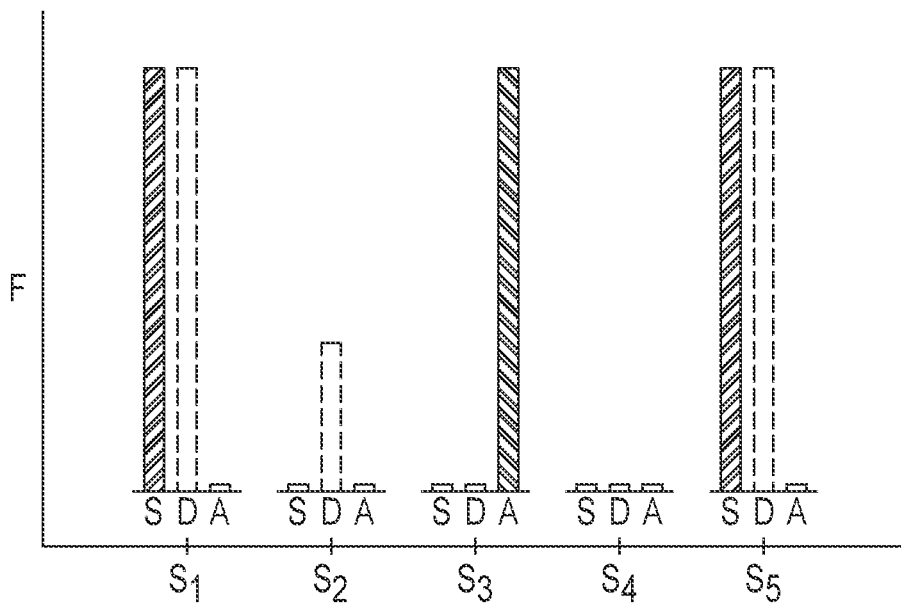

With reference to FIG. 19, still another example of a method 1300 of operating a suspension system in accordance with the subject matter of the present disclosure is graphically represented in conjunction with FIGS. 20A and 20B. It will be appreciated that FIGS. 20A and 20B graphically represent certain properties and/or characteristics of gas spring and gas damper assemblies, such as one or more of assemblies 74A, 74B, AS1 and/or AS2, for example, at various intervals during the performance of method 1300 in FIG. 19.

Method 1300 includes providing a suspension system, as is represented in FIG. 19 by reference number 1302. Non-limiting examples of such a suspension system can include one of cab mounts 46, cab suspensions 48, seat suspensions 50, the trailer suspension (not numbered) and/or suspension system portions 56A and/or 56B of suspension system 56. In some cases, providing a suspension system in 1302 can include providing a pressurized gas system (e.g., pressurized gas system 60), as is represented by reference number 1304. Additionally, providing a suspension system in 1302 can include providing a gas spring and gas damper assembly, such as one or more of assemblies 74A, 74B, AS1 and/or AS2, for example, and operatively connecting one or more of the spring and damping chambers of the assembly with the pressurized gas system, as are respectfully represented by reference numbers 1306 and 1308 in FIG. 19. For purposes of clarity and ease of reading, it is noted that further reference herein to spring chamber SP can correspond to spring chamber 302, damping chamber C1 can correspond to damping chamber portion 418A, and damping chamber C2 can correspond to damping chamber 418B.

Method 1300 also includes receiving a signal initiating the performance of a transition of the assembly from a first condition (e.g., a spring and damper functionality) to a second condition (e.g., an actuator functionality), as is represented by item number 1310 and arrow 1312 in FIG. 19. Method 1300 can also include converting, actuating or otherwise transitioning the assembly from the first condition to the second condition, as is represented by item number 1314, and thereby retracting a secondary suspension system from deployment. In a preferred arrangement, method 1300 can maintain the secondary suspension system in a retracted position for an indeterminate duration, as is represented in FIG. 19 by item number 1316. In some cases, method 1300 can include receiving a signal to maintain the assembly and corresponding secondary suspension system in the second condition, as is represented by item number 1318 and arrow 1320.

Method 1300 also includes receiving a signal initiating the performance of a transition of the assembly from the second condition (e.g., actuator functionality) to the first condition (e.g., spring and damper functionality), as is represented by item number 1322 and arrow 1324 in FIG. 19. Method 1300 can further include converting, actuating or otherwise transitioning the assembly from the second condition to the first condition, as is represented by item number 1326, and thereby extending or otherwise re-deploying the secondary suspension system. Method 1300 can also include returning and, again, receiving a signal initiating the performance of a transition of the assembly from the first condition to the second condition at item number 1310, as is indicated by arrow 1328, such that the method can be repeated.

With reference, now, to FIGS. 19, 20A and 20B, a status S1 illustrates a condition of the suspension system prior to action 1314. At status S1, the assembly is at a design or nominal height (or length) X0 and the control device assembly (or valve) between chambers C1 and C2 is open, as is represented by the unfilled circle in FIG. 20A at status S1. Due to the open status of the valve between chambers C1 and C2, pressures PCH1 and PCH2 are approximately equal to one another. As such, the assembly can function as a spring and damper, and is capable of generating spring forces and potential damping forces, as is represented by bars S and D in FIG. 20B. In such conditions, actuation forces A are approximately zero. Furthermore, under such conditions, the assembly is capable of full displacement between displacement limits L1 and L2 in FIG. 20A, which can correspond to jounce and rebound limits of travel, respectively.

It will be appreciated that action 1314 of converting, actuating or otherwise transitioning the assembly from the first condition to the second condition and thereby retracting a secondary suspension system from deployment can be performed in any suitable manner. As one example, action 1314 can include releasing or otherwise relieving gas pressure within chambers SP, C1 and C2, as is represented by item number 1330 in FIG. 19 as well as status S2 in FIGS. 20A and 20B. Under such conditions, pressures PCH1 and PCH2 are substantially reduced (i.e., approximately zero) while the assembly remains at an approximately design height position X0. Additionally, spring and actuator forces, S and A, respectively, are approximately zero with some potential damping force D remaining.

Action 1314 can also include restricting the transfer of pressurized gas between damping chambers C1 and C2, as is represented by item number 1332. Action 1314 can further include increasing the pressure in chamber C1, as is represented by item number 1334 in FIG. 19 and closed valve corresponding to the filled circle in status S3 in FIG. 20A. Such action can thereby increase the pressure differential between PCH1 and PCH2 and result in displacement the assembly from X0 as is represented by status S3 in FIG. 20A. Furthermore, such an action causes a corresponding increase in actuation force A, as is represented in FIG. 20B.

Action 1316 can include maintaining the suspension system in the second condition for an indeterminate period of time, such as minutes, hours or days, for example. Such an action can be achieved in any suitable manner, such as by maintaining a predetermined gas pressure within chamber C1, as is represented by item number 1336 in FIG. 19 and status S3 in FIGS. 20A and 20B. Action 1326 of converting, actuating or otherwise transitioning the assembly from the second condition to the first condition and thereby extending or otherwise re-deploying the secondary suspension system can be performed in any suitable manner. As one example, action 1326 can include releasing or otherwise relieving gas pressure within chamber C1, as is represented by item number 1338 in FIG. 19 as well as status S4 in FIGS. 20A and 20B. Under such conditions, pressures PCH1 and PCH2 are at an approximate equilibrium at a substantially reduced pressure (i.e., approximately zero). And, because the valve remains closed, as is represented by the filled circle at status S4 in FIG. 20A, the position of the assembly remains in a displaced condition with respect to design height position X0. Additionally, spring, potential damper and actuator forces, S, D and A, respectively, are approximately zero.

Action 1326 can also include opening a valve or otherwise permitting flow between chambers C1 and SP/C2, as is represented in FIG. 19 by item number 1340 and by the unfilled circle at status S5 in FIG. 20A. Action 1326 can further include increasing the pressure within at least one of chambers SP and C2, as is represented by item number 1342 in FIG. 19. Under such a condition, pressures PCH1 and PCH2 are approximately equalized and the assembly is displaced toward design height X0. Additionally, actuation force A drops to approximately zero, and spring and damper forces, S and D, respectively, increase to substantially full values, as illustrated in FIG. 20B.

Figure 21:
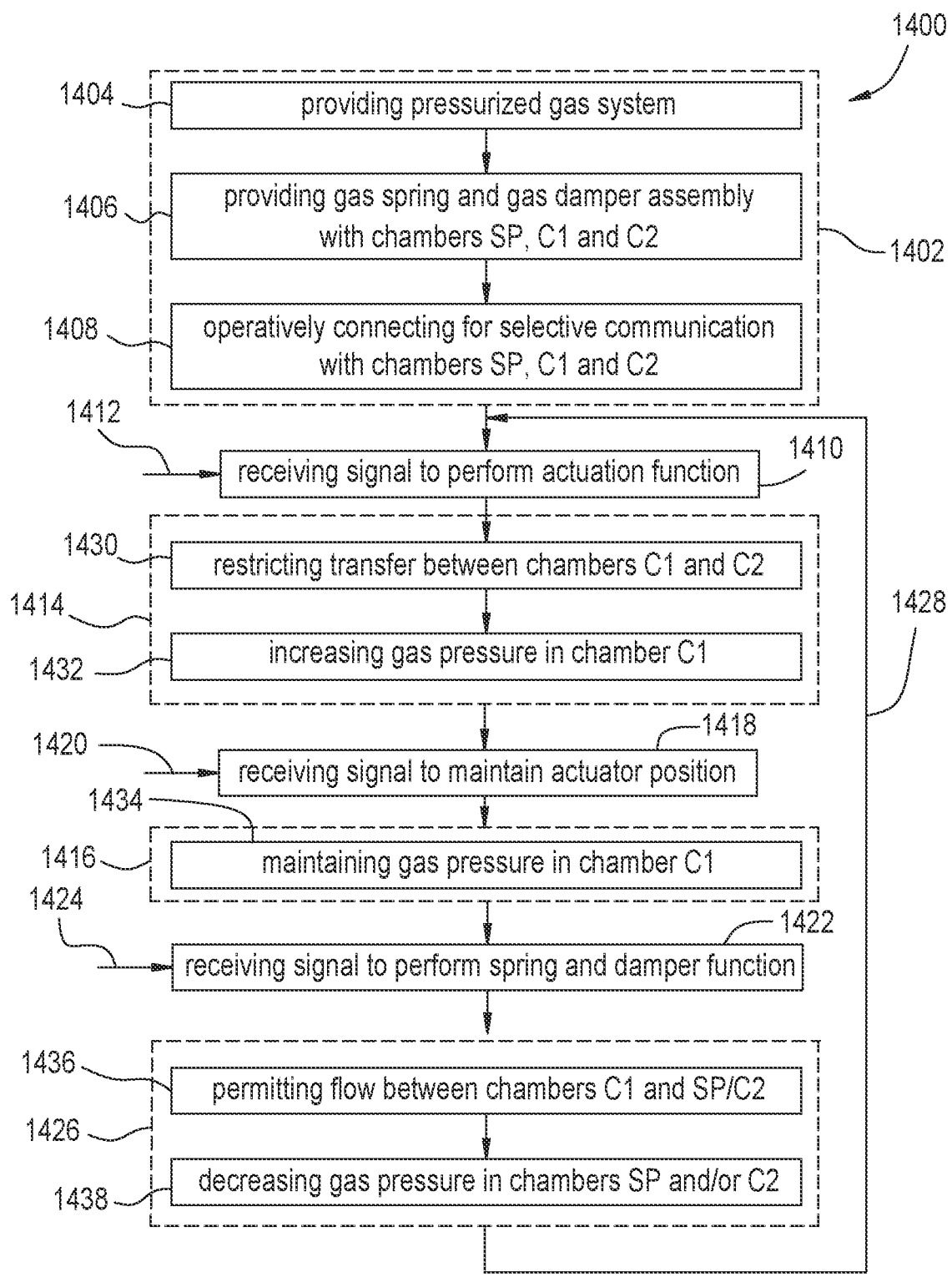
FIG. 21 is a graphical representation of a further example of a method of operating a suspension system in accordance with the subject matter of the present disclosure.
Figure 22A:
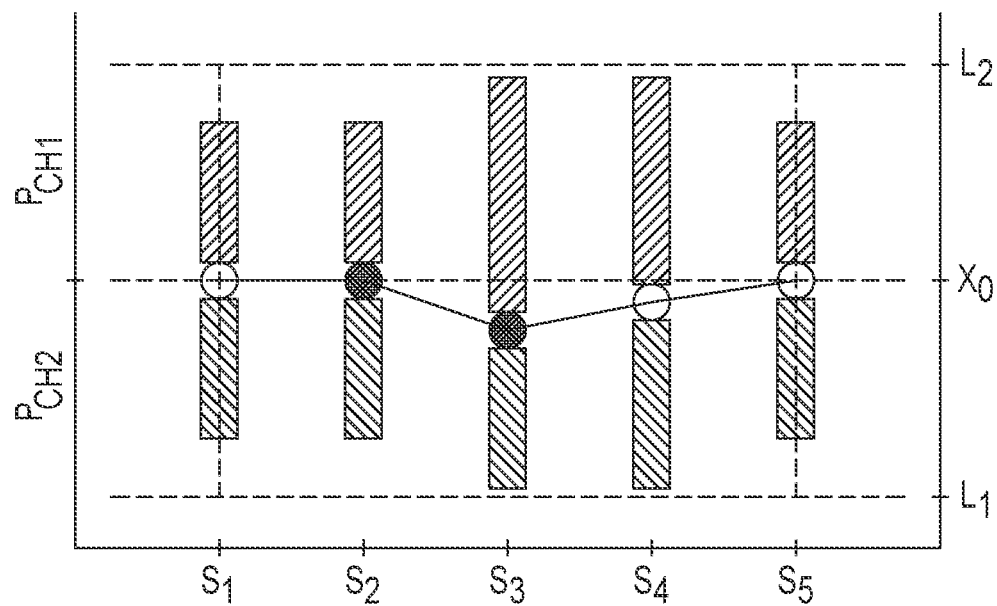
FIGS. 22A and 22B are graphical representations of exemplary characteristics having a relation to a suspension system undergoing the method of operation in FIG. 21.
Figure 22B:
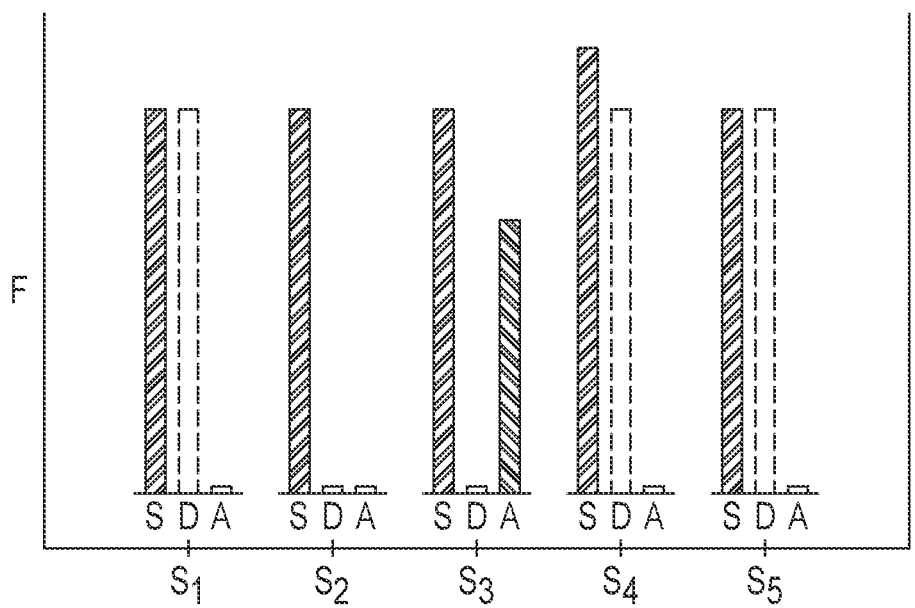

With reference to FIG. 21, a further example of a method 1400 of operating a suspension system in accordance with the subject matter of the present disclosure is graphically represented in conjunction with FIGS. 22A and 22B. It will be appreciated that FIGS. 22A and 22B graphically represent certain properties and/or characteristics of gas spring and gas damper assemblies, such as one or more of assemblies 74A, 74B, AS1 and/or AS2, for example, at various intervals during the performance of method 1400 in FIG. 21.

Method 1400 includes providing a suspension system, as is represented in FIG. 21 by reference number 1402. Non-limiting examples of such a suspension system can include one of cab mounts 46, cab suspensions 48, seat suspensions 50, the trailer suspension (not numbered) and/or suspension system portions 56A and/or 56B of suspension system 56. In some cases, providing a suspension system in 1402 can include providing a pressurized gas system (e.g., pressurized gas system 60), as is represented by reference number 1404. Additionally, providing a suspension system in 1402 can include providing a gas spring and gas damper assembly, such as one or more of assemblies 74A, 74B, AS1 and/or AS2, for example, and operatively connecting one or more of the spring and damping chambers of the assembly with the pressurized gas system, as are respectfully represented by reference numbers 1406 and 1408 in FIG. 21. For purposes of clarity and ease of reading, it is noted that further reference herein to spring chamber SP can correspond to spring chamber 302, damping chamber C1 can correspond to damping chamber portion 418A, and damping chamber C2 can correspond to damping chamber 418B.

Method 1400 also includes receiving a signal initiating the performance of a transition of the assembly from a first condition (e.g., a spring and damper functionality) to a second condition (e.g., an actuator functionality), as is represented by item number 1410 and arrow 1412 in FIG. 21. Method 1400 can also include converting, actuating or otherwise transitioning the assembly from the first condition to the second condition, as is represented by item number 1414, and thereby retracting a secondary suspension system from deployment. In a preferred arrangement, method 1400 can maintain the secondary suspension system in a retracted position for an indeterminate duration, as is represented in FIG. 21 by item number 1416. In some cases, method 1400 can include receiving a signal to maintain the assembly and corresponding secondary suspension system in the second condition, as is represented by item number 1418 and arrow 1420.

Method 1400 also includes receiving a signal initiating the performance of a transition of the assembly from the second condition (e.g., actuator functionality) to the first condition (e.g., spring and damper functionality), as is represented by item number 1422 and arrow 1424 in FIG. 21. Method 1400 can further include converting, actuating or otherwise transitioning the assembly from the second condition to the first condition, as is represented by item number 1426, and thereby extending or otherwise redeploying the secondary suspension system. Method 1400 can also include returning and, again, receiving a signal initiating the performance of a transition of the assembly from the first condition to the second condition at item number 1410, as is indicated by arrow 1428, such that the method can be repeated.

With reference, now, to FIGS. 21, 22A and 22B, a status S1 illustrates a condition of the suspension system prior to action 1414. At status S1, the assembly is at a design or nominal height (or length) X0 and the control device assembly (or valve) between chambers C1 and C2 is open, as is represented by the unfilled circle in FIG. 22A at status S1. Due to the open status of the valve between chambers C1 and C2, pressures PCH1 and PCH2 are approximately equal to one another. As such, the assembly can function as a spring and damper, and is capable of generating spring forces and potential damping forces, as is represented by bars S and D in FIG. 22B. In such conditions, actuation forces A are approximately zero. Furthermore, under such conditions, the assembly is capable of full displacement between displacement limits L1 and L2 in FIG. 22A, which can correspond to jounce and rebound limits of travel, respectively.

It will be appreciated that action 1414 of converting, actuating or otherwise transitioning the assembly from the first condition to the second condition and thereby retracting a secondary suspension system from deployment can be performed in any suitable manner. As one example, action 1414 can include restricting the transfer of pressurized gas between damping chambers C1 and C2, as is represented by item number 1430 and status S2 of FIGS. 22A and 22B. Under such conditions, spring force S remains at full value, but potential damping force D decreases to approximately zero due to the closed valve, which is represented in FIG. 22A by the filled circle at status S2.

Action 1414 can also include increasing the pressure in chamber C1 and thereby increasing the pressure differential between PCH1 and PCH2 as well as displacing the assembly from X0 as is represented by item number 1432 and by status S3 in FIG. 22A. Such an action causes an increase in actuation force A while spring force S remains at full value, as is represented in FIG. 22B. The increased differential pressure causes the assembly to decrease in length as is represented by the displacement from X0 in FIG. 22A and the generation of an initial actuation force A in FIG. 22B.

Action 1416 can include maintaining the suspension system in the second condition for an indeterminate period of time, such as minutes, hours or days, for example. Such an action can be achieved in any suitable manner, such as by maintaining a predetermined gas pressure within chamber C1, as is represented by item number 1434 in FIG. 21 and status S3 in FIGS. 22A and 22B.

Action 1426 of converting, actuating or otherwise transitioning the assembly from the second condition to the first condition and thereby extending or otherwise re-deploying the secondary suspension system can be performed in any suitable manner. As one example, action 1426 can include opening a valve or otherwise permitting flow between chambers C1 and SP/C2, as is represented in FIG. 21 by item number 1436 and by the unfilled circle at status S4 in FIG. 22A. Under such a condition, pressures PCH1 and PCH2 are approximately equalized and the assembly is displaced toward design height X0. Additionally, actuation force A drops to approximately zero, and spring and damper forces, S and D, respectively, increase to greater values, as illustrated in FIG. 22B. Action 1426 can also include decreasing the pressure within at least one of chambers SP and C2, as is represented by item number 1438 in FIG. 21 and status S5 in FIGS. 22A and 22B. Under such conditions, pressures PCH1 and PCH2 decrease but remain approximately equalized and the assembly is displaced toward the design height X0. Additionally, spring and potential damping forces, S and D, respectively, reach full effectiveness.

Figure 23:
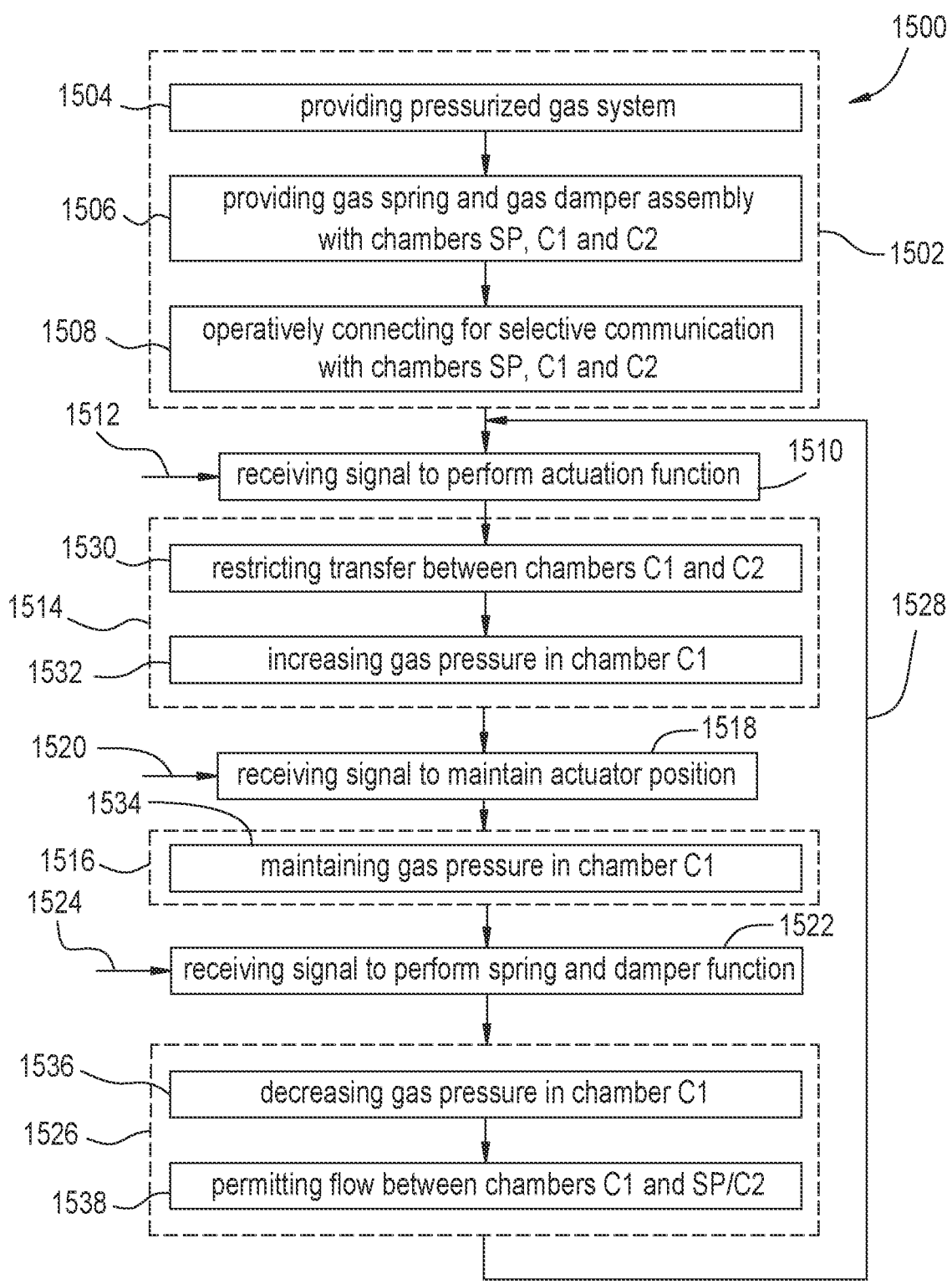
FIG. 23 is a graphical representation of still a further example of a method of operating a suspension system in accordance with the subject matter of the present disclosure.
Figure 24A:
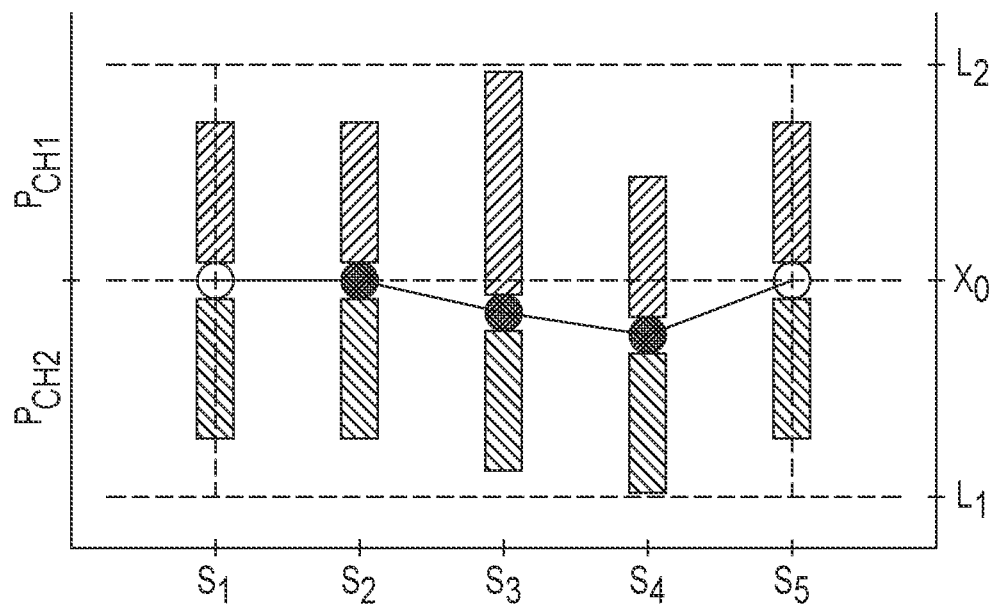
FIGS. 24A and 24B are graphical representations of exemplary characteristics having a relation to a suspension system undergoing the method of operation in FIG. 23.
Figure 24B:
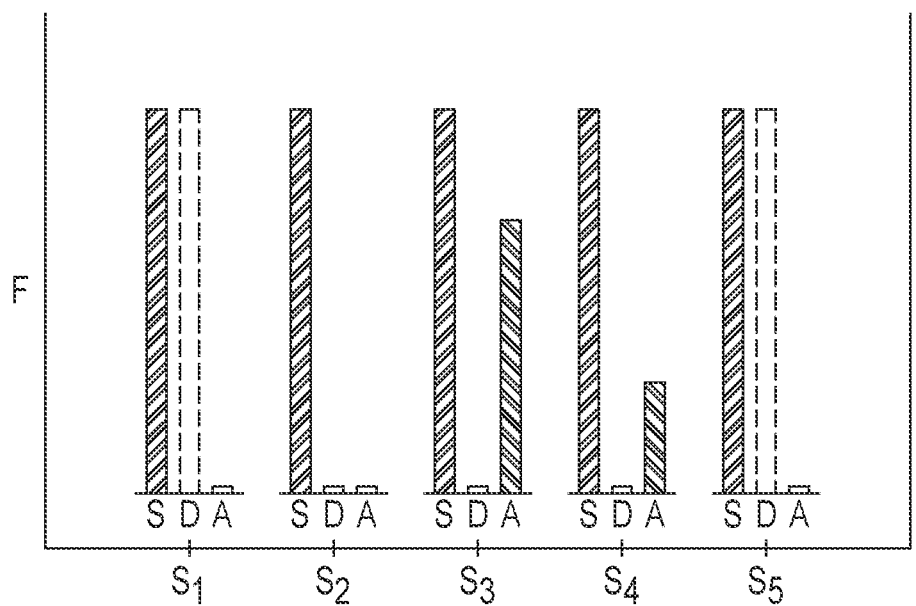

With reference to FIG. 23, still a further example of a method 1500 of operating a suspension system in accordance with the subject matter of the present disclosure is graphically represented in conjunction with FIGS. 24A and 24B. It will be appreciated that FIGS. 24A and 24B graphically represent certain properties and/or characteristics of gas spring and gas damper assemblies, such as one or more of assemblies 74A, 74B, AS1 and/or AS2, for example, at various intervals during the performance of method 1500 in FIG. 23.

Method 1500 includes providing a suspension system, as is represented in FIG. 23 by reference number 1502. Non-limiting examples of such a suspension system can include one of cab mounts 46, cab suspensions 48, seat suspensions 50, the trailer suspension (not numbered) and/or suspension system portions 56A and/or 56B of suspension system 56. In some cases, providing a suspension system in 1502 can include providing a pressurized gas system (e.g., pressurized gas system 60), as is represented by reference number 1504. Additionally, providing a suspension system in 1502 can include providing a gas spring and gas damper assembly, such as one or more of assemblies 74A, 74B, AS1 and/or AS2, for example, and operatively connecting one or more of the spring and damping chambers of the assembly with the pressurized gas system, as are respectfully represented by reference numbers 1506 and 1508 in FIG. 23. For purposes of clarity and ease of reading, it is noted that further reference herein to spring chamber SP can correspond to spring chamber 302, damping chamber C1 can correspond to damping chamber portion 418A, and damping chamber C2 can correspond to damping chamber 418B.

Method 1500 also includes receiving a signal initiating the performance of a transition of the assembly from a first condition (e.g., a spring and damper functionality) to a second condition (e.g., an actuator functionality), as is represented by item number 1510 and arrow 1512 in FIG. 23. Method 1500 can also include converting, actuating or otherwise transitioning the assembly from the first condition to the second condition, as is represented by item number 1514, and thereby retracting a secondary suspension system from deployment. In a preferred arrangement, method 1500 can maintain the secondary suspension system in a retracted position for an indeterminate duration, as is represented in FIG. 23 by item number 1516. In some cases, method 1500 can include receiving a signal to maintain the assembly and corresponding secondary suspension system in the second condition, as is represented by item number 1518 and arrow 1520.

Method 1500 also includes receiving a signal initiating the performance of a transition of the assembly from the second condition (e.g., actuator functionality) to the first condition (e.g., spring and damper functionality), as is represented by item number 1522 and arrow 1524 in FIG. 23. Method 1500 can further include converting, actuating or otherwise transitioning the assembly from the second condition to the first condition, as is represented by item number 1526, and thereby extending or otherwise re-deploying the secondary suspension system. Method 1500 can also include returning and, again, receiving a signal initiating the performance of a transition of the assembly from the first condition to the second condition at item number 1510, as is indicated by arrow 1528, such that the method can be repeated.

With reference, now, to FIGS. 23, 24A and 24B, a status S1 illustrates a condition of the suspension system prior to action 1514. At status S1, the assembly is at a design or nominal height (or length) X0 and the control device assembly (or valve) between chambers C1 and C2 is open, as is represented by the unfilled circle in FIG. 24A at status S1. Due to the open status of the valve between chambers C1 and C2, pressures PCH1 and PCH2 are approximately equal to one another. As such, the assembly can function as a spring and damper, and is capable of generating spring forces and potential damping forces, as is represented by bars S and D in FIG. 24B. In such conditions, actuation forces A are approximately zero. Furthermore, under such conditions, the assembly is capable of full displacement between displacement limits L1 and L2 in FIG. 24A, which can correspond to jounce and rebound limits of travel, respectively.

It will be appreciated that action 1514 of converting, actuating or otherwise transitioning the assembly from the first condition to the second condition and thereby retracting a secondary suspension system from deployment can be performed in any suitable manner. As one example, action 1514 can include restricting the transfer of pressurized gas between damping chambers C1 and C2, as is represented by item number 1530 and status S2 of FIGS. 24A and 24B. Under such conditions, spring force S remains at full value, but potential damping force D decreases to approximately zero due to the closed valve, which is represented in FIG. 24A by the filled circle at status S2.

Action 1514 can also include increasing the pressure in chamber C1 and thereby increasing the pressure differential between PCH1 and PCH2 as well as displacing the assembly from X0 as is represented by item number 1532 and by status S3 in FIG. 24A. Such an action causes the generation of an actuation force A while spring force S remains at full value, as is represented in FIG. 24B. The increased differential pressure causes the assembly to decrease in length as is represented by the displacement from X0 in FIG. 24A.

Action 1516 can include maintaining the suspension system in the second condition for an indeterminate period of time, such as minutes, hours or days, for example. Such an action can be achieved in any suitable manner, such as by maintaining a predetermined gas pressure within chamber C1, as is represented by item number 1534 in FIG. 23 and status S3 in FIGS. 24A and 24B.

Action 1526 of converting, actuating or otherwise transitioning the assembly from the second condition to the first condition and thereby extending or otherwise re-deploying the secondary suspension system can be performed in any suitable manner. As one example, action 1526 can include decreasing the pressure within chamber C1, as is represented by item number 1536 in FIG. 23 and status S4 in FIGS. 24A and 24B. Under such conditions, pressures PCH1 and PCH2 may become approximately equalized resulting in a reduction in actuation force A as well as the displacement of the assembly toward a further retracted condition, such as is represented by status S4 in FIGS. 24A and 24B.

Action 1526 can also include opening a valve or otherwise permitting flow between chambers C1 and SP/C2, as is represented in FIG. 23 by item number 1538 and by the unfilled circle at status S5 in FIG. 24A. Under such a condition, pressures PCH1 and PCH2 are approximately equalized and the assembly is displaced toward design height X0. Additionally, actuation force A drops to approximately zero, and spring and damper forces, S and D, respectively, increase to approximately full values, as illustrated in FIG. 24B.

As discussed above, the continued pursuit of lighter and more efficient vehicles has resulted in a desire from conventional designs for commercial vehicles using two drive axles (6×4) on a tandem suspension to a single drive axle (6×2) configuration. Such arrangements allow for the elimination of the weight of components such as gears and jounces that would otherwise be associated with a drive axle. Additionally, such arrangements may also allow for a non-driven axle to be raised when not required for load capacity purposes. Such arrangements can also be used in connection with otherwise conventional trailer suspensions. It has been recognized that raising an axle will reduce the wear on components such as suspension bushings, tires and brakes. Additionally, raising an axle can also reduce rolling resistance of the associated vehicle thereby improving efficiency.

In conventional constructions, raising an axle is performed by a dedicated lift-axle system that commonly includes dedicated mechanisms, lift actuators and controls. It has been found, however, that a number of components that would otherwise be associated with a conventional lift axle system can be eliminated by using a gas spring and gas damper assembly in accordance with the subject matter of the present disclosure to perform the lifting function in one operative condition while remaining capable of providing spring and damper functions in another operative condition.

A gas spring and gas damper assembly in accordance with the subject matter of the present disclosure, such as assemblies 74A, 74B, AS1 and/or AS2, for example, generally include a spring chamber, such as spring chamber 302, for example, and a damping chamber, such as damping chamber 418, for example. When such a gas spring and gas damper assembly is in a normal (i.e., non-lifting) condition of operation, a net force is generated by exerting a first internal pressure primarily on the effective area of the spring chamber which generally acts in a direction in which the gas spring and gas damper assembly extends and/or that can be described as holding the vehicle chassis and axle apart. When the gas spring and gas damper assembly performs a lifting function, a second internal pressure is primarily exerted on the effective area of the damping chamber such that the gas spring and gas damper assembly is urged to collapse or contract and/or which can be described as drawing the vehicle chassis and axle toward one another and thereby lifting the axle.

As described above, the spring chamber (e.g., spring chamber 302) and the damping chamber (e.g., damping chamber 408) are disposed in fluid communication with one another by way of one or more damping passages (e.g., elongated damping passages 248 and/or 820). Additionally, as described above, one or more control devices, such as one or more control device assemblies 88 (FIGS. 2, 7 and 14), for example, can optionally be included on or along any such elongated damping passages to selectively permit pressurized gas flow therealong. As is also described above, in order to provide lift actuator functionality, any such one or more elongated damping passages as well as any other ports or openings in fluid communication into or out of the damping passage are restricted and, preferably, sealed. Selective operation of control device assemblies 88 (FIGS. 2, 7 and 14), such as by way of control lines 90 (FIGS. 2, 7 and 14) and control system 78 (FIG. 2) and/or by way of pressurized gas lines 90C through valves 68C and control system 78, for example, can provide such lift actuator functionality and/or otherwise transition the gas spring and gas damper assemblies into or otherwise between functional conditions of operation, as described above.

FIGS. 25-30 illustrate one example of a control device (or valve) assembly 1600 suitable for use as control device assemblies 88. It will be appreciated that valve assembly 1600 can be operatively associated with a gas spring end member (e.g., end member 200 and/or 800) of any suitable type, kind and/or construction. As one example, an end member 1700 is also shown and described in connection with FIGS. 25-30. End member 1700 can extend lengthwise between opposing ends 1702 and 1704 that are axially spaced from one another. End member 1700 can include an end member wall 1706 that can have a first or outer side wall portion 1708 that extends in a generally axial direction and includes an outside surface 1710 and an inside surface 1712. End member 1700 can also include a second or inner side wall portion 1714 that also extends in a generally axial direction. Inner side wall portion 1714 is spaced radially inward from outer side wall portion 1708 and includes an outside surface 1716 and an inside surface 1718. In a preferred arrangement, inside surface 1718 of inner side wall portion 1714 can at least partially define an inner (or damping) cavity 1720 within end member 1700.

In the arrangement shown in FIGS. 23-28, end member 1700 includes an outer cavity 1722 extending into the end member between inside surface 1712 of outer side wall portion 1708 and outside surface 1716 of inner side wall portion 1714. In some cases, one or more support wall portions 1724 can extend between and operatively interconnect the outer and inner side wall portions. End member wall 1706 can also include an end wall portion 1726 that can extend across and/or between any combination of one or more of outer side wall portion 1708, inner side wall portion 1714 and/or support wall portions 1724. End wall portion 1726 can be oriented transverse to axis AX and can at least partially form a closed end of inner cavity 1720 of the end member. Additionally, end wall portion 1726 can include opposing surfaces 1728 and 1730. End member wall 1706 can also include one or more engagement features disposed on or along end member 1700, such as along end 1704 thereof. As one example, one or more receiver wall portions 1732 can extend radially inward from along outer side wall portion 1708 adjacent end 1704. It will be appreciated that in some constructions a single, annular receiver wall portion could be provided. Alternately, a plurality of peripherally-spaced receiver wall portions could be included. In either case, the one or more receiver wall portions can at least partially define a retaining shoulder or shoulder surface portion 1734 oriented transverse to axis AX and facing toward end 1702 of end member 1700.

As indicated above, it will be appreciated that the one or more end members of the gas spring and gas damper assembly can be operatively connected or otherwise secured to the flexible spring member in any suitable manner. In the case of end member 1700, end member wall 1706 can, for example, include an outer surface 1736 that extends peripherally about axis AX and is dimensioned to receive mounting bead 316 disposed along end 308 of the flexible wall 304 such that a substantially fluid-tight seal can be formed therebetween, such as has been described above. In an assembled condition, outer surface 310 of flexible wall 304 can be disposed in abutting engagement with outside surface 1710 of outer side wall portion 1708. In such an arrangement, flexible wall 304 of flexible spring member 300 can form a rolling lobe 320 along outside surface 1710 of outer side wall portion 1708. As gas spring and gas damper assembly AS1 and/or AS2 is displaced between compressed and extended conditions, rolling lobe 320 can be displaced along outer surface 1710 in a generally conventional manner.

Figure 25:
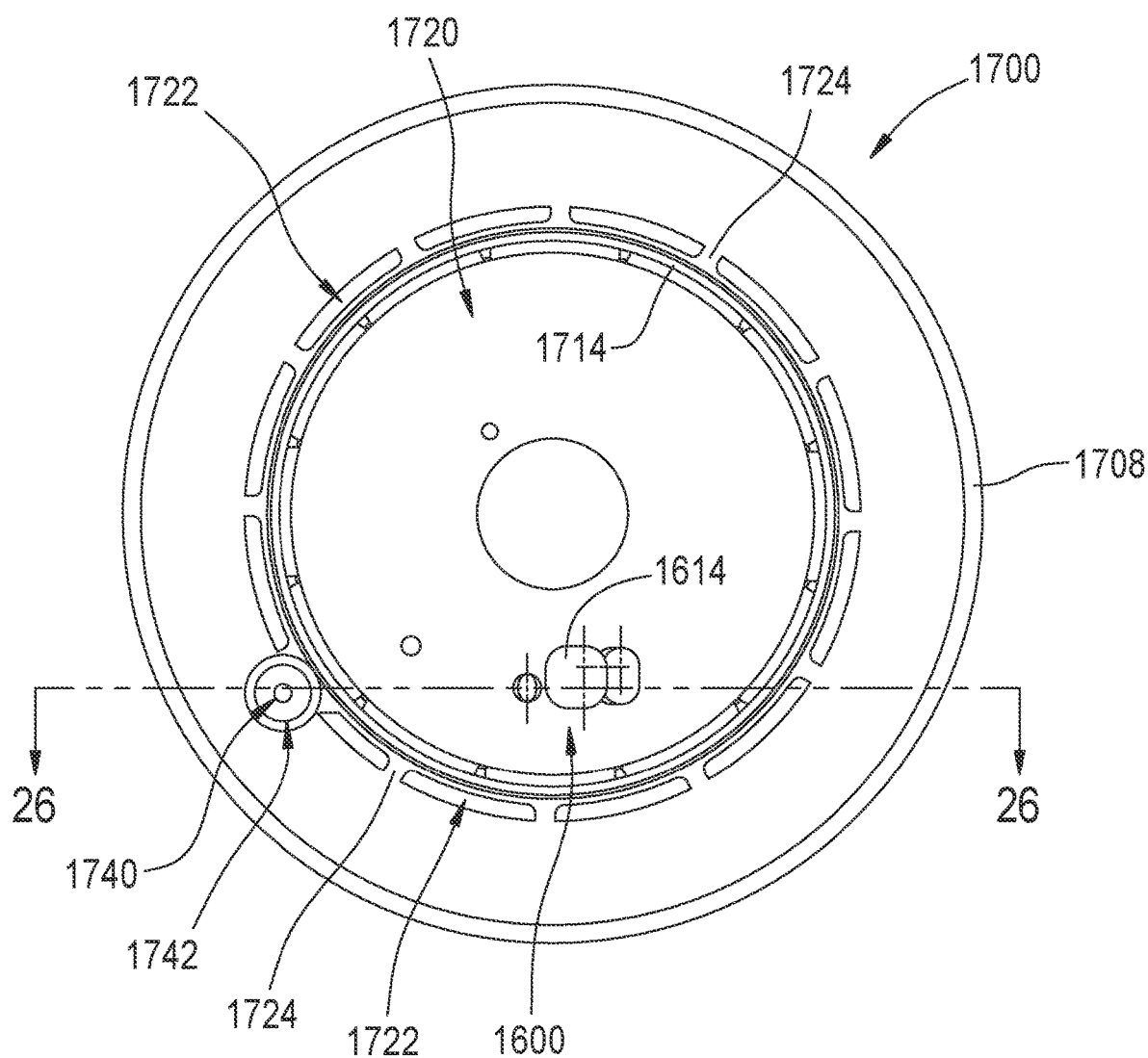
FIG. 25 is a bottom plan view of one example of an end member of a gas spring and gas damper assembly including a control device assembly in accordance with the subject matter of the present disclosure with the control device assembly shown in a first operative condition.
Figure 26:
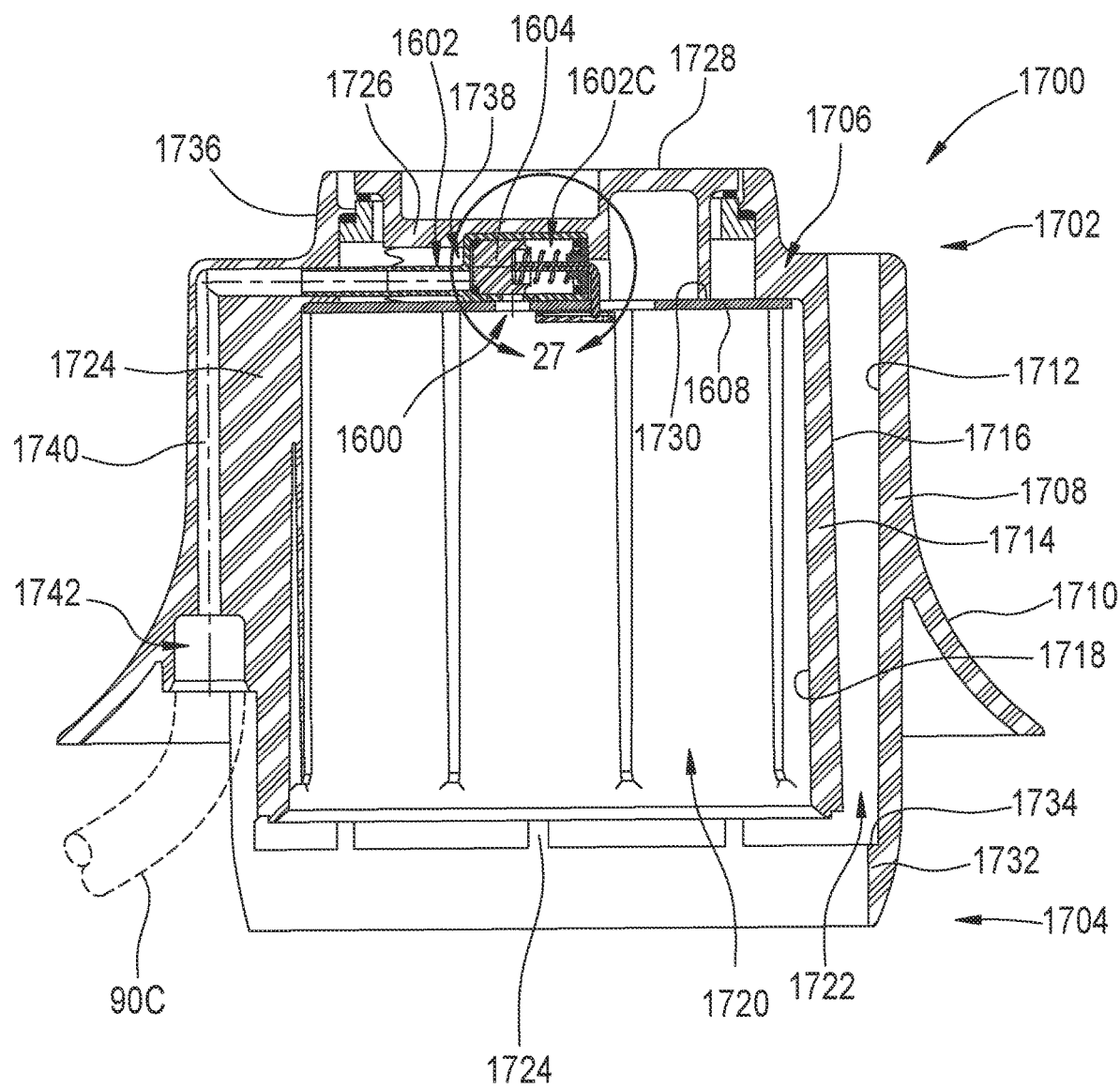
FIG. 26 is a cross-sectional side view of the exemplary end member and control device assembly in FIG. 25 taken from along line 26-26 in FIG. 25 and shown with the control device assembly in the first operative condition.
Figure 27:
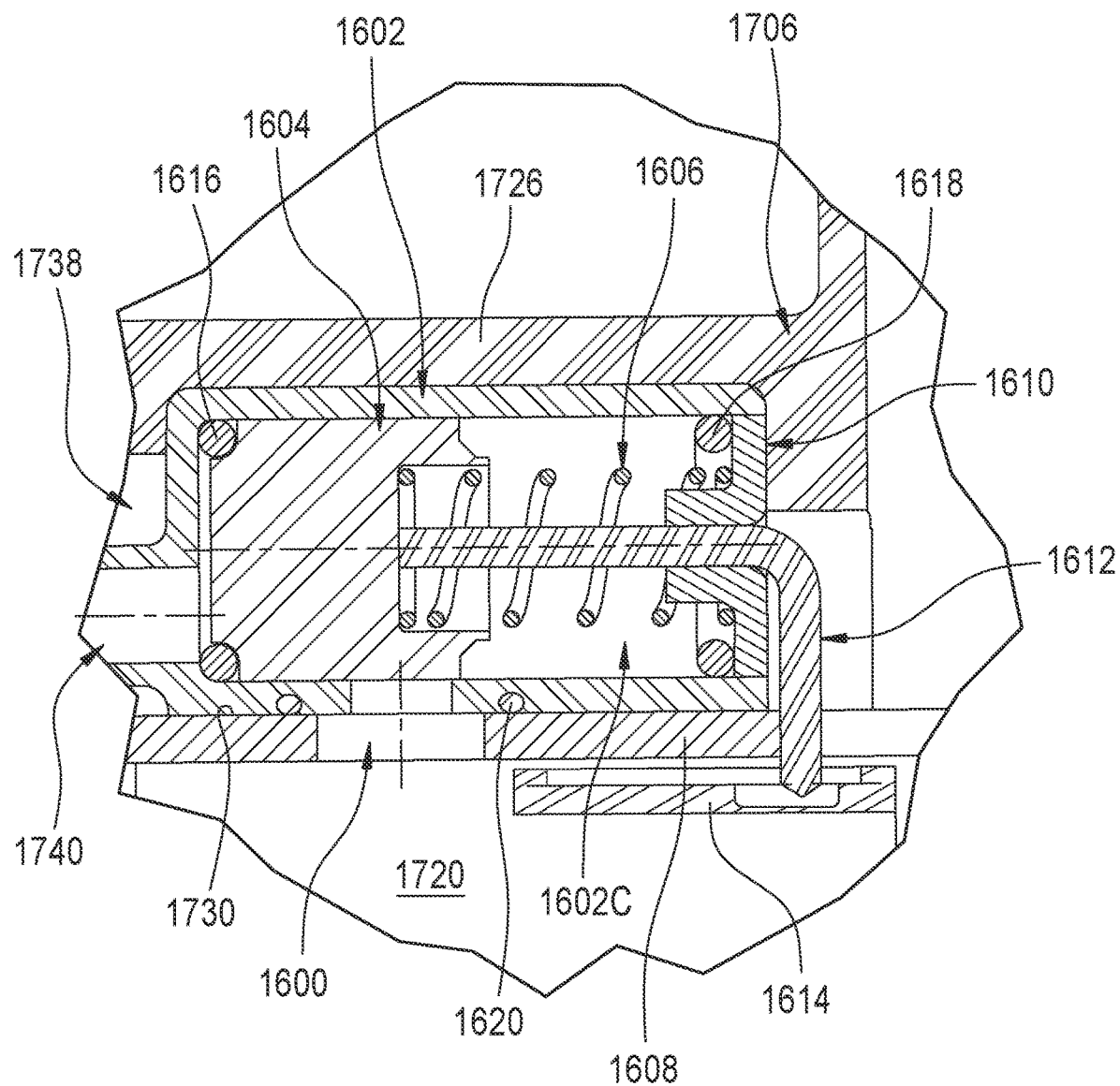
FIG. 27 is an enlarged view of the portion of the exemplary end member and control device assembly identified as Detail 27 in FIG. 26.
Figure 28:
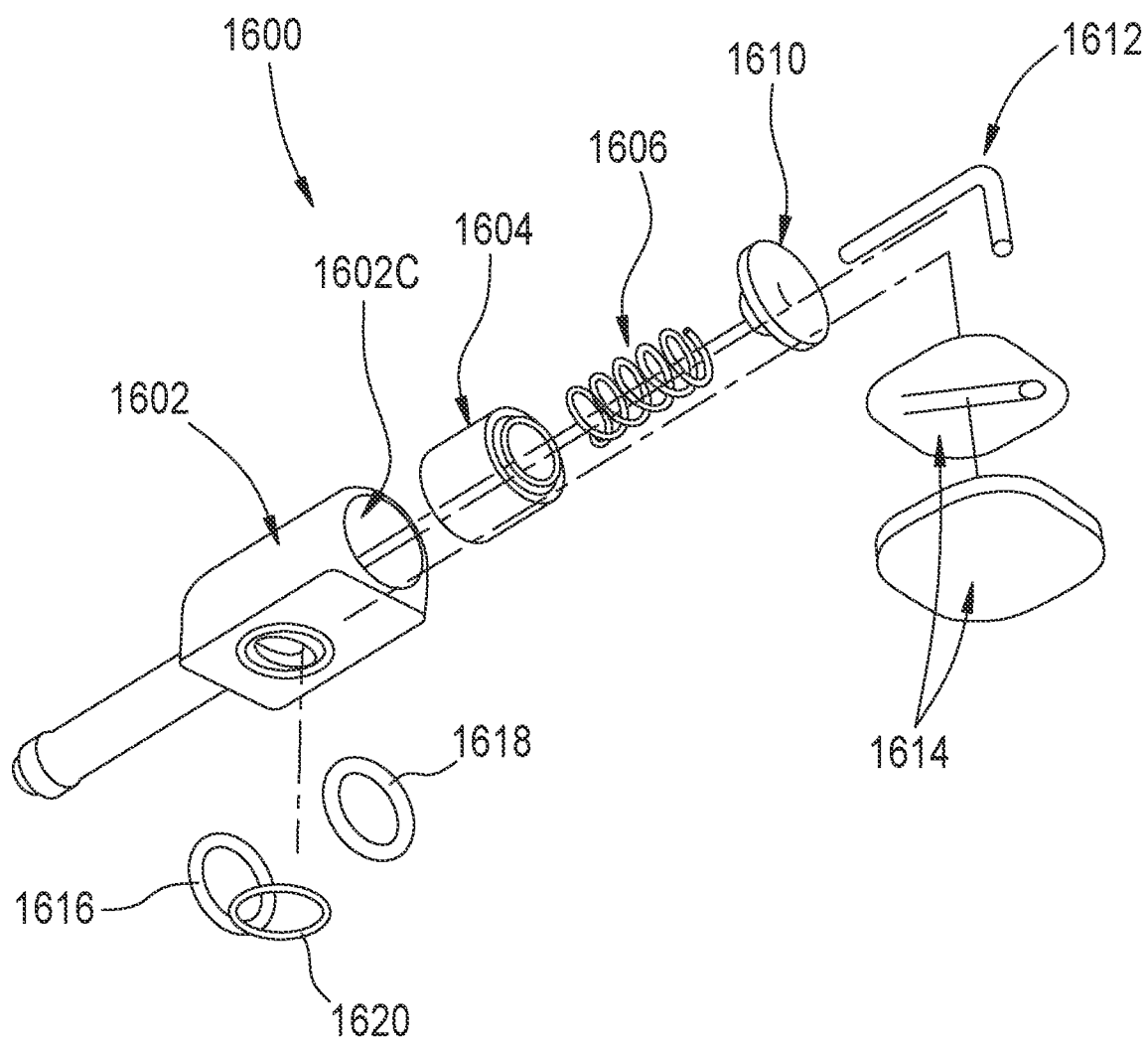
FIG. 28 is an exploded perspective view of the exemplary control device assembly in FIGS. 25-27.

End member 1700 can also include a valve cavity 1738 disposed along end wall portion 1726 of end member wall 1706. In a preferred arrangement, a control passage 1740 can extend in fluid communication between valve cavity 1730 and a connector port 1742 that is adapted for fluidically connecting a pneumatic control line (e.g., pressurized gas line 90C). Valve assembly 1600 can include a valve housing 1602 that at least partially defines a housing cavity 1602C, and is disposed within valve cavity 1738 with housing cavity 1602C operatively connected with control passage 1740 for selective actuation of the pneumatically-actuated control device by pressurized gas signals communicated through a control line operatively attached to connector port 1742. A valve body (or poppet) 1604 can be disposed within valve housing 1602 and is capable of motion within the housing cavity relative to the valve housing upon actuation. As shown in FIGS. 25-27, in a first position within the relative range of motion within the housing cavity, valve body 1604 creates a restriction for a second internal pressure supply through control passage 1740 and connector port 1742 while allowing pressurized gas damping to occur through the one or more gas damping passages (such as have been described above) using the first internal pressure of the gas spring and gas damper assembly, such as may be provided in otherwise conventional manners. As non-limiting examples, pressurized gas transfer associated with the first internal pressure of the gas spring and gas damper assembly can be communicated through gas transfer lines 76, elongated channels 248, openings or passages 256, passages 258, and/or gas transfer passages 620. Valve body 1604 can, optionally, be biased toward such a first position by way of a biasing element 1606.

Figure 29:
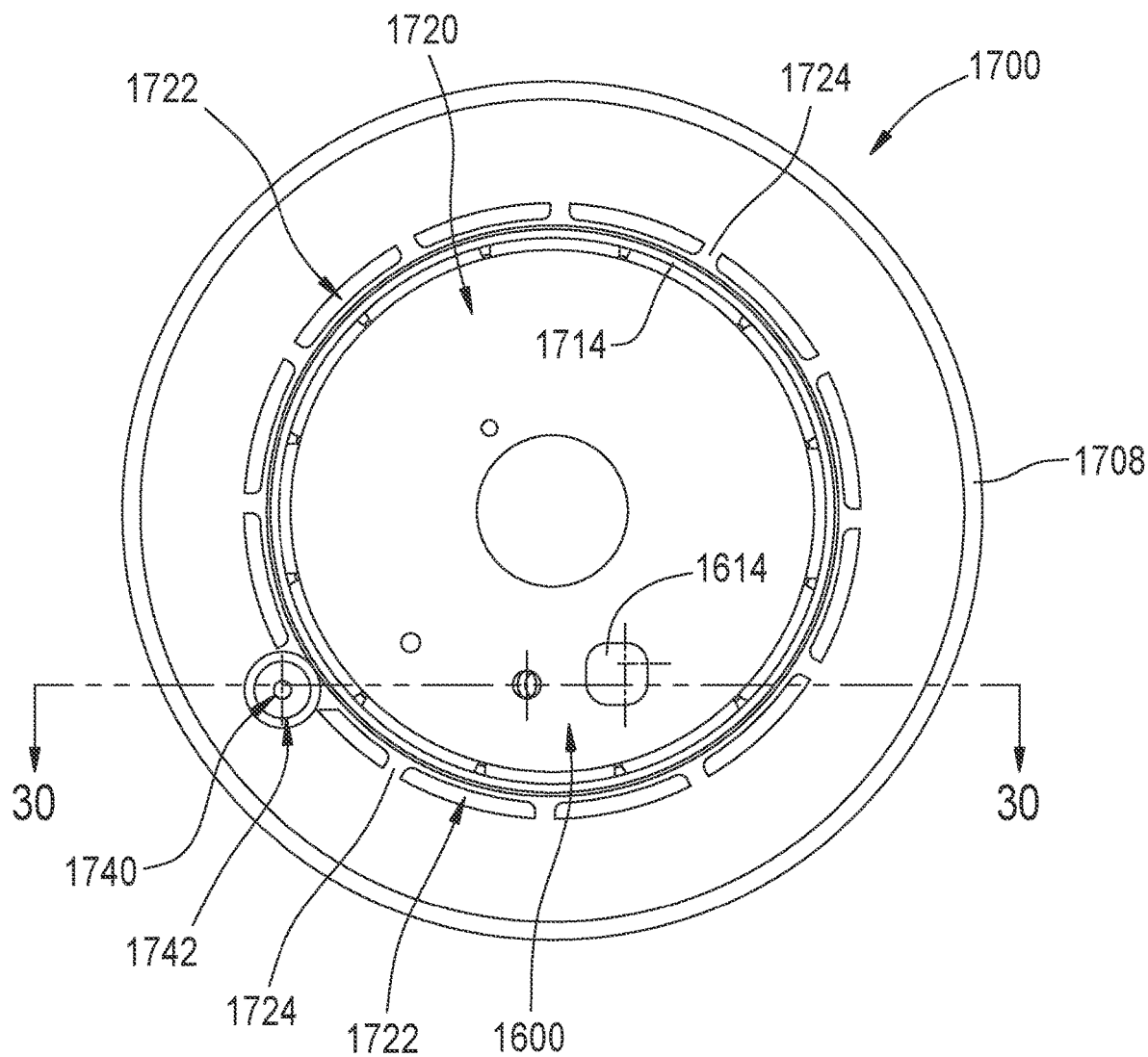
FIG. 29 is a bottom plan view of the exemplary end member and control device assembly in FIGS. 25-28 shown in a second operative condition.
Figure 30:
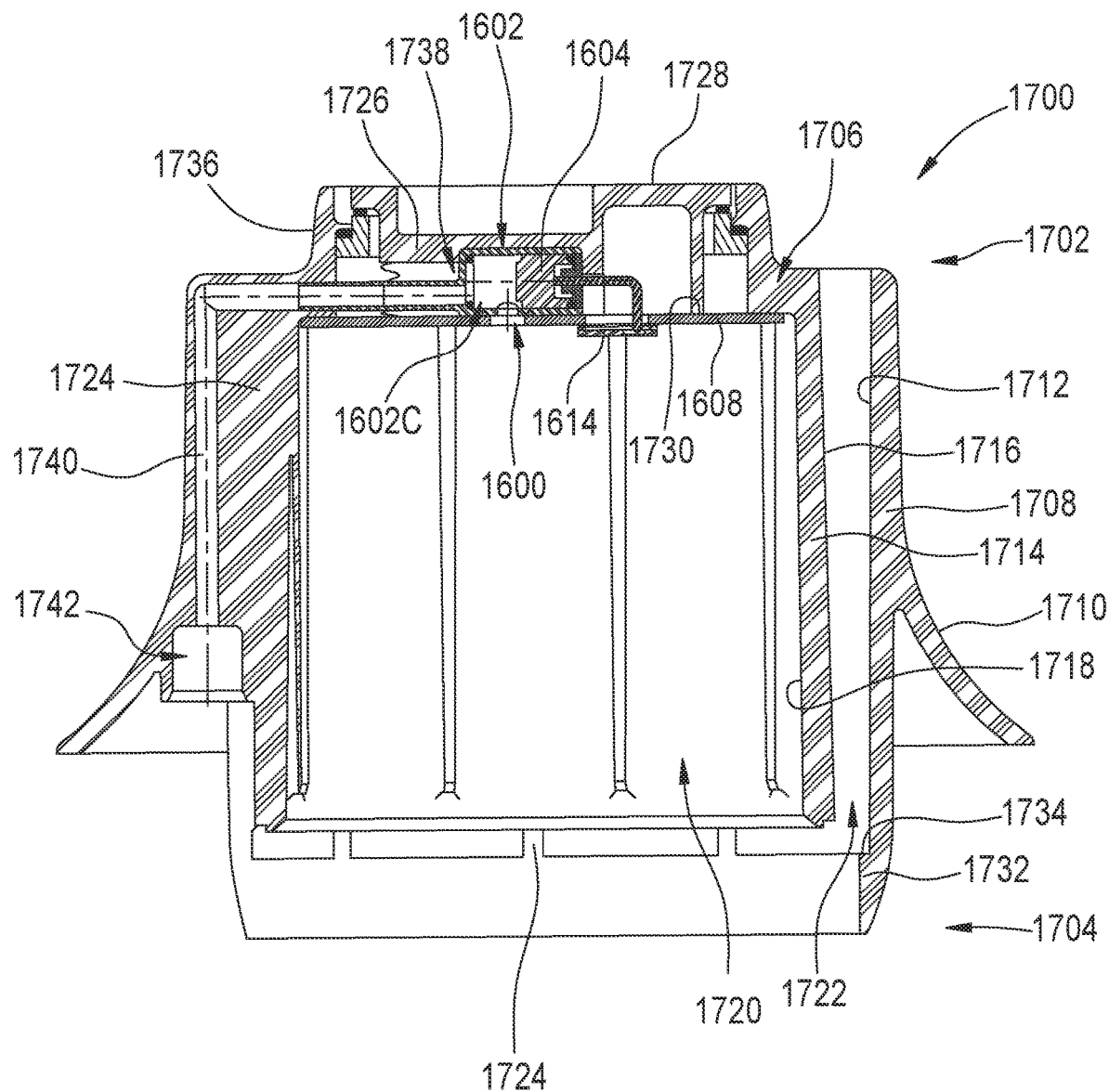
FIG. 30 is a cross-sectional side view of the exemplary end member and control device assembly in FIGS. 25-29 taken from along line 30-30 in FIG. 29 and shown with the control device assembly in a second operative condition.

As shown in FIGS. 29 and 30, in a second position, valve body 1604 creates a restriction for the one or more damping passages while allowing pressurized gas flow through control passage 1740. In a preferred arrangement, the first internal pressure will be at least partially exhausted before the second internal pressure is applied to generate lift (i.e., contraction). Such pressurized gas exhaustion can be performed by a separate valve assembly, which can be internal or external, or could be integrated as an additional passage. In some cases, valve body 1604 could be actuated by a control gas pressure or flow from control passage 1740.

Valve assembly 1600 can also include a cover plate 1608 extending across and at least partially covering valve cavity 1738. A valve end cap 1610 can be disposed along an end of valve housing 1602 opposite the connection with control passage 1740. A valve link 1612 can extend between and operatively connect valve body 1604 with a restrictor plate 1614 that is displaceable upon actuation of the valve assembly between open and closed positions. A seal interface 1616 can optionally be included between valve housing 1602 and valve body 1604. Additionally, or in the alternative, a seal interface 1618 can be included between valve housing 1602, valve body 1604 and/or valve end cap 1610. Furthermore, or as another alternative, a seal interface 1620 can be disposed between valve housing 1602, cover plate 1608 and/or end member wall 1706.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A gas spring and gas damper assembly comprising:
a flexible spring member having a longitudinal axis and including a flexible wall extending longitudinally between first and second ends and peripherally about said axis to at least partially define a spring chamber;
a first end member operatively secured to said first end of said flexible spring member such that a substantially fluid-tight seal is formed therebetween;
a second end member disposed in spaced relation to said first end member and operatively secured to said second end of said flexible spring member such that a substantially fluid-tight seal is formed therebetween, said second end member including an end member wall that at least partially defines a damping chamber within said second end member, said end member wall at least partially defining a valve cavity and a connector port with a control passage disposed in fluid communication between said valve cavity and said connector port;
a damper rod assembly including a damper piston and an elongated damper rod operatively connected to said damper piston, said damper piston positioned within said damping chamber and separating said damping chamber into first and second chamber portions; and,
a pneumatically-actuated control device at least partially disposed within said valve cavity in fluid communication with at least one of said first and second chamber portions, said pneumatically-actuated control device displaceable between;
a first operative condition in which said pneumatically-actuated control device restricts pressurized gas flow through said control passage while allowing pressurized gas flow between said spring chamber and said first and second chamber portions such that said gas spring and gas damper assembly has spring and damper functionality; and,
a second operative condition in which said pneumatically-actuated control device restricts pressurized gas flow through said control passage such that said gas spring and gas damper assembly has actuator functionality.

2. A gas spring and gas damper assembly according to claim 1, wherein said end member wall includes an end wall portion, and said pneumatically-actuated control device is disposed within said gas spring and gas damper assembly along said end wall portion of said end member wall.

3. A gas spring and gas damper assembly according to claim 1, wherein said pneumatically-actuated control device includes a control device chamber disposed along said end member wall of said second end member with said control device chamber disposed in fluid communication with said one of said first and second damping chamber portions in at least one of said first and second operative conditions.

4. A gas spring and gas damper assembly according to claim 3, wherein said pneumatically-actuated control device includes a control device body disposed within said control device chamber and displaceable between a first position within said control device chamber corresponding to said first operative condition and a second position within said control device chamber corresponding to said second operative condition.

5. A gas spring and gas damper assembly according to claim 4, wherein said pneumatically-actuated control device includes a biasing element operatively engaged with said control device body, said biasing element operative to displace said control device body in at least one direction between said first position corresponding to said first operative condition of said gas spring and gas damper assembly and said second position corresponding to said second operative condition of said gas spring and gas damper assembly.

6. A gas spring and gas damper assembly according to claim 3, wherein said control device chamber is at least partially defined by at least one of a portion of said end member wall and a control device housing.

7. A gas spring and gas damper assembly according to claim 3, wherein said control device chamber is at least partially defined by a control device housing disposed along an end wall portion of said end member wall with at least a portion of said control device housing disposed in fluid communication with said one of said first and second damping chamber portions.

8. A gas spring and gas damper assembly according to claim 1, wherein said pneumatically-actuated control device includes a cover plate extending along said end wall portion of said end member wall between said control device housing and said one of said first and second damping chamber portions.

9. A gas spring and gas damper assembly according to claim 1, wherein said end member wall of said second end member includes an exterior surface portion, said control passage being in fluid communication with said pneumatically-actuated control device with said control passage accessible from along said exterior surface portion of said second end member.

10. A gas spring and gas damper assembly according to claim 9, wherein said pneumatically-actuated control device includes a control device chamber in fluid communication with said control passage in at least one of said first and second operative conditions.

11. A gas spring and gas damper assembly according to claim 9, wherein said pneumatically-actuated control device includes a sealing element operatively disposed in fluid communication between said control passage and said at least one of said first and second damping chamber portions of said damping chamber.

12. A gas spring and gas damper assembly according to claim 1, wherein said elongated damper rod is operatively connected to said first end member such that upon extension and compression of said gas spring and gas damper assembly in said first operative condition said damper piston is reciprocally displaced within said damping chamber.

13. A suspension system comprising:
a gas spring and gas damper assembly according to claim 1 secured between an associated sprung mass and an associated unsprung mass;
a pressurized gas system in fluid communication with said pneumatically-actuated control device of said assembly; and,
a control system in communication with at least said pressurized gas system and operative to selectively operate said pressurized gas system between a first fluid communication condition in which said pneumatically-actuated control device is disposed in said first operative condition and a second fluid communication condition in which said pneumatically-actuated control device is disposed in said second operative condition.

14. A suspension system according to claim 13 further comprising a pressurized gas line disposed in fluid communication between said pressurized gas system and said pneumatically-actuated control device.

15. A suspension system according to claim 13, wherein said control system is operative to:

receive a signal initiating a transition of said assembly from said first operative condition to said second operative condition;
actuate said control system to transfer pressurized gas within said assembly and thereby transition said assembly from said first operative condition to said second operative condition;
maintain said assembly in said second condition for an indeterminate period of time;
receive a signal initiating a transition of said assembly from said second condition to said first condition; and,
actuate said control system to transfer pressurized gas within said assembly and thereby transition said assembly from said second operative condition to said first operative condition.

16. A method of operating a suspension system, said method comprising:
providing a suspension system including:
a gas spring and gas damper assembly according to claim 1 with said gas spring and gas damper assembly being securable between a sprung mass and an unsprung mass; and,
a pressurized gas system in fluid communication with said assembly; and,
communicating pressurized gas to said pneumatically-actuated control device thereby transitioning said assembly from said first operative condition to said second operative condition;
maintaining said assembly in said second operative condition for an indeterminate period of time; and,
communicating pressurized gas to said pneumatically-actuated control device thereby transitioning said assembly from said second operative condition to said first operative condition.

17. A method according to claim 16, wherein said action of communicating pressurized gas to said pneumatically-actuated control device thereby transitioning said assembly from said first operative condition to said second operative condition includes actuating one or more valves operatively associated with said pressurized gas system to transfer pressurized gas to or from said pneumatically-actuated control device.

18. A method according to claim 16, wherein said action of communicating pressurized gas to said pneumatically-actuated control device thereby transitioning said assembly from said second operative condition to said first operative condition includes actuating one or more valves operatively associated with said pressurized gas system to transfer pressurized gas to or from said pneumatically-actuated control device.

19. A gas spring and gas damper assembly comprising:
a flexible spring member having a longitudinal axis and including a flexible wall extending longitudinally between first and second ends and peripherally about said axis to at least partially define a spring chamber;
a first end member operatively secured to said first end of said flexible spring member such that a substantially fluid-tight seal is formed therebetween;
a second end member disposed in spaced relation to said first end member and operatively secured to said second end of said flexible spring member such that a substantially fluid-tight seal is formed therebetween, said second end member including an end member wall with an exterior surface portion and a damping chamber at least partially defined within said second end member, said end member wall at least partially defining a valve cavity and a connector port with a control passage disposed in fluid communication between said valve cavity and said connector port, said control passage being accessible from along said exterior surface portion of said end member wall;
a damper rod assembly including a damper piston and an elongated damper rod operatively connected to said damper piston, said damper piston positioned within said damping chamber and separating said damping chamber into first and second chamber portions; and,
a pneumatically-actuated control device at least partially disposed within said valve cavity in fluid communication with at least one of said first and second chamber portions, said pneumatically-actuated control device displaceable between:
a first operative condition in which said pneumatically-actuated control device restricts pressurized gas flow through said control passage while allowing pressurized gas transfer between said spring chamber and at least one of said first and second damping chambers such that said gas spring and gas damper assembly has spring and damper functionality in which said gas spring and gas damper assembly undergoes extension and compression with said damper piston reciprocally displaced within said damping chamber; and,
a second operative condition in which said pneumatically-actuated control device restricts pressurized gas flow between said spring chamber and at least one of said first and second damping chambers while allowing pressurized gas flow through said control passage such that said gas spring and gas damper assembly has actuator functionality in which said gas spring and gas damper assembly is maintainable at an approximately fixed length with said damper piston maintained in a substantially stationary position within said damping chamber for an indeterminate period of time.

20. An end member assembly dimensioned for securement to an associated flexible spring member of an associated gas spring and gas damper assembly, said end member assembly comprising:
an end member dimensioned for operative securement to the associated flexible spring member such that a substantially fluid-tight seal is formed therebetween, said end member including an end member wall with an exterior surface portion and a damping chamber at least partially defined within said end member, said end member wall at least partially defining a valve cavity and a connector port with a control passage disposed in fluid communication between said valve cavity and said connector port, said control passage being accessible from along said exterior surface portion of said end member wall;
a damper piston positioned within said damping chamber and separating said damping chamber into first and second chamber portions; and,
a pneumatically-actuated control device at least partially disposed within said valve cavity in fluid communication with at least one of said first and second chamber portions, said pneumatically-actuated control device displaceable between:
a first operative condition in which said pneumatically-actuated control device restricts pressurized gas flow through said control passage while allowing pressurized gas transfer into and out of at least one of said first and second damping chambers such that said damper piston is reciprocally displaceable within said damping chamber; and, a second operative condition in which said pneumatically-actuated control device restricts pressurized gas flow out of at least one of said first and second damping chambers while allowing pressurized gas flow into said first damping chamber through said control passage such that said gas spring and gas damper assembly has actuator functionality in which said damper piston is maintained in a substantially stationary position within said damping chamber for an indeterminate period of time.

* * * * *